(12) United States Patent
Idehara

(10) Patent No.: US 7,545,525 B2
(45) Date of Patent: Jun. 9, 2009

(54) INPUT-OUTPUT APPARATUS SELECTING METHOD FOR NETWORK SYSTEM

(75) Inventor: Takenori Idehara, Machida (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/082,127

(22) Filed: May 20, 1998

(65) Prior Publication Data

US 2001/0052995 A1    Dec. 20, 2001

(30) Foreign Application Priority Data

| May 21, 1997 | (JP) | ................................ 9-146080 |
| May 21, 1997 | (JP) | ................................ 9-146081 |
| May 21, 1997 | (JP) | ................................ 9-146082 |
| May 21, 1997 | (JP) | ................................ 9-146083 |

(51) Int. Cl.
*G06F 3/12* (2006.01)
*G06K 15/00* (2006.01)

(52) U.S. Cl. ...................... 358/1.15; 358/1.13; 358/1.14

(58) Field of Classification Search ........... 358/1.1–1.9, 358/1.11–1.18, 407, 468, 404, 444, 401, 358/400; 347/2, 3, 5, 14, 23; 399/1, 8; 715/204, 715/273, 274, 700, 836, 837, 713, 835, 810, 715/764, 763, 762; 710/8, 15, 16, 17, 18, 710/19, 62, 63, 64, 72
See application file for complete search history.

(56) References Cited

U.S. PATENT DOCUMENTS

| 5,353,399 | A |   | 10/1994 | Kuwamoto et al. | ......... 395/159 |
| 5,444,836 | A | * | 8/1995 | Hollingsworth et al. | ..... 395/135 |
| 5,513,126 | A |   | 4/1996 | Harkins et al. | .......... 364/514 A |
| 5,692,111 | A | * | 11/1997 | Marbry et al. | ............. 358/1.15 |
| 5,754,174 | A | * | 5/1998 | Carpenter et al. | ........... 345/334 |
| 5,809,265 | A | * | 9/1998 | Blair et al. | ................... 395/339 |
| 5,812,750 | A | * | 9/1998 | Dev et al. | ................ 395/182.2 |
| 5,859,711 | A | * | 1/1999 | Barry et al. | ................. 358/296 |
| 5,987,225 | A |   | 11/1999 | Okano | ......................... 395/112 |
| 5,991,846 | A | * | 11/1999 | Ooki | .......................... 710/241 |

(Continued)

FOREIGN PATENT DOCUMENTS

JP           3-150614 A       6/1991

(Continued)

OTHER PUBLICATIONS

B.K. Jackson, A. Salahsh and M.L. Williams; Methodology for Automated Printed Selection; Sep. 1993; IBM Technical Disclosure Bulletin; vol. 36 No. 09B, p. 379.*

(Continued)

*Primary Examiner*—Dov Popovici
(74) *Attorney, Agent, or Firm*—Sidley Austin LLP

(57) ABSTRACT

In a network system to which a plurality of computers and a plurality of input-output apparatuses are connected, a layout diagram showing locations of the input-output apparatuses is displayed on a display unit and icons each representing one of the input-output apparatuses are displayed over the layout diagram at locations corresponding to the locations at which the apparatuses are actually installed. The user clicks one of the icons representing a desired one of the input-output apparatuses by using a device such as a mouse in order to specify the desired apparatus. As a result, a desired input-output apparatus can be selected correctly.

7 Claims, 40 Drawing Sheets

U.S. PATENT DOCUMENTS 5,996,029 A * 11/1999 Sugiyama et al. .............. 710/15

FOREIGN PATENT DOCUMENTS

| JP | 03-150614 A | 6/1991 |
| JP | 03-164828 A | 7/1991 |
| JP | 5-108283 | 4/1993 |
| JP | 05-324251 A | 12/1993 |
| JP | 6-022063 A | 1/1994 |
| JP | 6-59833 | 3/1994 |
| JP | 06-119135 A | 4/1994 |
| JP | 06-161685 A | 6/1994 |
| JP | 7-177158 A | 7/1995 |
| JP | 7-200203 | 8/1995 |
| JP | 7-210345 | 8/1995 |
| JP | 7-219729 A | 8/1995 |
| JP | 7-261955 | 10/1995 |
| JP | 7-319648 A | 12/1995 |
| JP | 08-006884 A | 1/1996 |
| JP | 8-139837 A | 5/1996 |
| JP | 8-204869 A | 8/1996 |
| JP | 8-305516 A | 11/1996 |
| JP | 09-044435 A | 2/1997 |

OTHER PUBLICATIONS

IBM Corp., "NetCube for NetFinity", Windows 95, Windows NT Edition, Version 1.2, 1997, pp. 31-34 (with.partial English translation is attached).

Japanese "Office Action", dated Jun. 10, 2008, for counterpart Japanese Patent Application No. 09-146082 (Appeal No. 2005-07058).

English Translation of Japanese "Office Action" dated Jun. 10, 2008, for counterpart Japanese Patent Application No. 09-146082 (Appeal No. 2005-07058).

* cited by examiner

FIG. 11

| APPARATUS | DRIVER | ADDRESS | PHONE | SPECIFICATION |
|---|---|---|---|---|
| PRINTER A | PRINTER DRIVER A | XX.XX.XX | | ASC/J, 6ppm, 400dpi |
| PRINTER B | PRINTER DRIVER B | XX.XX.XX | | ASC/J, 12ppm, 600dpi |
| PRINTER C | PRINTER DRIVER A | XX.XX.XX | | PS, 6ppm, 400dpi |
| FAX | PRINTER DRIVER A | XX.XX.XX | | ASC/J, 4ppm, 200dpi |
| COPYING MACHINE A | PRINTER DRIVER B | XX.XX.XX | | ASC/J, 20ppm, 400dpi |
| COPYING MACHINE B | PRINTER DRIVER A | XX.XX.XX | | ASC/J, 25ppm, 400dpi |

FIG. 15

| APPARATUS | DRIVER | ADDRESS | PHONE | SPECIFICATION |
|---|---|---|---|---|
| PRINTER A | PRINTER DRIVER A | XX.XX.XX.XX | | ASC/J, 6ppm, 400dpi |
| PRINTER B | PRINTER DRIVER B | XX.XX.XX.XX | | ASC/J, 12ppm, 600dpi |
| PRINTER C | PRINTER DRIVER A | XX.XX.XX.XX | | PS, 6ppm, 400dpi |
| FAX | FAX DRIVER A | XX.XX.XX.XX | XX-XXXX | FAX14400bps |
| FAX | PRINTER DRIVER A | XX.XX.XX.XX | | ASC/J, 4ppm, 200dpi |
| COPYING MACHINE A | PRINTER DRIVER B | XX.XX.XX.XX | | ASC/J, 20ppm, 400dpi |
| COPYING MACHINE A | FAX DRIVER A | XX.XX.XX.XX | XX-XXXX | FAX14400bps |
| COPYING MACHINE B | PRINTER DRIVER A | XX.XX.XX.XX | | ASC/J, 25ppm, 400dpi |
| COPYING MACHINE B | FAX DRIVER B | XX.XX.XX.XX | XX-XXXX | FAX14400bps |
| PERSONAL COMPUTER A | FAX DRIVER A | XX.XX.XX.XX | XX-XXXX | FAX14400bps |

FIG. 21

| APPARATUS | DRIVER | ADDRESS | PHONE | SPECIFICATION | FUNCTION OF PRINTER | FUNCTION OF FAX | FUNCTION OF SCANNER |
|---|---|---|---|---|---|---|---|
| PRINTER A | PRINTER DRIVER A | XX.XX.XX | | ASC/J, 6ppm, 400dpi | PROVIDED | | |
| PRINTER B | PRINTER DRIVER B | XX.XX.XX | | ASC/J, 12ppm, 600dpi | PROVIDED | | |
| PRINTER C | PRINTER DRIVER A | XX.XX.XX | | PS, 6ppm, 400dpi | PROVIDED | | |
| FAX | FAX DRIVER A | XX.XX.XX | XX-XXXX | FAX14400bps | | PROVIDED | |
| FAX | SCANNER DRIVER A | XX.XX.XX | | 400dpi | | | PROVIDED |
| FAX | PRINTER DRIVER A | XX.XX.XX | | ASC/J, 4ppm, 200dpi | PROVIDED | | |
| COPYING MACHINE A | PRINTER DRIVER B | XX.XX.XX | | ASC/J, 20ppm, 400dpi | PROVIDED | | |
| COPYING MACHINE A | SCANNER DRIVER A | XX.XX.XX | | 400dpi | | | PROVIDED |
| COPYING MACHINE A | FAX DRIVER A | XX.XX.XX | XX-XXXX | FAX14400bps | | PROVIDED | |
| COPYING MACHINE B | PRINTER DRIVER A | XX.XX.XX | | ASC/J, 25ppm, 400dpi | PROVIDED | | |
| COPYING MACHINE B | SCANNER DRIVER B | XX.XX.XX | | 400dpi | | | PROVIDED |
| COPYING MACHINE B | FAX DRIVER B | XX.XX.XX | XX-XXXX | FAX14400bps | | PROVIDED | |
| SCANNER A | SCANNER DRIVER A | XX.XX.XX | | 400dpi | | | PROVIDED |
| SCANNER B | SCANNER DRIVER B | XX.XX.XX | | 400dpi | | | PROVIDED |
| PC SERVER | FAX DRIVER A | XX.XX.XX | XX-XXXX | FAX14400bps | | PROVIDED | |

FIG. 27

| PLACE OF BUSINESS A | × |

DOCUMENT TRANSMISSION

| D. 6, S. 6 | 6 F |
| D. 5, S. 5 | 5 F |
| D. 4, S. 4 | 4 F |
| D. 3, S. 3 | 3 F |
| D. 2, S. 2 | 2 F |
| D. 1, S. 1 | 1 F |

SELECTED FLOOR : 1F
NAME OF DEPARTMENT : DEPARTMENT 1, SECTION 1

[ O K ]　[ RETURN ]　[ CANCEL ]

FIG. 28

| DOCUMENT TRANSMISSION ( PAPER + BIT MAP ) | × |
| DOCUMENT TRANSMISSION ( BIT MAP ) |
| DOCUMENT TRANSMISSION ( PAPER ) |

PRINTER A
PRINTING

COPYING MACHINE B
PRINTABLE

PRINTER C
POWER OFF

FAX
PRINTING

PRINTER B
PRINTABLE

COPYING MACHINE A
PAPER JAM

SELECTED TRANSMISSION DESTINATION : COPYING MACHINE A
COPYING MACHINE A : ASC/J, 20 SHEETS/MIN, 400 dpi
PAPER JAM AT AREA 2

[ O K ]　[ CANCEL ]

FIG. 31

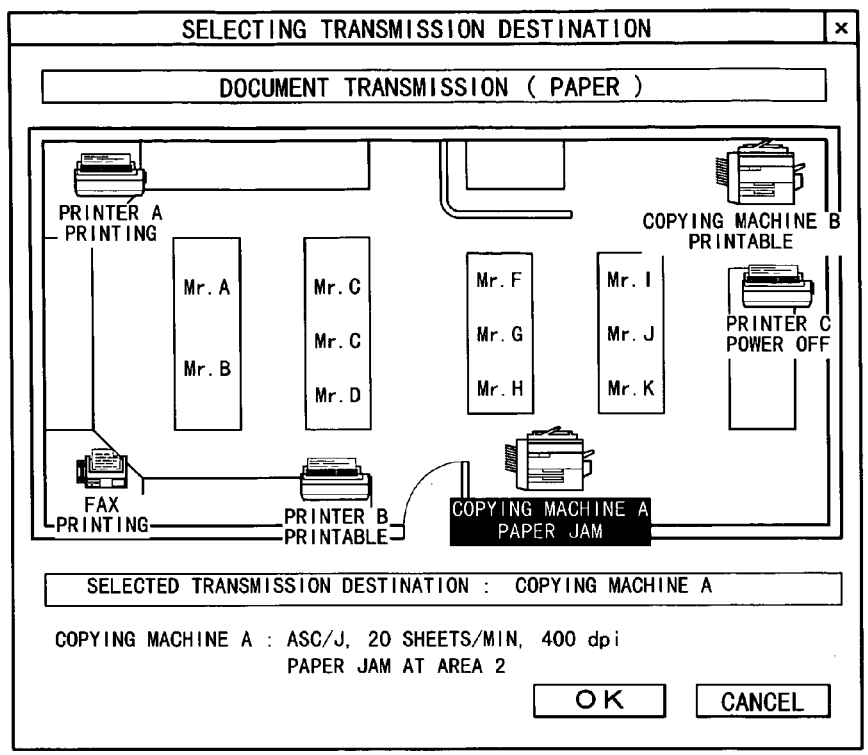

FIG. 32

| NAME | APPARATUS | DRIVER | ADDRESS | PHONE | E-MAIL ADDRESS |
|---|---|---|---|---|---|
| Mr. A | PRINTER A | PRINTER DRIVER A | XX.XX.XX | | |
| Mr. A | FAX | FAX DRIVER A | XX.XX.XX | XX-XXXX | |
| Mr. A | COMPUTER A | | XX.XX.XX | | XXXX@XX.XX.XX |
| Mr. B | FAX | FAX DRIVER A | XX.XX.XX | XX-XXXX | |
| Mr. B | PRINTER B | PRINTER DRIVER A | XX.XX.XX | | |
| Mr. B | COMPUTER B | | XX.XX.XX | | XXXX@XX.XX.XX |
| : | : | : | : | : | : |
| : | : | : | : | : | : |
| Mr. K | COPYING MACHINE A | PRINTER DRIVER B | XX.XX.XX | | |
| Mr. K | COPYING MACHINE B | PRINTER DRIVER A | XX.XX.XX | | |
| Mr. K | PRINTER C | PRINTER DRIVER A | XX.XX.XX | | |
| Mr. K | FAX | FAX DRIVER A | XX.XX.XX | XX-XXXX | |
| Mr. K | COMPUTER C | | XX.XX.XX | | XXXX@XX.XX.XX |

FIG. 50

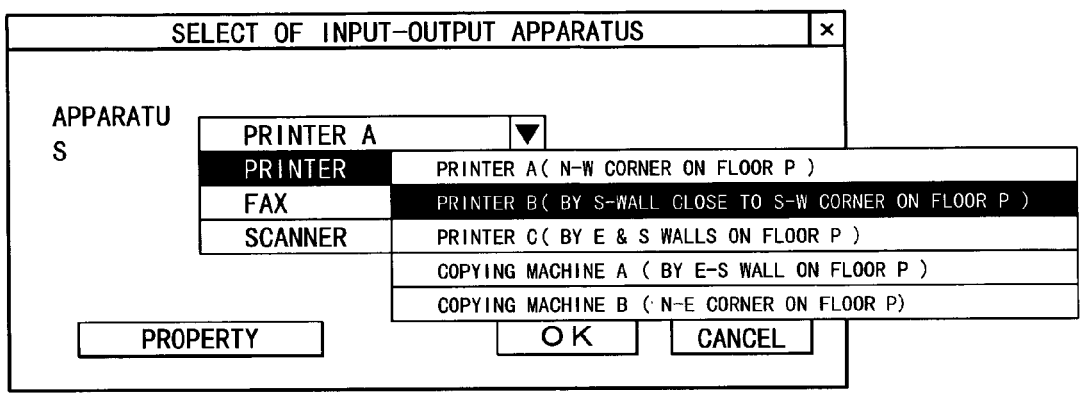

FIG. 51

| APPARATUS | LOCATION |
|---|---|
| PRINTER A | AT THE NORTH-WEST CORNER ON FLOOR P |
| PRINTER B | BY THE SOUTH WALL CLOSE TO THE SOUTH - WEST CORNER ON FLOOR P |
| PRINTER C | BY THE EAST AND SOUTH WALLS ON FLOOR P |
| FAX | AT THE SOUTH - WEST CORNER ON FLOOR P |
| COPYING MACHINE A | BY THE EAST AND SOUTH WALLS ON FLOOR P |
| COPYING MACHINE B | AT THE NORTH - EAST CORNER ON FLOOR P |
| SCANNER A | BY THE NORTH WALL ON FLOOR P |
| SCANNER B | BY THE WEST WALL ON FLOOR P |
| PERSONAL COMPUTER A | BY THE NORTH WALL ON FLOOR P |

INPUT-OUTPUT APPARATUS SELECTING METHOD FOR NETWORK SYSTEM

This application is based on applications No. H9-146080, H9-146081, H9-146082 and H9-146083 filed in Japan, the contents of which are hereby incorporated by reference.

BACKGROUND OF THE INVENTION

1. Field of the Invention

The present invention relates to an input-output apparatus selecting method to be adopted in a network system connecting computers and input-output apparatuses to each other as well as relates to a machine readable medium for recording a program prescribing the method.

2. Description of the Prior Art

In a network system wherein a plurality of computers are connected to each other by communication cables and the like, normally, a plurality of input-output apparatuses are also connected to the network system in addition to the computers. The network system allows connection of a number of categories of input-output apparatus such as printers, scanners, facsimile apparatuses and digital copying machines to mention a few. Each of the computers connected to the network system is capable of utilizing all the input-output apparatuses. When a desired input-output apparatus can not be used due to a failure occurring therein or when a desired input-output apparatus is not immediately available because the apparatus is being used by another user, a substitute for the desired apparatus can be used. As a result, the utilization efficiency of the facilities as a whole can be increased, resulting in a reduced total cost.

Since the number of input-output apparatuses that can be used by the user is large and a screen of a computer for selecting an input-output apparatus merely displays type names of the apparatuses, on the other hand, the user selects a wrong apparatus in many cases.

FIG. 1 is a diagram showing a typical configuration of the conventional network system. As shown in the figure, personal computers and input-output apparatuses such as printers, a facsimile apparatus and digital copying machines are connected to a communication line 1 to form a LAN (Local Area Network). To be more specific, A and B personal computers 11 and 12, A, B and C printers 21, 22 and 23, a facsimile apparatus (FAX) 31 and A and B digital copying machines 41 and 42 are connected to the communication line 1 of the LAN in this typical configuration.

The communication line 1 is implemented by a concrete means such as a communication cable, radio communication or an optical fiber.

Data generated by each of the A and B personal computers 11 and 12 to be printed is temporarily put in a spool thereof before being transmitted later to one of the A, B and C printers 21, 22 and 23 connected to the LAN by way of the communication line 1 in accordance with scheduling.

FIG. 2 is a diagram showing the configuration of the A personal computer 11. It should be noted that, since the B personal computer 12 has the same configuration as the A personal computer 11, only the configuration of the latter is shown in the figure. As shown in FIG. 2, in addition to a CPU (Central Processing Unit) 110 and a bus 111, the A personal computer 11 comprises components such as a RAM unit 112 used as a main memory, a VRAM unit 113 used as a video memory, a hard disc unit 114, a network interface circuit 115, a display unit 116, a keyboard 117 and a mouse 118 which are connected to the CPU 110 by the bus 111. As the display unit 116, a component such as a CRT, a liquid crystal display unit or a plasma display unit can be used. The operator enters a command and input data to the A personal computer 11 typically via the keyboard 117 and the mouse 118. The mouse 118 can be replaced by any pointing device such as a tablet device, a truck ball device or a touch panel device.

The CPU 110 executes a variety of programs loaded in the RAM unit 112 to carry out various kinds of processing and to control the peripherals. The VRAM unit 113 is used for storing data such as images and characters to be displayed on the display unit 116. A hard disc incorporated in the hard disc unit 114 is used for storing a variety of programs and various kinds of data in a variety of files to be loaded to the RAM unit 112. The network interface circuit 115 is an interface between the A personal computer 11 and the communication line 1 of the LAN. To put it in detail, the A personal computer 11 exchanges data with the input-output apparatuses and the other B personal computer 12 connected to the LAN through the network interface circuit 115.

FIG. 3 is a diagram showing a hierarchical structure of pieces of software, that is, programs and pieces of data, which are loaded into the RAM unit 112. In the hierarchical structure, the lower the level of a layer, the closer the layer to hardware. The software layer at the highest level is an ordinary application program such as a word processor, a tabular computation program, a data base or a CAD program. When a command such as a request for printing is issued by a piece of such application software, a screen for selecting an output apparatus such as a dialog box is displayed, allowing the user to specify a printer or another output apparatus to which data is to be printed. Such a screen corresponds to an input-output apparatus selecting program at a level beneath the application program in the hierarchical software structure.

At a level below the input-output apparatus selecting program, there exists an OS (operating system). An application program and an input-output apparatus selecting program at levels higher than the OS run, making use of system calls and interface programs provided by the OS. At a level beneath the OS, there exist a variety of drivers for use by the OS in controlling the input-output apparatuses. The drivers include printer drivers for controlling the A, B and C printers 21 to 23, a scanner driver for controlling a scanner not shown in FIG. 1 and a FAX driver for controlling the facsimile apparatus 31.

A SPOOL (Simultaneous Peripheral Operation On-Line) program temporarily accumulates data output by a printer driver to be printed on one of the printers 21 to 23 connected to the LAN in the hard disc unit 114 employed in the A personal computer 11. Later on, the data is transmitted to the printer in accordance with scheduling. A protocol control program controls a communication protocol for transmitting data to an output apparatus such as the printers 21 to 23 and the FAX apparatus 31 connected to the LAN and receiving data from an input apparatus on the LAN such as the scanner. The protocol control program creates a command for putting data in a packet of a protocol such as the TCP/IP.

FIG. 4A is a diagram showing a printing dialog box which is displayed on a screen when an application program issues a print command. The printing dialog box allows the user to set various kinds of data related to printing. As shown in the figure, a range of pages of data to be printed and the number of printed copies can be set on the right hand side of the printing dialog box. On the left hand side, on the other hand, the name of a printer to which data is to be printed is displayed along with information unique to the printer such as status, the model number and connection of the printer. A printer serving as an output destination can be changed by clicking the display area of the printer name or a triangular mark placed at an adjacent location on the right side of the display area being pointed to by a mouse cursor.

When the display area of the printer name or the adjacent triangular mark on the printing dialog box is clicked, a list of the names of available printers is displayed below the display area of the printer name as shown in FIG. 4B. A desired printer to which data to be printed is to be output can be specified by clicking one of the names of the available printers on the list.

FIG. 5 is a diagram showing another example of a dialog box for setting an input-output apparatus which is displayed on the screen when an application program makes a request for setting of an input-output apparatus. The dialog box for setting an input-output apparatus allows the user to set an input apparatus as a source of an input, an output apparatus as a destination of an output, and operating conditions of an input-output apparatus set as an input source/output destination. The input-output apparatus set as an input source/output destination can be changed by clicking an area displaying the name of an input-output apparatus or a triangular mark placed at an adjacent location on the right side of the display area being pointed to by a mouse cursor. In the case of the dialog box shown in FIG. 5, a name 'Printer A' is displayed in the area.

In a method of specifying an input-output apparatus like the conventional one described above, only the name of an input-output apparatus is displayed. In the case of the dialog box shown in FIG. 5, for example, only the name 'Printer A' is displayed. Thus, the user does not know at all what location in the place of business the printer named 'Printer A' is actually installed at or whether the printer named 'Printer A' is placed at a location in close proximity to the user or somebody else. In addition, in the case of a dialog box displaying only a model number to indicate an input-output apparatus, the user also does not know whether the apparatus is a printer or another kind of equipment.

As a result, the user is prone to a mistake of specifying a printer located at a wrong location as a destination of an output. In the case of such a mistake, the user has to search some printers for the paper on which data should have been printed. In some cases, the paper searched for by the user is even lost.

In addition, in the case of a document, the contents of which have to be kept in strict confidence, care must be exercised so as to avoid a mistake in specifying an output apparatus.

Furthermore, in the case of a dialog box displaying only the model number of an input-output apparatus, it is necessary to verify the type of the apparatus.

Moreover, in the case of a multifunctional office machine connected to the network system such as a digital copying machine also provided with the functions of a printer, a facsimile apparatus and a scanner, it is also necessary to specify which function the multifunctional office machine is supposed to carry out. As a result, the operation to specify a multifunctional office machine becomes complicated, making the user prone to a mistake in selecting a machine.

In addition, in the case of a wide area network system for connecting apparatuses owned by a plurality of departments of a company or apparatuses installed on a plurality of floors of a building as assumed in some embodiments of the present invention, data may be output to an output apparatus of a wrong department or an output apparatus installed on a wrong floor.

Furthermore, in the case of transmission of a text to an individual, the screen displayed by the personal computer does not include information indicating an output apparatus installed at a location in closest proximity to the individual. Thus, another means has to be relied on in order to find an output apparatus closest to the individual. As a result, the operation becomes cumbersome and it is thus quite within the bounds of possibility that a wrong output apparatus is specified.

Moreover, in the case of specification of an input-output apparatus used as a substitute for a desired input-output apparatus which happens to be out of order, the screen displayed by the personal computer does not include information indicating a substitute installed at a location in closest proximity to the broken one. Thus, another means has to be relied on in order to find a substitute installed at a location closest to the broken one. As a result, the operation becomes cumbersome and it is thus quite within the bounds of possibility that a wrong output apparatus is specified.

In addition, in the case of a job to print an extremely large number of copies by using equipment such as a copying machine in a limited period of time which can not be achieved with the conventional copying machine, there is no function for automatically distributing the job to a plurality of output apparatuses connected to the network system.

In a printer control apparatus disclosed in Japanese Patent Laid-open No. Hei 5-108283, a time it takes to walk from a computer to each printer is stored in advance and a printer installed at a location in closest proximity to a computer issuing a printing request is selected automatically as a recipient of data to be printed.

Since the printer control apparatus does not allow the user of the computer to select an output apparatus freely at the user's own will, however, the apparatus can not be used as a solution to the problem described above.

On the other hand, a printer service displaying system disclosed in Japanese Patent Laid-open No. Hei 7-210345 displays printers, printing queues and printing jobs as icons and graphics to clarify relations among them and allows the relations to be changed.

However, the printer service displaying system does not provide a solution to the problem described above either because each icon merely indicates a printer instead of a location at which a printer is installed such as a location in a place of business.

SUMMARY OF THE INVENTION

It is an object of the present invention to allow an input-output apparatus to be selected with ease by displaying an actual layout of input-output apparatuses connected to a network system in a diagram showing places of business, floors or rooms where the apparatuses are installed.

It is another object of the present invention to allow an input-output apparatus to be specified with ease by displaying icons each representing an input-output apparatus on a layout diagram.

It is still another object of the present invention to allow an input-output apparatus to be specified hardly by mistake by displaying a layout diagram and icons on the layout diagram.

It is a further object of the present invention to make the types of input-output apparatuses easy to understand by displaying icons.

It is a still further object of the present invention to relieve the user of searching a number of printers for pieces of printing output paper by clarifying a place at which a selected printer is installed.

It is a still further object of the present invention to prevent pieces of printing output paper from being lost by clarifying a place at which a selected printer is installed.

It is a still further object of the present invention to avoid a mistake in selecting an output apparatus as a destination of a highly confidential document by clarifying a place at which the selected output apparatus is installed.

It is a still further object of the present invention to clarify the type of a selected input-output apparatus even in a case where the model number of the apparatus is displayed.

It is a still further object of the present invention to allow a function of a multifunctional office machine connected to a network to be selected with ease.

It is a still further object of the present invention to prevent data from being output to an apparatus of a wrong place of business in a wide area network system connecting a plurality of places of business or to an apparatus installed on a wrong floor in a network system connecting a plurality of floors.

It is a still further object of the present invention to allow the user to identify an output apparatus installed at a location in closest proximity to a recipient of a text or another message transmitted to the recipient with ease by displaying a layout.

It is a still further object of the present invention to allow the user to select another input-output apparatus as a substitute for a broken input-output apparatus with ease by displaying other input-output apparatuses that are capable of serving as a substitute for the broken one.

It is a still further object of the present invention to allow a large number of copies to be printed in a limited period of time by automatically distributing the printing work among a plurality of output apparatuses connected to a network system.

It is a still further object of the present invention to provide a machine readable medium for recording a program for implementing each of the functions described above in a network system.

In order to achieve the objects of the present invention described above, a layout diagram showing locations at which input-output apparatuses are installed is displayed wherein each of the apparatuses is represented by an icon.

The layout diagram can be a map showing locations of places of business or the like, a floor of a building where a place of business or the like is located or a diagram showing the layout of an office room.

In addition, on the layout diagram, the status and the name of each input-output apparatus are displayed at positions in close proximity to the input-output apparatus.

Other objects, features and advantages besides those discussed above are apparent to those skilled in the art from description of preferred embodiments that follows. In the description, reference is made to accompanying drawings which form a part thereof and illustrate examples of the present invention. Such examples, however, are not exhaustive of the various embodiments of the present invention and, therefore, reference should be made to claims which follow the description for determining the scope of the present invention.

BRIEF DESCRIPTION OF THE DRAWINGS

The accompanying drawings, which are incorporated in and constitute a part of the specification, illustrate embodiments of the present invention and, in conjunction with the description, serve to explain the principles of the invention.

FIG. 11 shows an apparatus information table of the first embodiment;

FIG. 15 shows an apparatus information table of the third embodiment;

FIG. 21 shows an apparatus information table of the fourth embodiment;

FIG. 27 is a layout diagram showing locations of departments of one of the places of business in the fifth embodiment;

FIG. 28 is a diagram illustrating a screen displaying a dialog box for selecting a transmission destination for receiving paper outputs according to a sixth embodiment;

FIG. 31 is a diagram illustrating a screen displaying a dialog box for selecting an apparatus as a transmission destination according to a seventh embodiment;

FIG. 32 shows an apparatus information table of the seventh embodiment;

FIG. 50 is a diagram illustrating a dialog box for selecting an input-output apparatus according to an eleventh embodiment;

FIG. 51 is a table of information in the eleventh embodiment to be added typically to an apparatus information table like the one shown in FIG. 21;

DETAILED DESCRIPTION OF THE PREFERRED EMBODIMENTS

The present invention will become more apparent from the following detailed description of some preferred embodiments with reference to the accompanying figures listed above.

First Embodiment

Figure 6:
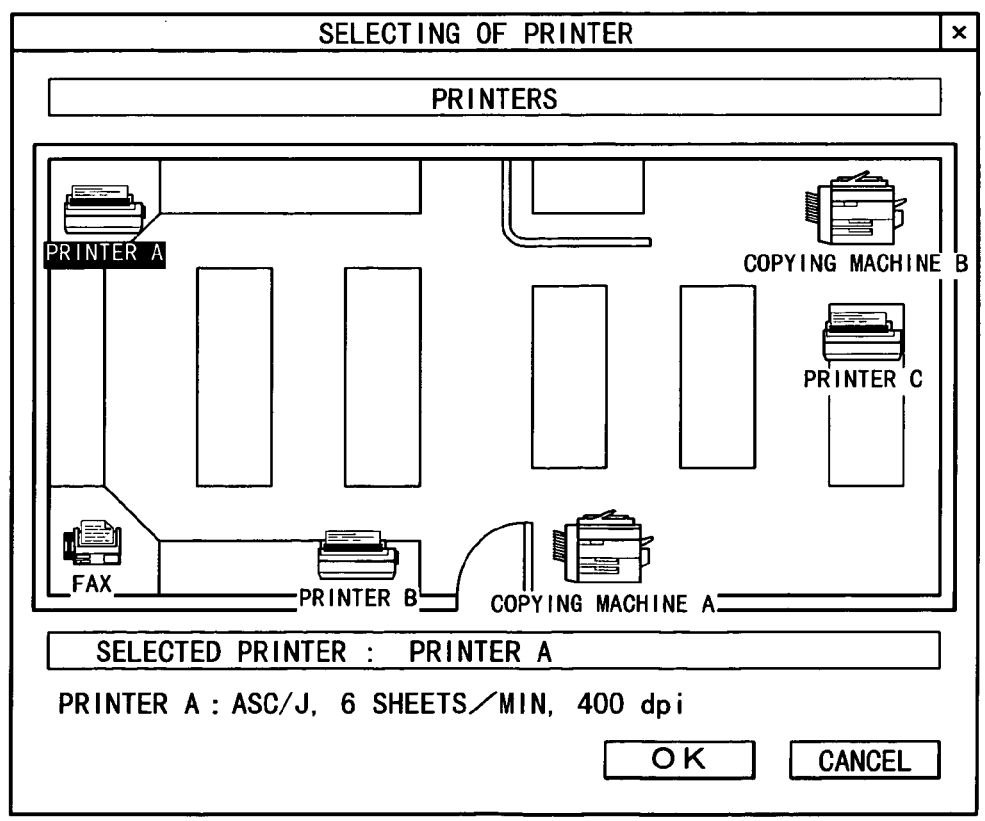
FIG. 6 is a diagram illustrating a screen displaying a printing dialog box for selecting a printer in the first embodiment.

FIG. 6 is a diagram illustrating a screen displaying a printing dialog box for selecting a printer according to the first embodiment. A layout diagram of things including a place of business where printers connected to a LAN are laid out is shown at the center of the figure. The layout diagram shows an actual layout of office walls, doors, tables and single-leaf screens to mention a few. At each location where a printer is actually installed, an icon representing the printer is displayed. Beneath the icon, the apparatus name given to the printer is displayed. Since the layout of icons each representing a printer matches the actual layout of the printers in the place of business, the relation associating icons with printers is easy to understand. It should be noted that, in general, the shape of an icon is a symbolic expression of an object represented by the icon.

The icons are used to represent also apparatuses other than the A to C printers 21 to 23 respectively. To be more specific, the icons are used to represent also the facsimile apparatus 31, the A digital copying machine 41 and the B digital copying machine 42 because these other apparatuses each have a printer function as well. The shapes of the icons representing these other apparatuses 31, 41 and 42 are the same as the icon representing a printer. When the user clicks an icon at a desired location, the icon is put in a selected state. An icon in a selected state or the apparatus name associated with the selected icon is put in an inverted display state to indicate that the user has selected the apparatus represented by the icon. In the dialog box shown in FIG. 6, it is the apparatus name that is put in an inverted display state. It should be noted, however, that that dialog box can be designed so that it is the icon that is put in an inverted display state instead of the apparatus name. As an alternative, both the apparatus name and the icon can be put in an inverted display state.

In addition, the apparatus name of an apparatus represented by a selected icon is also displayed on a field 'Selected Printer' beneath the layout diagram in the dialog box. Below the field 'Selected Printer', unique information on characteristics of the apparatus such as specifications of the apparatus including a control code system, a printing speed and a printing resolution is displayed. In order to change the selected icon, a newly desired icon is just clicked. In this case, the icon previously selected is released from the selected state while the icon newly selected is put in a selected state instead. With an icon selected, clicking an 'OK' button at the bottom of the dialog box confirms an apparatus represented by the selected icon as an output apparatus, erasing the printer selecting dialog box shown in FIG. 6 from the screen. Then, a printing dialog box shown in FIG. 4 is displayed again on the screen. If a 'Cancel' button at the bottom of the dialog box shown in FIG. 6 is clicked, on the other hand, the printer selecting dialog box is restored without selecting any apparatus. It should be noted that an X mark at the right top corner of the dialog box has the same effect as the 'Cancel' button.

Figure 7:
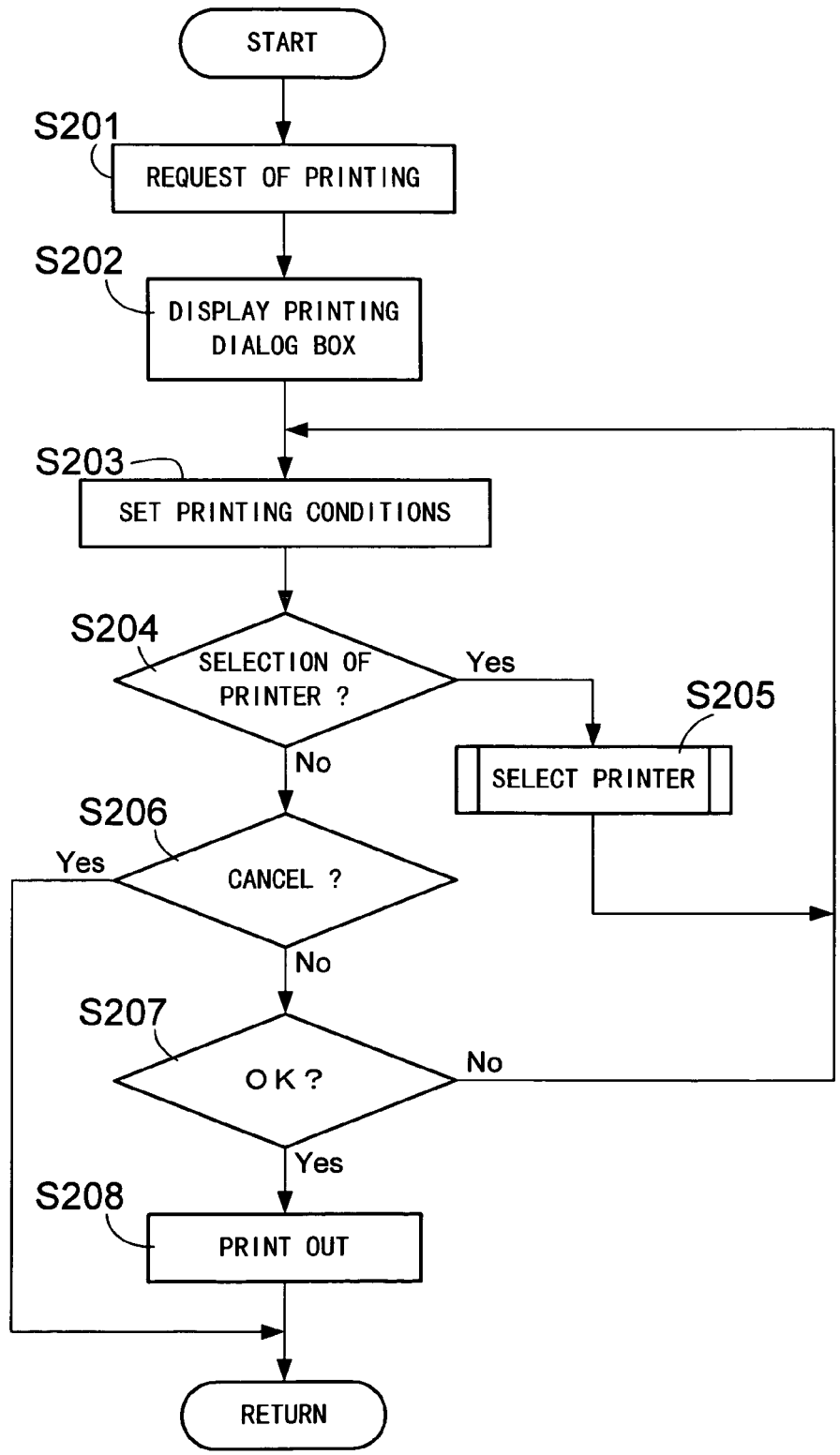
FIG. 7 shows a flowchart representing operations of the first embodiment.

FIG. 7 is a flowchart showing the flow of processing carried out in the first embodiment. As shown in the figure, the flowchart begins with a step S201 at which the user makes a request for printing through an application program such as a word processor or a tabular calculation program. The flow of processing then goes on to a step S202 at which the application program displays a printing dialog box shown in FIG. 4 on the screen. Then, the flow of processing proceeds to a step S203 to display fields used by the user to set printing conditions such as a printing range and the number of copies on the printing dialog box. Subsequently, the flow of processing continues to a step S204 to form a judgment as to whether or not a display area of a printer name or a triangular mark adjacent thereto on the printing dialog box has been clicked. If the display area or the triangular mark has been clicked, the flow of processing goes on to a step S205. If neither the area nor the mark has been clicked, on the other hand, the flow proceeds to a step S206. At the step S205, a printer selecting program for carrying out processing of the printer selecting dialog box shown in FIG. 6 is called. The processing carried out by the printer selecting program will be described in detail later by referring to a flowchart shown in FIG. 8. After completing the processing carried out at the step S205, the flow of processing returns to the step S203.

As described above, if the outcome of the judgment formed at the step S204 indicates that neither the display area nor the triangular mark has been displayed, the flow of processing goes on to the step S206 to form a judgment as to whether or not the 'Cancel' button has been clicked. If the 'Cancel' button has been clicked, the control is returned to the calling program without doing anything. If the 'Cancel' button has not been clicked, on the other hand, the flow of processing goes on to a step S207 to form a judgment as to whether or not the 'OK' button has been clicked. If the 'OK' button has been clicked, the flow of processing proceeds to a step S208 at which printing is carried out to output data to the printer set as an output destination. Then, the control is returned to the calling program. If the 'OK' button has not been clicked, on the other hand, the flow of processing returns to the step S203. The steps S203 to S207 form a loop waiting for an event. The flow of processing will never leave the loop till either the 'Cancel' button or the 'OK' button is clicked.

Figure 8:
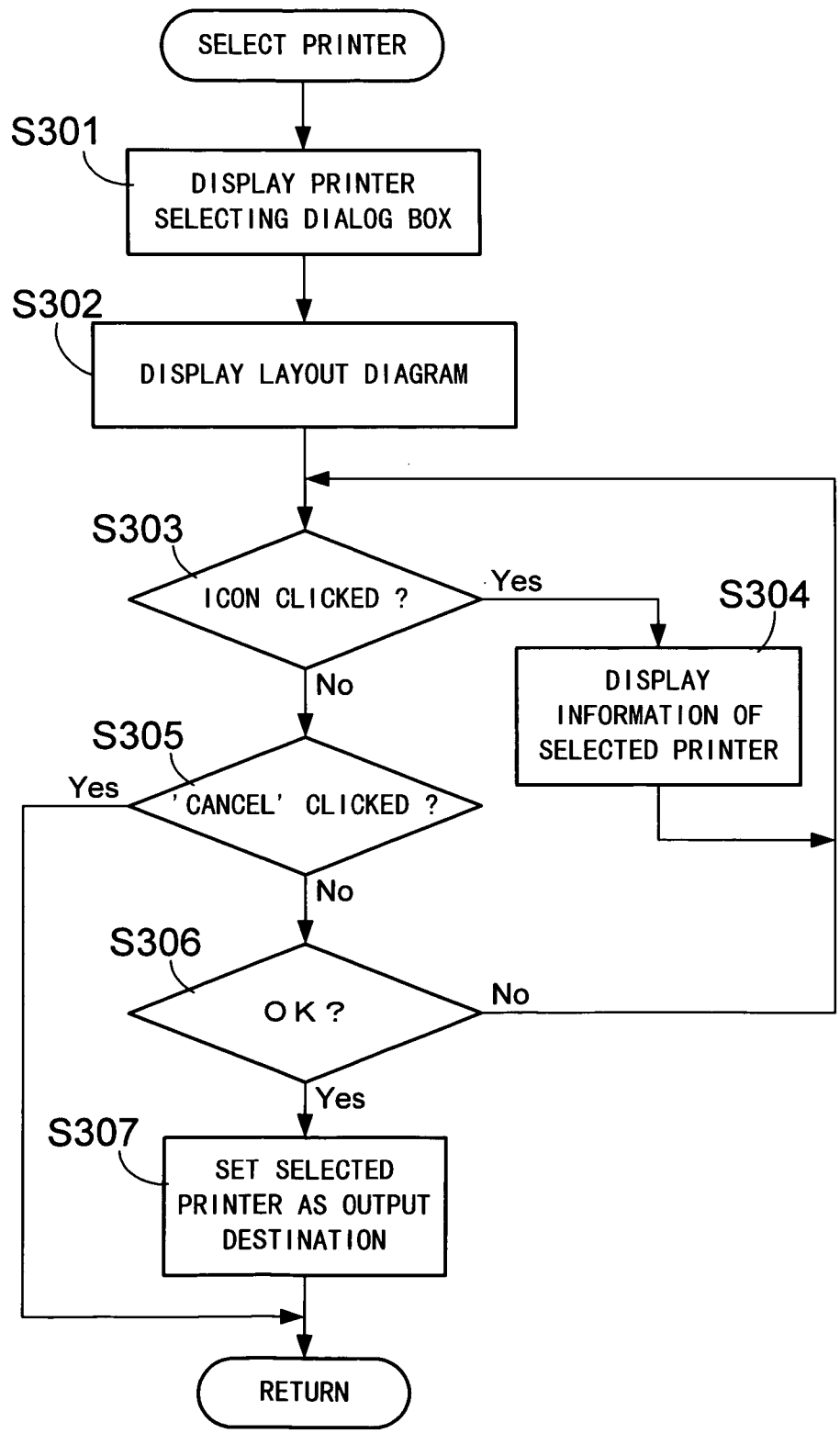
FIG. 8 shows a flowchart representing an operation carried out at a step S205 of the flowchart shown in FIG. 7.

FIG. 8 shows a flowchart representing processing carried out by the printer selecting program which is called at the step S205 of the flowchart shown in FIG. 7. As shown in FIG. 8, the flowchart begins with a step S301 at which a dialog box for selecting a printer is displayed when the printer selecting program is called. The flow of processing then goes on to a step S302 to display a layout diagram of, among other things, a place of business where printers are installed at the center of the printer selecting dialog box. Image data displayed on the layout diagram is created in advance by a layout making program and stored in the hard disc unit 114 employed in the A personal computer 11. On the layout diagram, icons each representing a printer are displayed at positions corresponding to the installation locations of the printers.

Then, the flow of processing proceeds to a step S303 to form a judgment as to whether or not one of the icons has been clicked. If one of the icons has been clicked, the flow of processing continues to a step S304 at which the clicked icon is put in a selected state and unique information on characteristics of the printer is acquired and displayed on the screen. The unique information is extracted from an apparatus information table like one shown in FIG. 11. The apparatus information table is also stored in the hard disc unit 114. The flow of processing then returns from the step S304 to the step S303. If the outcome of the judgment formed at the step S303 indicates that no icon has been clicked, on the other hand, the flow of processing continues to a step S305 to form a judgment as to whether or not the 'Cancel' button has been clicked. If the 'Cancel' button has been clicked, the control is returned to the calling program without doing anything.

If the outcome of the judgment formed at the step S305 indicates that the 'Cancel' button was not clicked, on the other hand, the flow of processing goes on to a step S306 to form a judgment as to whether or not the 'OK' button has been clicked. If the 'OK' button has been clicked, the flow of processing proceeds to a step S307 to confirm the selection of a printer represented by the clicked icon, setting the printer as an output destination. Then, the control is returned to the calling program. If the 'OK' button has not been clicked, on the other hand, the flow of processing returns to the step S303. The steps S303 to S306 form a loop waiting for an event. The flow of processing will never leave the loop till either the 'Cancel' button or the 'OK' button is clicked.

Figure 9:
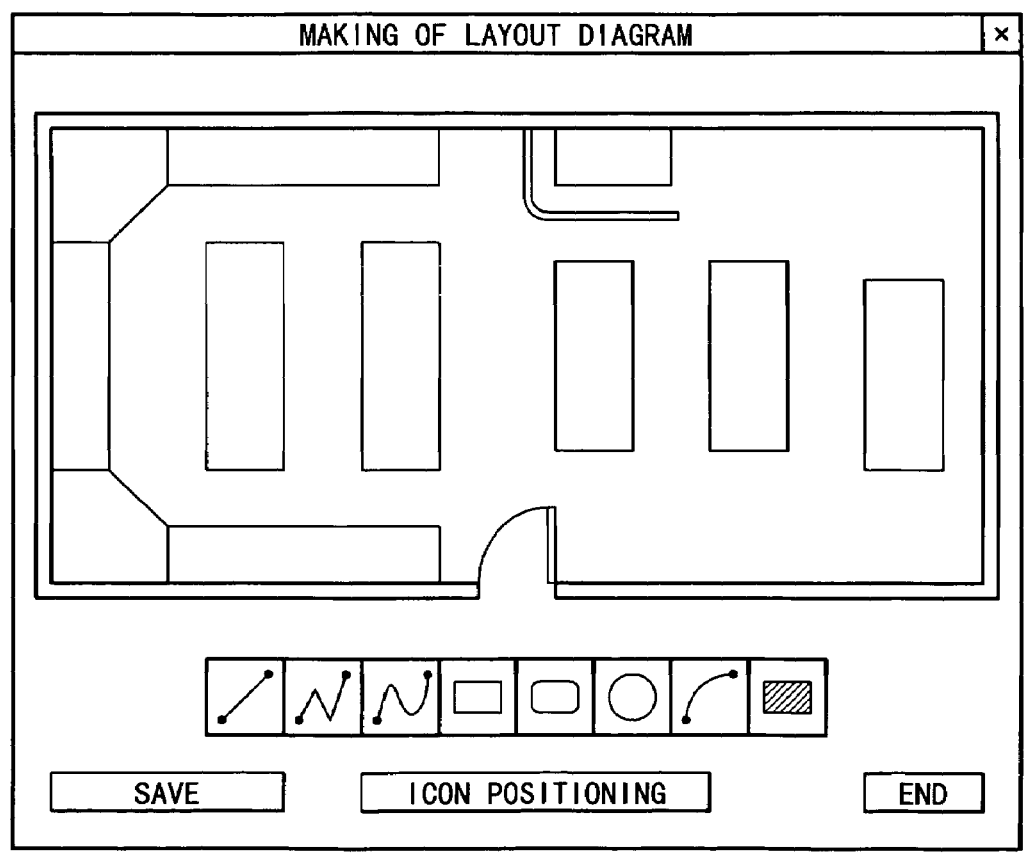
FIG. 9 shows a layout diagram to be created by a layout making program of the first embodiment.

FIG. 9 shows a layout diagram to be created by the layout making program. As described above, the layout diagram shows a layout of, among other things, a place of business where printers are installed. When the layout making program is executed, a window like the one shown in FIG. 9 is displayed. The layout making program is similar to an ordinary image making program. A proper tool is selected from those displayed as icons at the lower portion of the window in order to draw a layout diagram of, among other things, a place of business. An actual layout of things such as office walls, doors, tables and single-leaf screens is drawn on the diagram.

When a 'Save' button shown at the bottom of the window is clicked, data of the drawn layout diagram is saved in the hard disc unit 114 or another memory with a proper file name given thereto. When an 'Icon Positioning' button is clicked, the process of making the layout diagram proceeds to a window shown in FIG. 10 for positioning an icon on the layout diagram. When an 'End' button is clicked, the execution of the layout making program is terminated. If the layout diagram presently being made has not been saved yet at that time, an query is displayed to ask the user if data of the layout diagram should be saved. By responding to the query, the data can be saved as described above.

Figure 10:
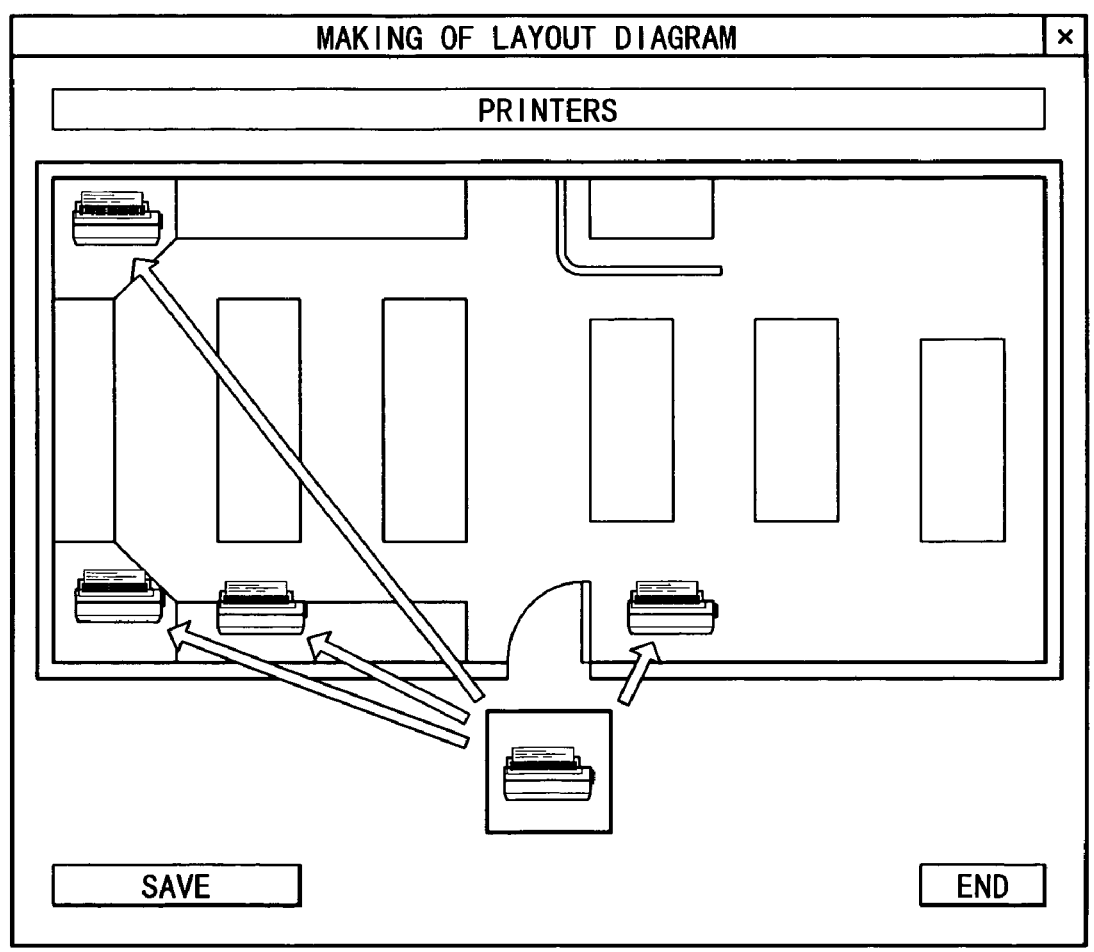
FIG. 10 is a diagram showing a window for positioning icons each representing a printer in the first embodiment on the layout diagram.

FIG. 10 is a diagram showing a window for positioning an icon on a layout diagram. The layout diagram shown in FIG. 9 is displayed on the window with a printer icon displaying area shown on the lower part of the window. A printer icon is clicked and dragged with the click button remaining clicked from the printer icon displaying area to a position corresponding to a location at which the printer represented by the icon is actually installed. When the click button is released, the printer icon is fixed at the position. The process to drag an icon and release the click button is referred to as a drag-and-drop operation. The drag-and-drop operation is carried out repeatedly to position icons representing all printers on the layout diagram. An icon is double clicked after the icon positioning process to enter information on an apparatus represented by the icon such as an apparatus name, a driver name, an address in a network and specifications of the apparatus. The information on apparatuses entered in this way is stored in the hard disc unit 114 as an apparatus information table like the one shown in FIG. 11.

The operation to enter information on apparatuses for all positioned icons completes the process of making the layout diagram. When the 'Save' button is clicked, data of the layout diagram is saved in the hard disc unit 114 with a predetermined file name given thereto. Then, the 'End' button is clicked to terminate the execution of the layout making program. The finally saved data of the layout diagram includes information related to the display of each icon such as the position of the icon, the apparatus name and the shape of the icon. The printer selecting program displays a layout diagram like the one shown in FIG. 6 based on the data of the layout diagram which includes information related to the display of each icon.

In the first embodiment described above, a layout diagram of things such as a place of business where printers are installed is displayed in a printer selecting dialog box. On the layout diagram, icons each representing a printer are placed at positions corresponding to locations in the place of business at which printers represented by the icons are actually installed. Since the positions of the icons correspond to locations in the place of business at which printers represented by the icons are actually installed, a relation associating the locations of the icons with those of the printers is easy to understand, resulting in an effect that an output apparatus desired by the user can be specified correctly with ease.

Second Embodiment

Figure 12:
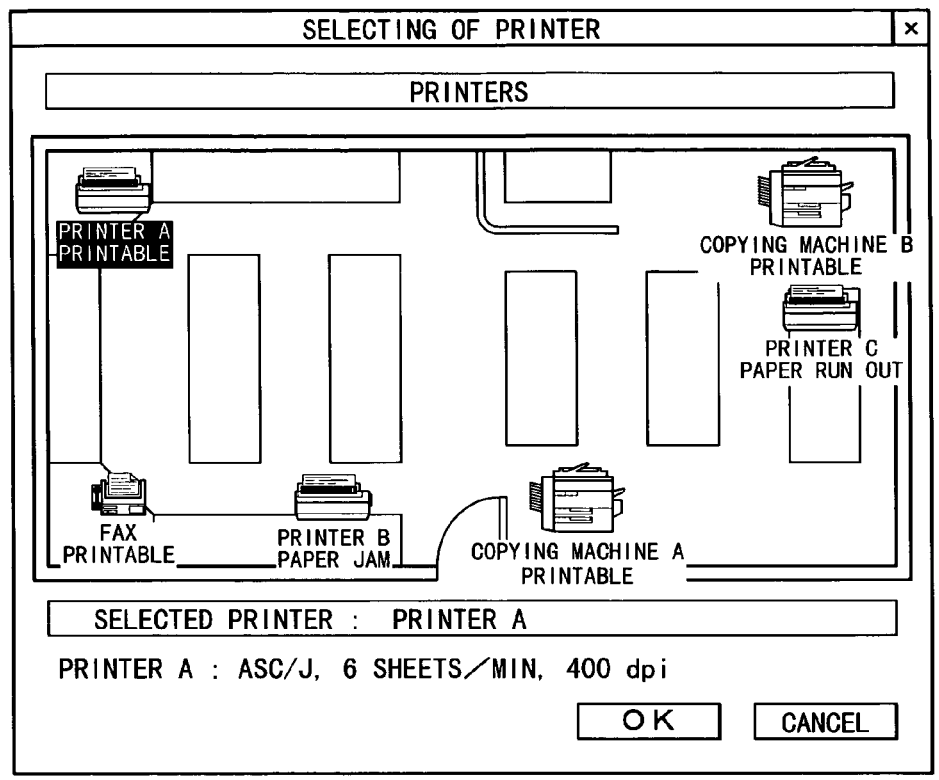
FIG. 12 is a diagram illustrating a screen displaying a printing dialog box for selecting a printer in the second embodiment.

Next, a second embodiment is explained. The basic configuration of the second embodiment is the same as the first embodiment except that, in the case of the former, a dialog box for selecting a printer like the one shown in FIG. 12 is displayed. In the dialog box shown in FIG. 12, the status of each printer is displayed at a location in close proximity to an icon representing the printer. The status of a printer which is typically displayed beneath the apparatus name of an icon representing the printer is the present state of the printer including 'printable', 'printing under way', 'paper jam', 'paper running out' and 'power supply off'. The status does not have to be displayed beneath the apparatus name, but it can be displayed at any location as far as the location is in close proximity to the icon. In addition, an icon may be displayed in a color such as red, blue or yellow in accordance with the status of a printer represented by the icon.

Figure 1:
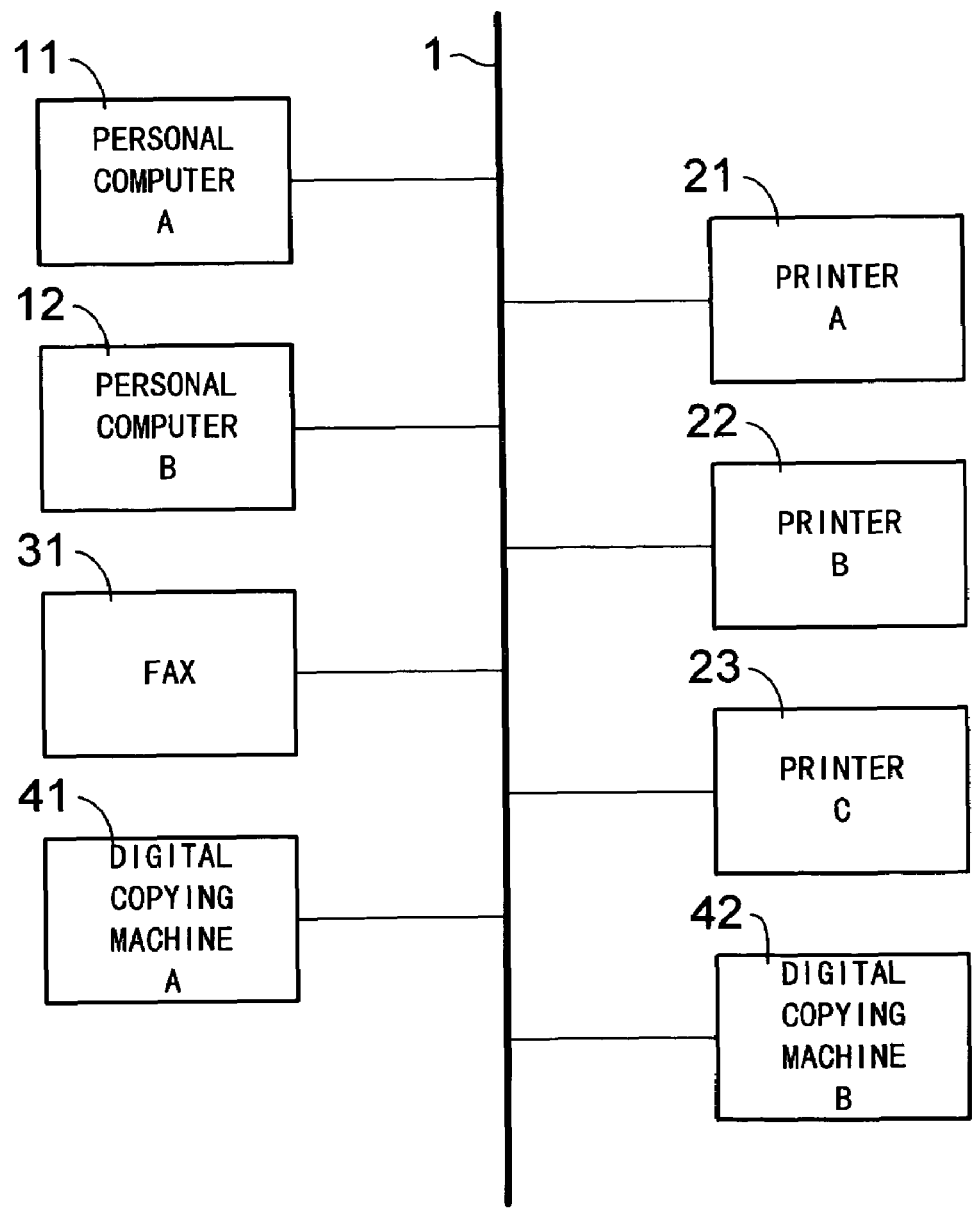
FIG. 1 is a block diagram showing the conventional network system and a network system implemented by first, second and third embodiments of the present invention.
Figure 2:
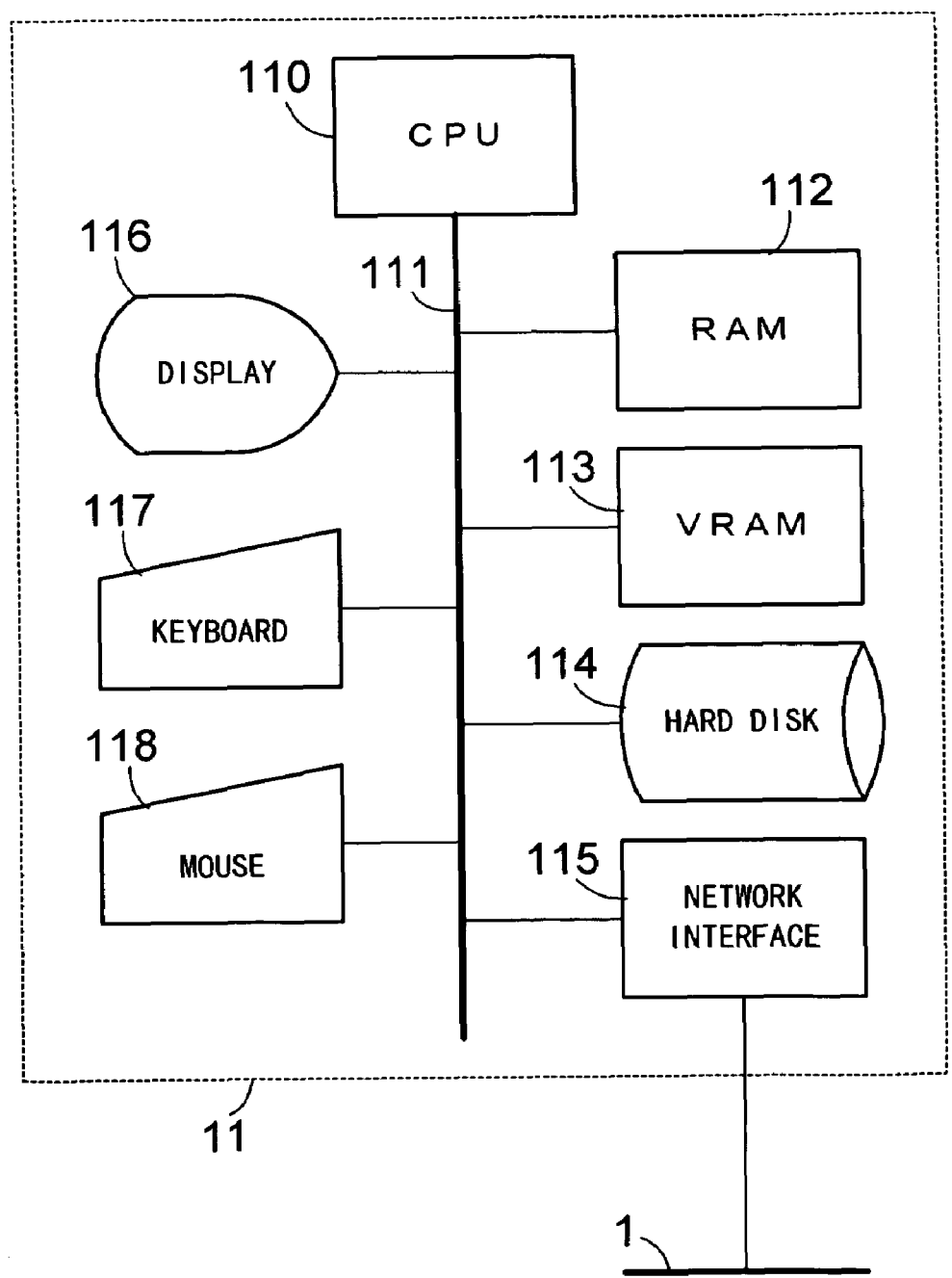
FIG. 2 is a block diagram showing a personal computer connected to the network system.
Figure 3:
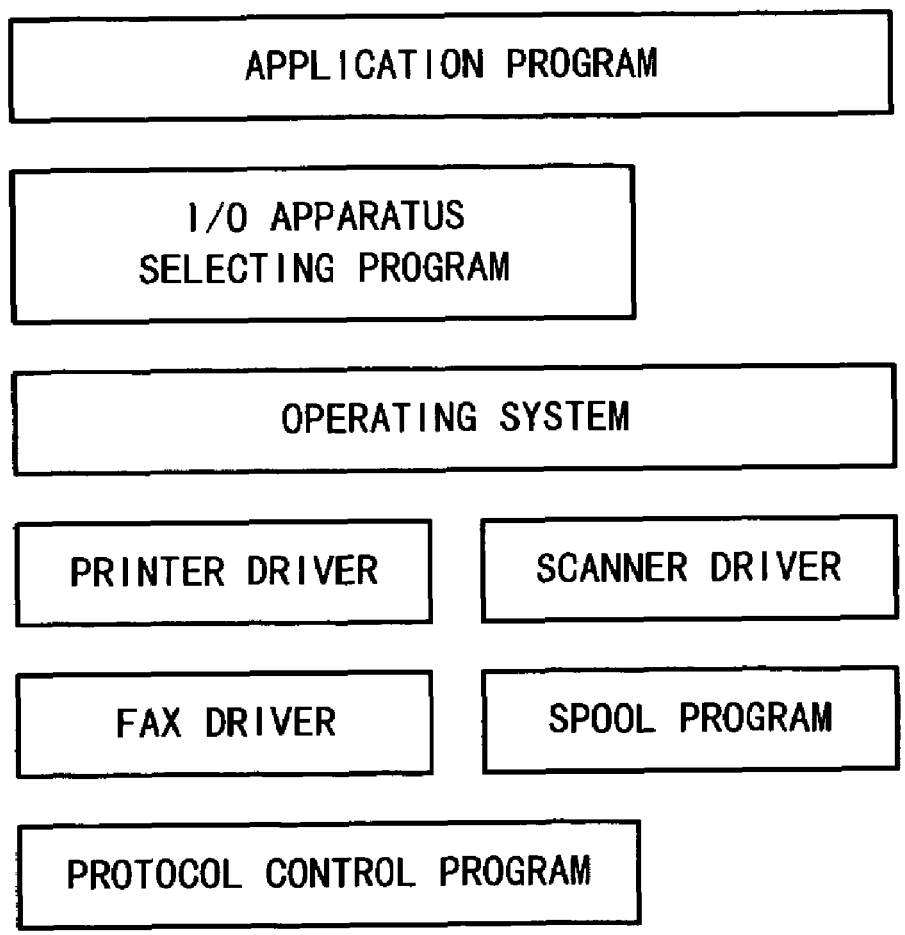
FIG. 3 is an explanatory diagram used for describing a hierarchical structure of pieces of software loaded into a memory employed in the personal computer.
Figure 13:
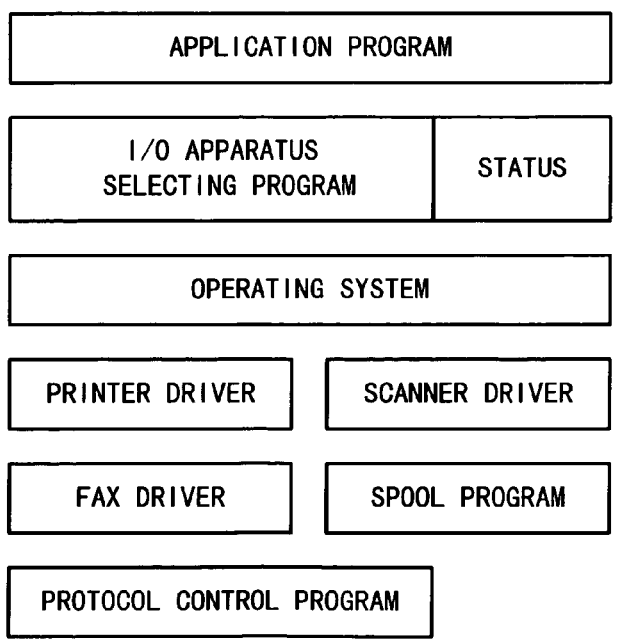
FIG. 13 is an explanatory diagram used for describing a hierarchical structure of pieces of software loaded into a memory employed in a personal computer in the second embodiment.

FIG. 13 is an explanatory diagram used for describing a hierarchical structure of pieces of software loaded into a RAM unit 112 employed in a personal computer in the second embodiment. Comparison with the hierarchical structure of the first embodiment shown in FIG. 3 indicates that only the program for selecting an input-output apparatus is different with the rest remaining the same. Thus, the explanation of the other pieces of software is not repeated. The second embodiment includes a piece of software for displaying status of input-output apparatuses as a part of the program for selecting an input-output apparatus. This apparatus status displaying program makes an inquiry about the status of each input-output apparatus periodically and displays the acquired status of each apparatus at a location in close proximity to an icon representing the apparatus. As a result, the user is capable of knowing the status of each input-output apparatus at a glance.

In the conventional method, a list of only usable printers that can be selected is merely displayed, excluding status of the printers. Thus, a printer in close proximity to the user but with a power supply thereof turned off is not included on the list, leading the user to select a printer located far away. In the case of the second embodiment, on the other hand, all printers connected to the LAN are displayed with the status of each printer shown at a location in close proximity to an icon representing the printer. As a result, a printer in close proximity to the user will not be overlooked by all means even if the power supply thereof is turned off. That is, an action can be taken by the user to first turn on the power supply and then select the printer. In this way, according to the second embodiment, the user is allowed to select an optimum printer by taking the status of each printer into consideration.

Third Embodiment

Next, a third embodiment is explained. The basic configuration of the third embodiment is the same as the first embodiment except that, in the case of the former, a dialog box for selecting a facsimile apparatus like the one shown in FIG. 14 can also be displayed. In many cases, when it is desired to output data to a facsimile apparatus, the facsimile apparatus is normally selected from a list including the apparatus instead of selecting a printer. In this case, however, the user who is not familiar with the operation to select an input-output apparatus may select a printer instead of a facsimile apparatus by mistake, outputting facsimile data to the printer. In order to avoid such a mistake, the third embodiment displays a dialog box for selecting a facsimile apparatus as an output apparatus separately from the dialog box for selecting a printer.

Figure 14:
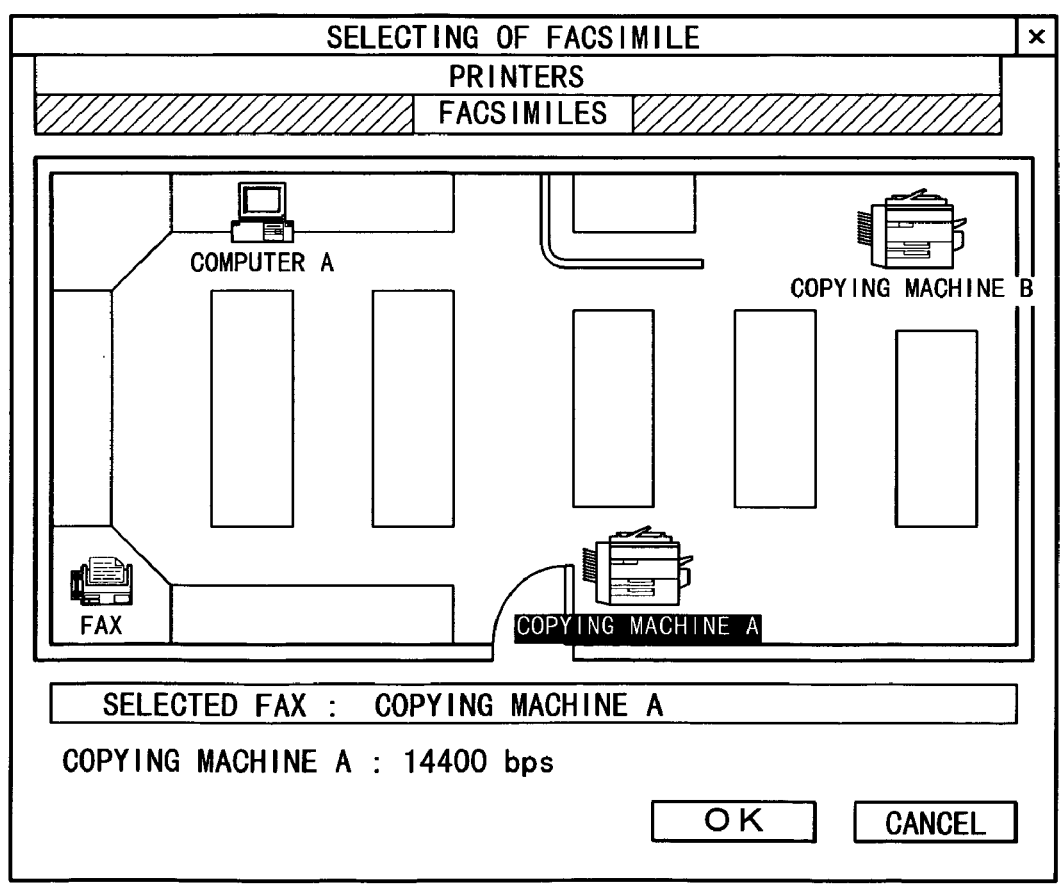
FIG. 14 is a diagram illustrating a screen displaying a FAX dialog box for selecting a facsimile apparatus in the third embodiment.

FIG. 14 is a diagram illustrating a screen displaying a FAX dialog box for selecting a facsimile apparatus. In order to switch the displayed screen to the dialog box for selecting a printer shown in FIG. 6, an area marked with the word 'FAX' on the top of the dialog box shown in FIG. 14 is clicked by using a mouse. By doing so, an area marked with the word 'Printers' newly appears beside the 'FAX' area as shown in FIG. 14. Then, clicking the 'Printers' area will switch the displayed screen to the dialog box for selecting a printer shown in FIG. 6. In order to switch back the displayed screen from the dialog box for selecting a printer shown in FIG. 6 to the dialog box for selecting a facsimile apparatus shown in FIG. 14, the same operations are carried out. The screen switching operations can also be accomplished by providing 'FAX' and 'Printers' buttons in the dialog boxes. The displayed screen can then be switched from one of the dialog boxes to another by clicking either of these buttons.

A facsimile apparatus is selected in the same way as a printer is selected. That is, a facsimile apparatus is selected by clicking an icon representing the apparatus then clicking the 'OK' button. When the 'OK' or 'Cancel' button is clicked, the dialog box for selecting a facsimile apparatus disappears, being replaced by a printing dialog box like the one shown in FIG. 4. On a layout diagram, an output apparatus other than a facsimile apparatus that has a facsimile function is also displayed as a facsimile icon. In the case of the dialog box shown in FIG. 14, other apparatuses having a facsimile function are the A personal computer 11, the A digital copying machine 41 and the B digital copying machine 42.

A layout diagram displayed on a dialog box for selecting a facsimile apparatus can be made by adopting the same method as the method of positioning icons shown in FIG. 10. To put it in detail, a facsimile icon is dragged from a facsimile apparatus icon displaying area at a location in close proximity to the printer icon displaying area to a desired location on the layout diagram in a drag-and-drop operation. Then, by double clicking the facsimile apparatus icon positioned on the layout diagram, pieces of apparatus information for the facsimile apparatus represented by the icon can be entered. The entered apparatus information is stored in the hard disc unit 114 as an apparatus information table like one shown in FIG. 15. The apparatus information which includes an apparatus name, a driver name, an address in a network, a telephone number and specifications for the apparatus is stored along with the apparatus information for output apparatuses having a printer function.

According to the third embodiment described above, facsimile apparatuses are displayed each as an output apparatus in a dialog box completely separated from a dialog box for selecting a printer. As a result, the user will no longer make a mistake in selecting a printer or a facsimile apparatus. In addition, the displayed screen can be switched from a dialog box for selecting a printer to a dialog box for selecting a facsimile apparatus and vice versa with ease. Furthermore, since an apparatus provided with a facsimile function such as a personal computer or a digital copying machine is also displayed as a facsimile icon, even a beginner is capable of selecting an apparatus for outputting facsimile data correctly with no anxiety. It should be noted that, much like the second embodiment, the status of each output apparatus can also be displayed at a location in close proximity to an icon representing the apparatus. In this case, it is not necessary to display things such as a failure that have nothing to do with a facsimile function. That is, only status related to the facsimile function needs to be displayed. In the case of a digital copying machine, for example, the state of a failure of a function other than the facsimile one such as a printing function is not displayed. Only status of the facsimile function such as 'facsimile transmission is under way' is displayed.

Fourth Embodiment

Figure 16:
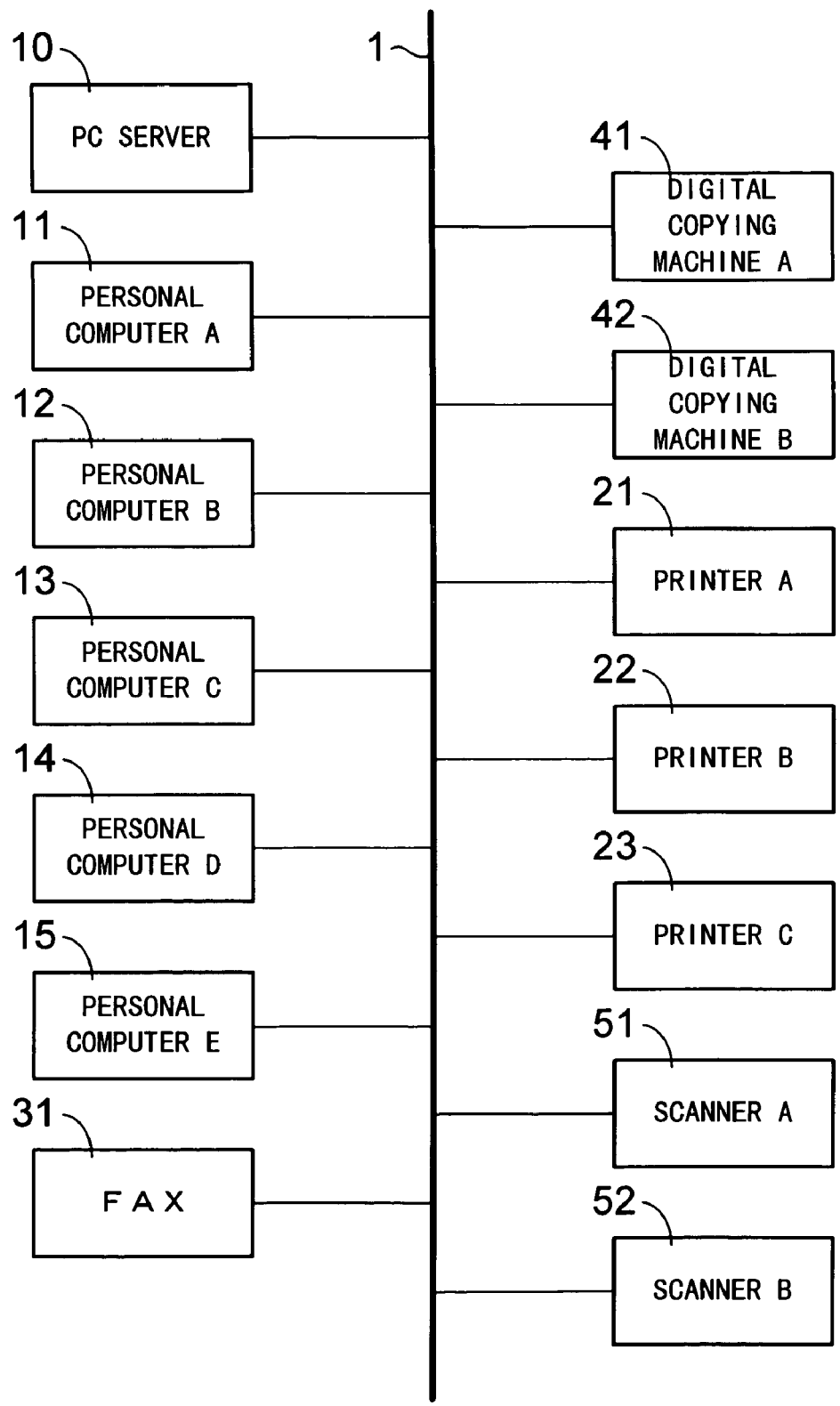
FIG. 16 is a block diagram showing the conventional network system and a network system implemented by a fourth embodiment of the present invention.

Next, a fourth embodiment of the present invention is explained. FIG. 16 is a block diagram showing the configuration of a network system based on the fourth embodiment. As shown in the figure, the network system comprises a PC server 10, A to E personal computers 11 to 15, A to C printers 21 to 23, a facsimile apparatus 31, an A digital copying machine 41, a B digital copying machine 42, an A scanner 51 and a B scanner 52 which are connected to each other by a communication line 1 of a LAN typically installed in a place of business. Used as a dedicated server, the PC server 10 has a CPU with a higher performance than a CPU employed in each of the personal computers 11 to 15 and a hard disc unit with a large storage capacity.

Figure 17:
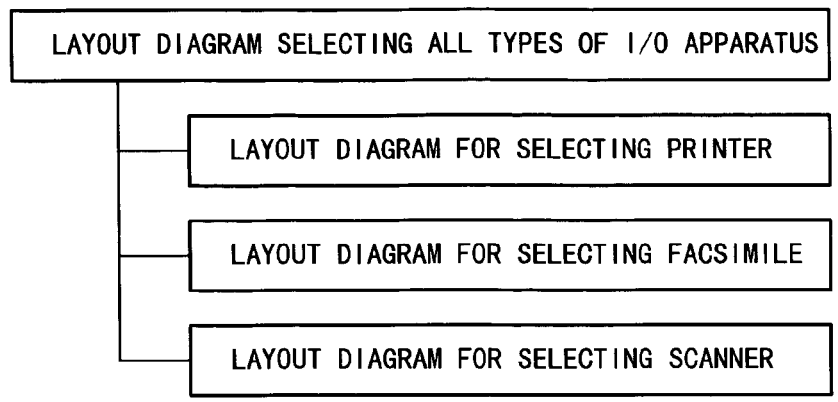
FIG. 17 is a diagram showing a hierarchical structure of layout diagrams for selecting an input/output apparatus according to the fourth embodiment.

FIG. 17 is a diagram showing a hierarchical structure of layout diagrams each for selecting an input/output apparatus according to the fourth embodiment. In selection of an input-output apparatus, first of all, a diagram showing a dialog box for selecting one among icons for all types of apparatus is displayed. By specifying a type of apparatus among those displayed in the layout diagram, the displayed screen can be switched to a layout diagram for selecting a printer, a layout diagram for selecting a facsimile apparatus or a layout diagram for selecting a scanner. Data of the layout diagrams can be stored in each of the A to E personal computers 11 to 15. By storing the data in the PC server 10 and controlling it in an integrated manner, however, work such as modification of the data can be carried out with ease. This holds true of the apparatus information tables. The network system is built so that each of the A to E personal computers 11 to 15 is capable of referring to a layout diagram or an apparatus information table stored in the PC server 10 with a high degree of freedom. It should be noted, however, that the hierarchical structure of the layout diagrams is not limited to the 3 types of apparatus shown in FIG. 17. That is, a layout diagram for selecting an input-output apparatus of any other arbitrary type can be included.

Figure 18:
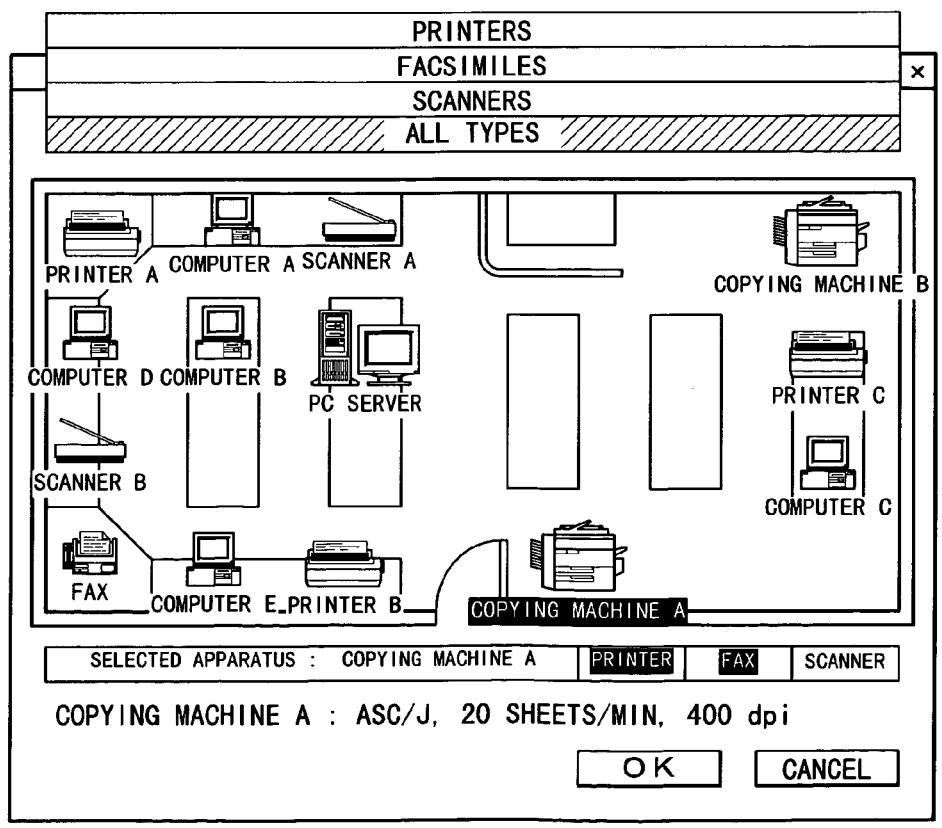
FIG. 18 is a diagram illustrating a screen displaying a dialog box for selecting an input-output apparatus according to the fourth embodiment wherein all types of input-output apparatus are shown.

FIG. 18 is a diagram illustrating a screen displaying a dialog box for selecting an input-output apparatus according to the fourth embodiment wherein all types of input-output apparatus are shown. Instead of invoking a routine for displaying the dialog box shown in FIG. 18 from an ordinary application program, the routine is rather appropriately invoked when setting a default value of an input-output apparatus driven by the OS. At the center of the dialog box, icons representing input-output apparatuses of all types are displayed. When an area marked with the phrase 'All Types' at the top of the dialog box is clicked, areas marked with the words 'Printers', 'FAX' and 'Scanners' respectively newly appear at positions adjacent thereto side by side at the top of the dialog box as shown in the figure. By clicking one of the newly displayed area marked with a word indicating a desired type of apparatus, the displayed screen can be switched to a dialog box for selecting an input-output apparatus of the desired type. If the area marked with 'Printers' is clicked, for example, a dialog box like the one shown in FIG. 6 is displayed. If the area marked with 'FAX' is clicked, on the other hand, a dialog box like the one shown in FIG. 14 is displayed.

The method for selecting one of the input-output apparatuses of a variety of types is exactly the same as the first and third embodiments shown in FIGS. 6 and 14 respectively which have been described earlier. To put it in detail, an apparatus is selected by using a dialog box corresponding to a layout diagram at a lower level of the hierarchical structure shown in FIG. 17. That is, an output/output apparatus of a certain type such as a printer, a facsimile apparatus or a scanner can not be selected using the dialog box shown in FIG. 18 because the dialog box is used for selecting one among types of input-output apparatus and thus corresponds to a diagram at the top layer of the hierarchical structure which does not allow an apparatus of a certain type to be selected. Nevertheless, there is no problem with selection of an input-output apparatus based on dialog boxes organized in such a hierarchical structure. As an alternative, the dialog box shown in FIG. 18 can of course be designed so as to allow the user to select an output/output apparatus of a certain type such as a printer, a facsimile apparatus or a scanner without the need to switch the displayed screen to a dialog box for selecting an input-output apparatus of the desired type which corresponds to a layout diagram at a lower level of the hierarchical structure shown in FIG. 17. In this case, an icon representing a desired input-output apparatus in the dialog box shown in FIG. 18 is just clicked. FIG. 18 shows an example wherein the A digital copying machine 41 is selected as evidenced by an inverted display state of the apparatus name thereof. In this case, the apparatus name is also displayed on a field of a selected apparatus at the lower part of the dialog box. Executable functions of the A digital copying machine 41 are also displayed on the same field beside the apparatus name. If the A digital copying machine 41 is to be used as a printer, the area of the printer function on the field is clicked to put the printer function in an inverted display state as well. If the A digital copying machine 41 is to be used as a facsimile apparatus as well, the area of the facsimile function on the field is also clicked to put the facsimile function in an inverted display state. Then, clicking the 'OK' button will set the A digital copying machine 41 as a printer as well as a facsimile apparatus.

Figure 19:
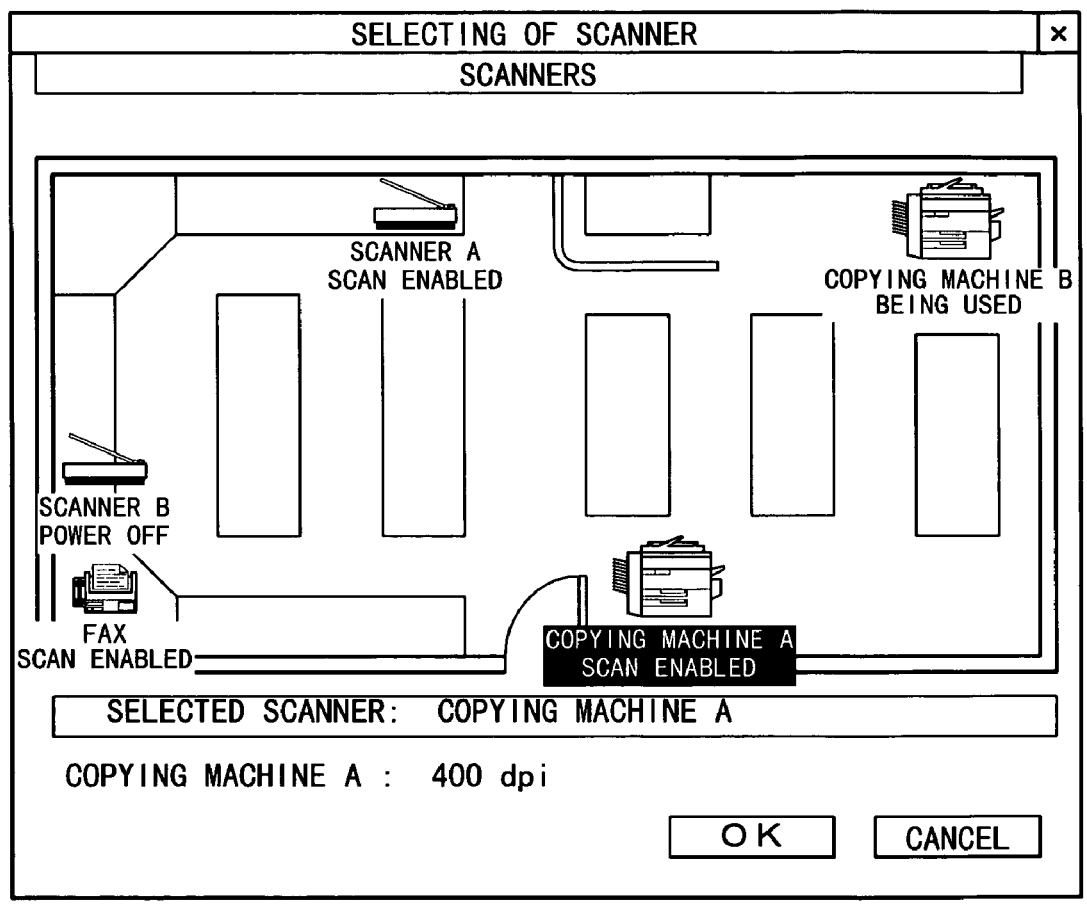
FIG. 19 is a diagram illustrating a screen displaying a dialog box for selecting a scanner according to the fourth embodiment.

FIG. 19 is a diagram illustrating a screen displaying a dialog box for selecting a scanner according to the fourth embodiment. This scanner selecting dialog box is displayed when the scanner is selected as a type of apparatus by using the dialog box shown in FIG. 18 for selecting one among types of input-output apparatus. In addition, this scanner selecting dialog box is also displayed when setting of an input apparatus is requested from a menu of an ordinary application program which inputs images. A scanner is set as an input apparatus in the same way as a printer or a facsimile apparatus is set as an output apparatus. In the dialog box shown in FIG. 19, a facsimile apparatus and a digital copying machine that have a scanner function are also displayed each as a scanner icon.

Figure 20:
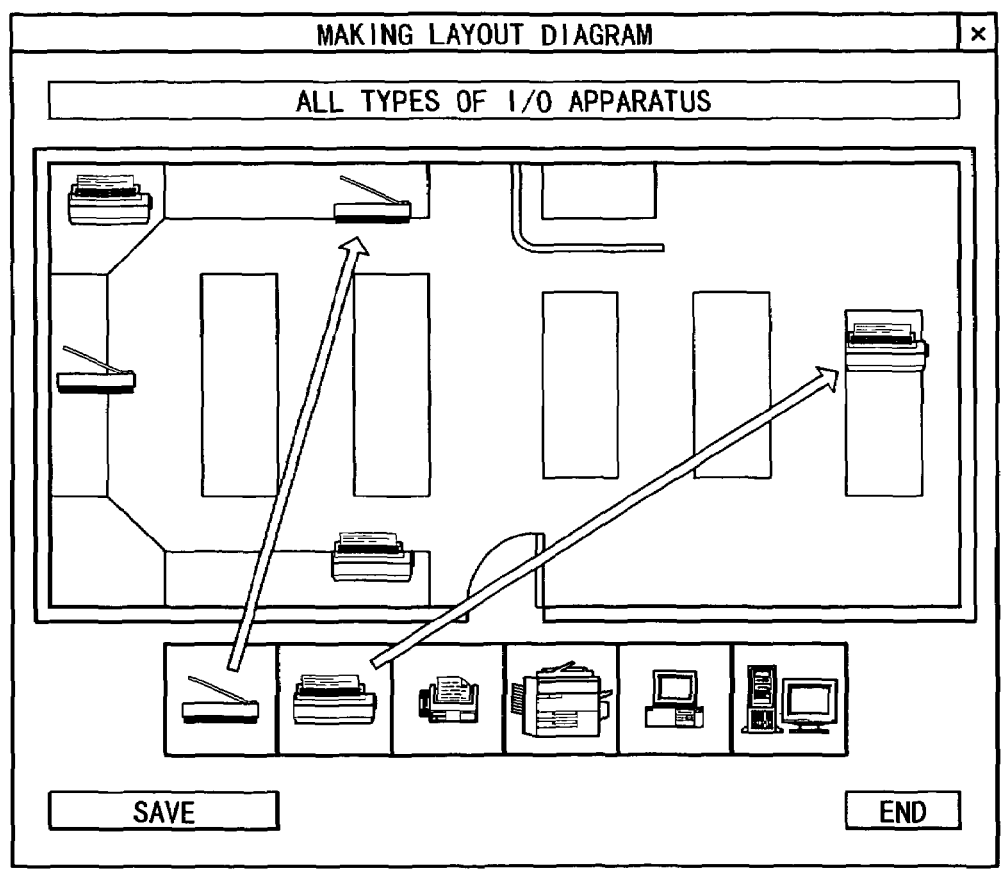
FIG. 20 shows a process of making a diagram displaying icons representing all types of input-output apparatus in the fourth embodiment.

FIG. 20 shows a process of making a screen displaying icons representing all types of input-output apparatus in the fourth embodiment. That is, in the process, the dialog box shown in FIG. 18 is made by executing a layout making program to make a layout of things such as a place of business shown in FIG. 9, or by acquiring data of a layout diagram showing a place of business made previously and then positioning icons representing all types of input-output apparatus on the layout diagram of the place of business. In the case of the fourth embodiment, the icons, which represent all types of input-output apparatus and are required in the process of making the dialog box, are arranged on an icon displaying field at the bottom of the screen shown in FIG. 20. The user drags a required icon from the icon displaying field to a desired location on the dialog box being made in a drag-and-drop operation. The positioned icon is then double clicked for entering apparatus information for an apparatus represented by the icon.

When the dialog box being made is completed, the 'Save' button is clicked to store data of the dialog box by giving a predetermined file name thereto. Then, the 'End' button is clicked to terminate the execution of the layout making program. The finally saved data of the resulting dialog box includes information related to the display of each icon such as the position of the icon, the apparatus name and the shape of the icon. An input-output apparatus selecting program displays a dialog box like the ones shown in FIGS. 18 and 19 from data of the layout diagram including information related to the display of each icon.

FIG. 21 shows data stored in an apparatus information table of the fourth embodiment. Apparatus information for an apparatus is entered through an apparatus information entering screen which is displayed when a positioned icon representing the apparatus is double clicked during a process of making a dialog box shown in FIG. 20. Information on an apparatus can also be changed, newly added or deleted after the process of making a dialog box. In the case of an apparatus having a plurality of different functions, apparatus information is entered for each of the functions. In the case of the A digital copying machine 41, for example, apparatus information is cataloged for each of the printer, scanner and facsimile functions. In the apparatus information table shown in FIG. 21, apparatus information for an apparatus function is stored on a row. The three columns on the right side of the apparatus information table corresponding to the printer, facsimile and scanner functions respectively are used for storing flags each indicating that the function can be executed by an apparatus shown on the left most column of the table. When the displayed screen is switched from the dialog box for selecting a type of input-output apparatus shown in FIG. 18 to a dialog box for selecting a printer shown in FIG. 6, for example, the apparatus information table shown in FIG. 21 is searched for only apparatuses with a printer function which are then displayed on the dialog box shown in FIG. 6 as printer icons. The dialog boxes shown in FIGS. 14 and 19 for selecting a facsimile apparatus and a scanner respectively can be displayed in the same way as that shown in FIG. 6.

Figure 22:
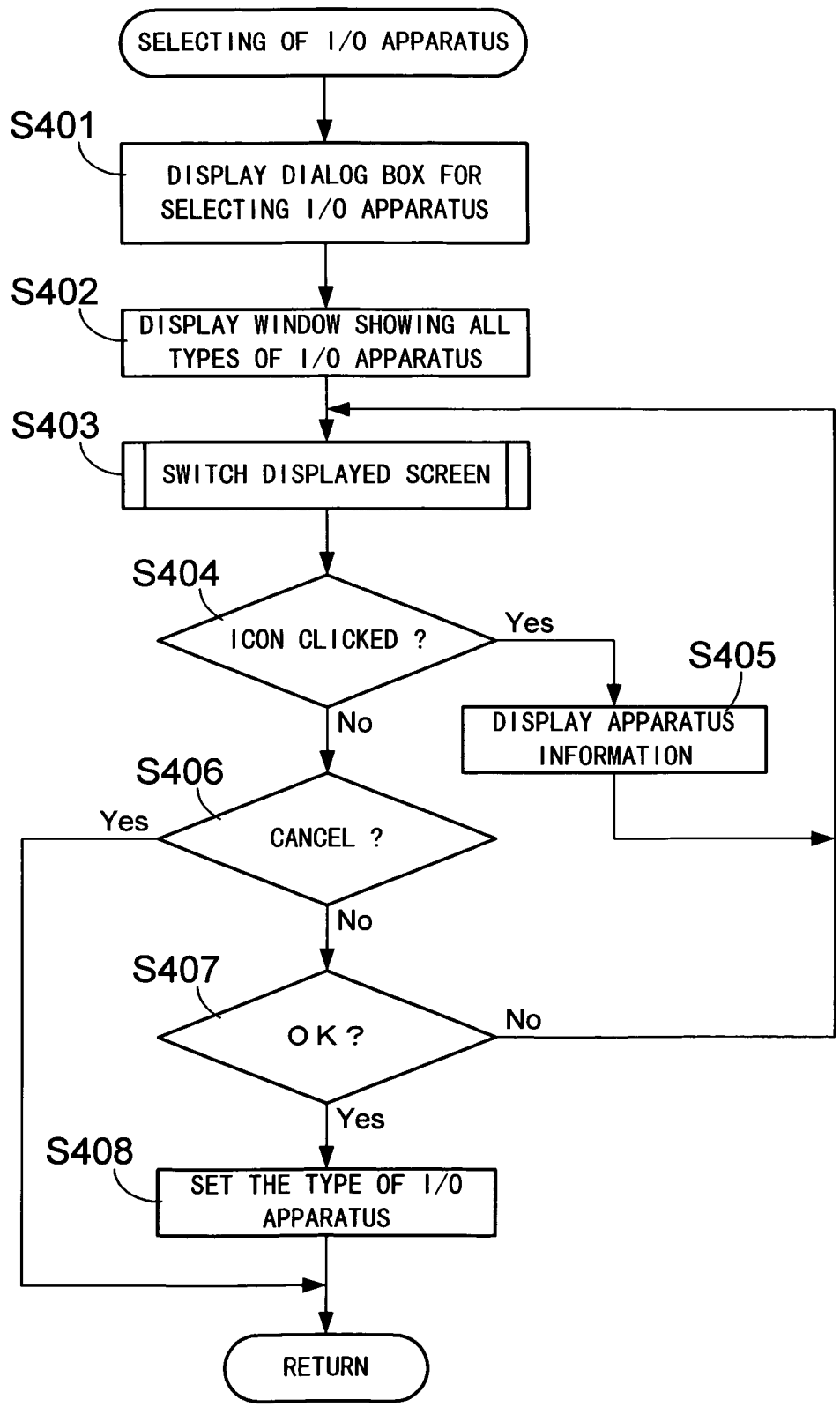
FIG. 22 shows a flowchart representing processing carried out by a program displaying a dialog box for selecting a type of input-output apparatus available in the fourth embodiment.

FIG. 22 shows a flowchart representing processing carried out by a program displaying a dialog box for selecting a type of input-output apparatus according to the fourth embodiment. As shown in the figure, the flowchart begins with a step S401 when the program for selecting a type of input-output apparatus is activated. At the step S401, a dialog box like the one shown in FIG. 18 for selecting a type of input-output apparatus is displayed. The flow of processing then goes on to a step S402 at which a window showing all types of input-output apparatus is displayed at the center of the dialog box. Then, the flow of processing proceeds to a step S403 at which a display switching program is called to switch the displayed screen to a layout diagram for the selected type of input-output apparatus. Processing carried out by the display switching program will be described later by referring to FIG. 23.

Subsequently, the flow of processing continues to a step S404 to form a judgment as to whether or not an icon displayed on the dialog box has been clicked. If an icon has been clicked, the flow of processing goes on to a step S405 at which the clicked icon is put in a selected state and apparatus information such as specifications of an apparatus represented by the clicked icon is acquired from the apparatus information table shown in FIG. 21 and displayed on the dialog box. The flow of processing then returns to the step S403 at which the display switching program is called to switch the displayed screen. If the outcome of the judgment formed at the step S404 indicates that an icon displayed on the dialog box has not been clicked, on the other hand, the flow of processing proceeds to a step S406 to form a judgment as to whether or not the 'Cancel' button has been clicked. If the 'Cancel' button has been clicked, the control is returned to a program calling the program for selecting a type of input-output apparatus without doing anything.

If the 'Cancel' button was not clicked, on the other hand, the flow of processing continues to a step S407 to form a judgment as to whether or not the 'OK' button has been clicked. If the 'OK' button has been clicked, the flow of processing goes on to a step S408 to carry out processing to select a type of input-output apparatus, that is, to set the type of input-output apparatus represented by the clicked icon as a type of input-output processing defining a group of apparatuses. A final input-output apparatus is then selected from the group. The control is then returned to the program calling the program for selecting a type of input-output apparatus. If the outcome of the judgment formed at the step S407 indicates that the 'OK' button was not clicked, on the other hand, the flow of processing returns to the step S403 at which the display switching program is called to switch the displayed screen. The steps S403 to S407 form a loop waiting for an event. The flow of processing will not exit from the loop till the 'OK' or 'Cancel' button is clicked.

Figure 23:
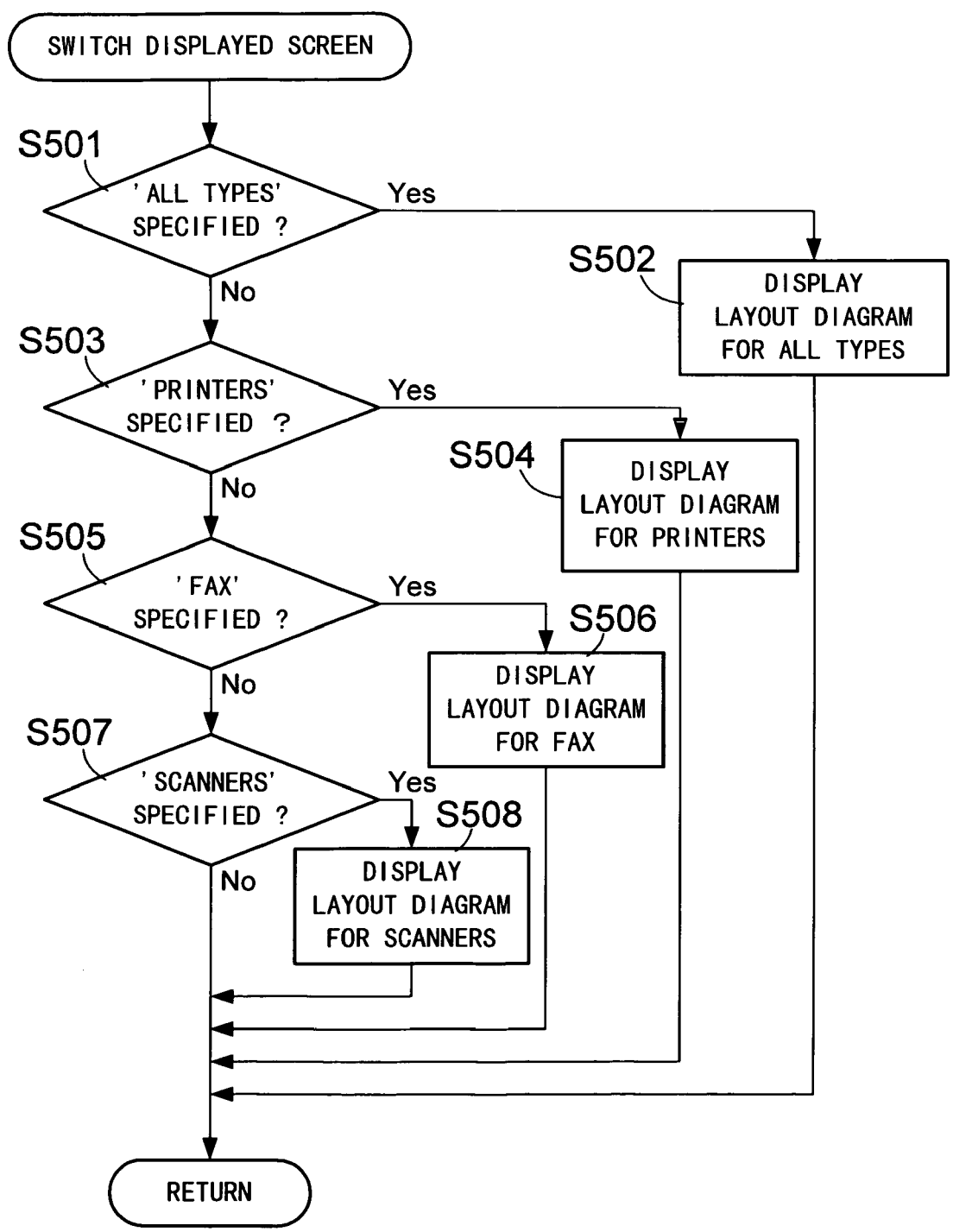
FIG. 23 shows a flowchart of a display switching program of the fourth embodiment.

FIG. 23 shows a flowchart representing processing carried out by the display switching program of the fourth embodiment. As shown in the figure, when the display switching program is called, the flowchart begins with a step S501 to form a judgment as to whether or not an item 'All Types' in an apparatus type specifying area of the dialog box displayed at the step S401 of the flowchart shown in FIG. 22 has been specified. If the 'All Types' item has been specified, the flow of processing goes on to a step S502 at which a screen showing all types of input-output apparatus is displayed. On the screen, data created for the one shown in FIG. 20 is shown as it is. Then, the control is returned to the program of FIG. 22 calling this display switching program.

If the outcome of the judgment formed at the step S501 indicates that the 'All Types' item was not specified, on the other hand, the flow of processing goes on to a step S503 to form a judgment as to whether or not an item 'Printers' in an apparatus type specifying area displayed at the step S401 of the flowchart shown in FIG. 22 has been specified. If the 'Printers' area has been specified, the flow of processing goes on to a step S504 at which a layout diagram for selecting a printer is displayed. In this case, the apparatus information table shown in FIG. 21 is searched for only apparatuses with a printer function which are then displayed on the layout diagram as printer icons. Then, the control is returned to the program of FIG. 22 calling this display switching program.

If the outcome of the judgment formed at the step S503 indicates that the 'Printers' item was not specified, on the other hand, the flow of processing goes on to a step S505 to form a judgment as to whether or not an item 'FAX' in an apparatus type specifying area displayed at the step S401 of the flowchart shown in FIG. 22 has been specified. If the 'FAX' area has been specified, the flow of processing goes on to a step S506 at which a layout diagram for selecting a facsimile apparatus is displayed. In this case, the apparatus information table shown in FIG. 21 is searched for only apparatuses with a facsimile function which are then displayed on the layout diagram as printer icons. Then, the control is returned to the program of FIG. 22 calling this display switching program.

If the outcome of the judgment formed at the step S505 indicates that the 'FAX' item was not specified, on the other hand, the flow of processing goes on to a step S507 to form a judgment as to whether or not an item 'Scanners' in an apparatus type specifying area displayed at the step S401 of the flowchart shown in FIG. 22 has been specified. If the 'Scanners' area has been specified, the flow of processing goes on to a step S508 at which a layout diagram for selecting a scanner is displayed. In this case, the apparatus information table shown in FIG. 21 is searched for only apparatuses with a scanner function which are then displayed on the layout diagram as printer icons. After the processing carried out at the step S508 is completed, the control is returned to the program of FIG. 22 calling this display switching program.

If the outcome of the judgment formed at the step S507 indicates that the 'Scanners' item was not specified either, the control is returned to the program of FIG. 22 calling this display switching program.

According to the fourth embodiment described above, input-output apparatuses can be displayed separately by being classified into categories or types based on functions. All types of input-output apparatus are displayed on a dialog box for selecting a type of input-output apparatus whereas information on functions of the input-output apparatuses are stored in the apparatus information table. Since input-output apparatuses of the same type can be displayed by searching the apparatus information table for only information required in the display, it is not necessary to make a layout diagram for selecting an input-output apparatus for each type, resulting in a considerably reduced amount of labor to make such a layout diagram. In addition, a multifunctional apparatus having a plurality of functions is displayed as distinct icons for the different functions. As a result, even a beginner is capable of selecting an input-output apparatus without making a mistake. Furthermore, since input-output apparatuses are displayed separately by being classified into categories based on functions, the number of mistakes made by selecting a printer for an actually desired facsimile apparatus or vice versa is reduced.

Fifth Embodiment

Figure 24:
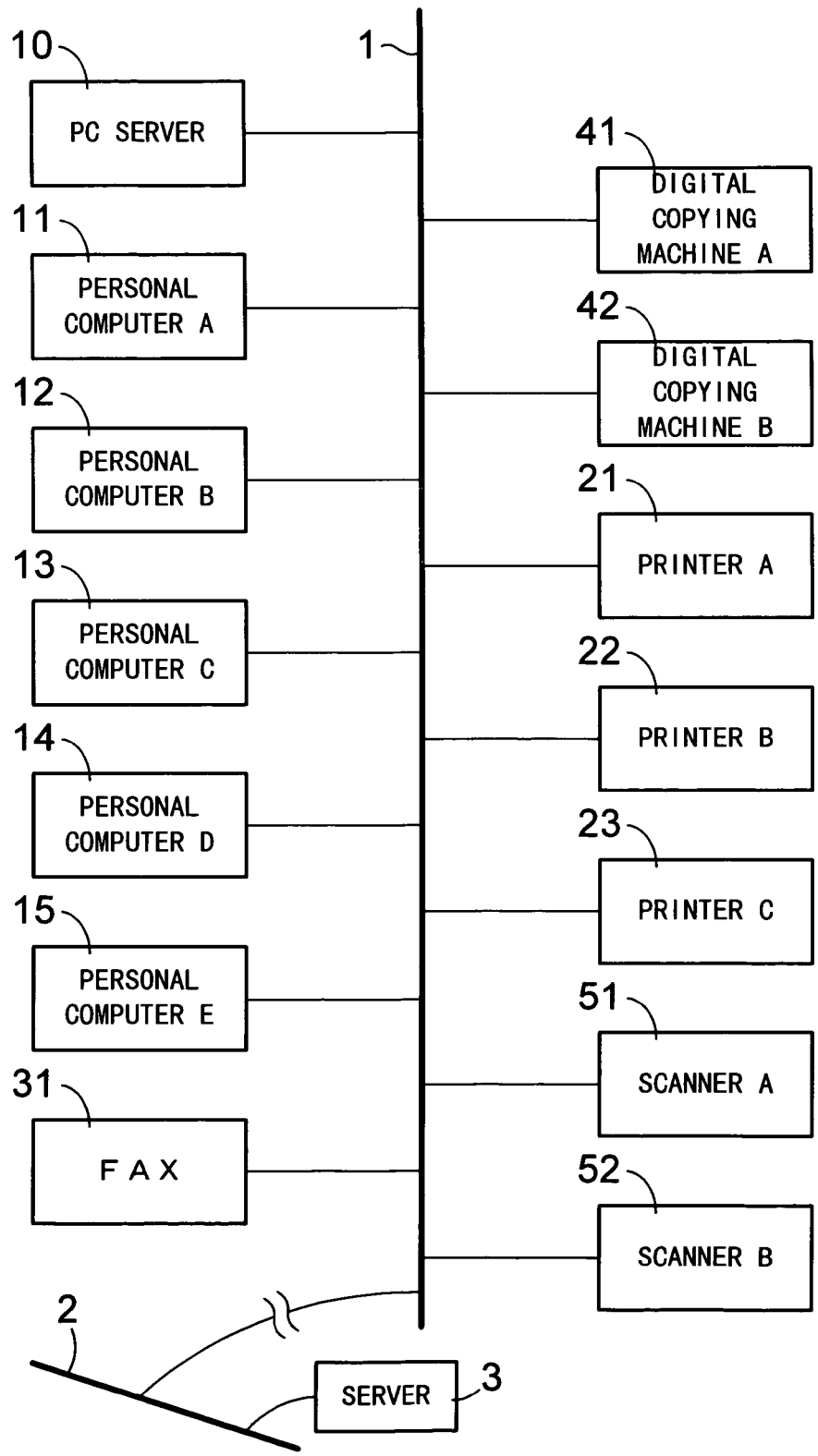
FIG. 24 is a block diagram showing the conventional network system and a network system implemented by a fifth embodiment of the present invention.

Next, a fifth embodiment of the present invention is explained. FIG. 24 is a block diagram showing the configuration of a network system based on the fifth embodiment. As shown in the figure, the network system comprises a PC server 10, A to E personal computers 11 to 15, A to C printers 21 to 23, a facsimile apparatus 31, an A digital copying machine 41, a B digital copying machine 42, an A scanner 51 and a B scanner 52 which are connected to each other by a communication line 1 of a LAN typically installed in a place of business. Used as a dedicated server, the PC server 10 has a CPU with a higher performance than a CPU employed in each of the A to E personal computers 11 to 15 and a hard disc unit with a large storage capacity. In addition, the network system is connected to a communication line 2 of a WAN (Wide Area Network) by a component such as a router or a gate-away. Also connected to the communication line 2 of the WAN are a LAN of another place of business and a server 3.

Figure 25:
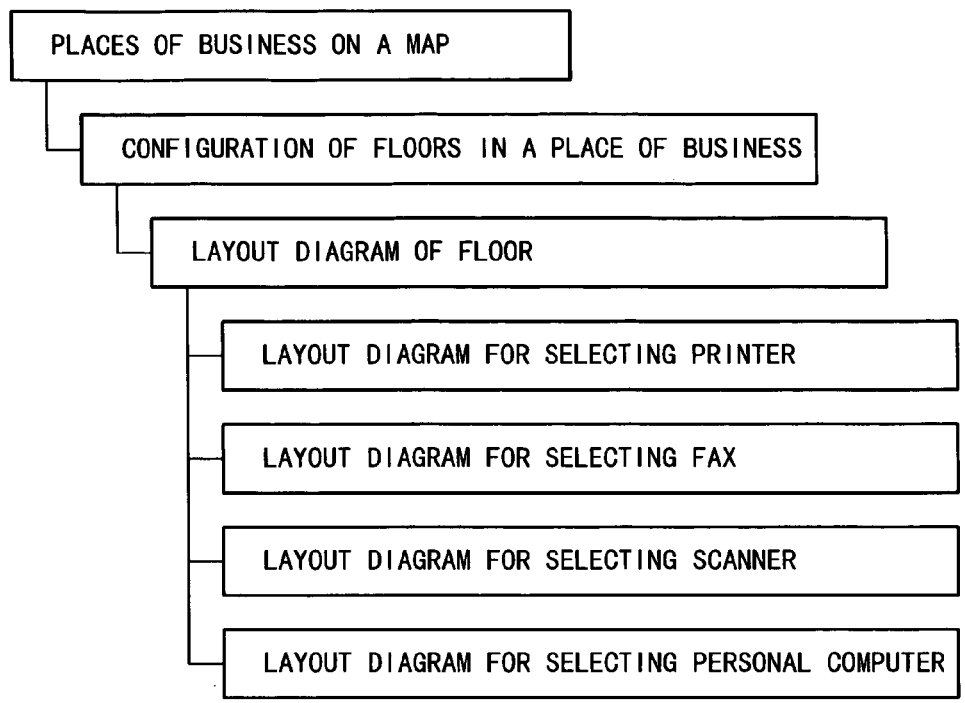
FIG. 25 is a diagram showing a hierarchical structure of layout diagrams for selecting an input/output apparatus according to the fifth embodiment.

In the fifth embodiment, all input-output apparatuses connected to the WAN can also be displayed in a layout diagram. In order to implement this function, layout diagrams are displayed as a hierarchical structure. FIG. 25 is a diagram showing a hierarchical structure of layout diagrams for selecting an input/output apparatus according to the fifth embodiment. The layout diagram at the top level of the hierarchical structure shows a layout of places of business on the map and a layout diagram at a level immediately lower than the top level shows the structure of places of business in a place of business. A layout diagram at a level further lower then the lower level shows a layout of input-output apparatuses of all types on a floor. Finally, each layout diagram at the bottom level shows a layout of input-output apparatuses of the same types. A layout diagram at the bottom level is used for finally selecting an input-output apparatus. As types of input-output apparatus, there are printers, facsimile apparatuses, scanners and personal computers to mention a few. A personal computer is also used as an output apparatus for receiving electronic mails.

Data of the layout diagrams and the apparatus information table are stored in the server 3 and controlled thereby in an integrated manner so that all personal computers connected to the WAN are capable of reading them out from the server 3. When any one of the personal computers needs to display a layout diagram, the personal computer transmits a request to the server 3, requesting the server 3 to transmit necessary data of the layout diagram and necessary data of the apparatus information table to the personal computer. In addition, when a layout in a department is changed, data of a new layout and data of the apparatus information table after the change are created immediately and cataloged in the server 3.

Figure 4A:
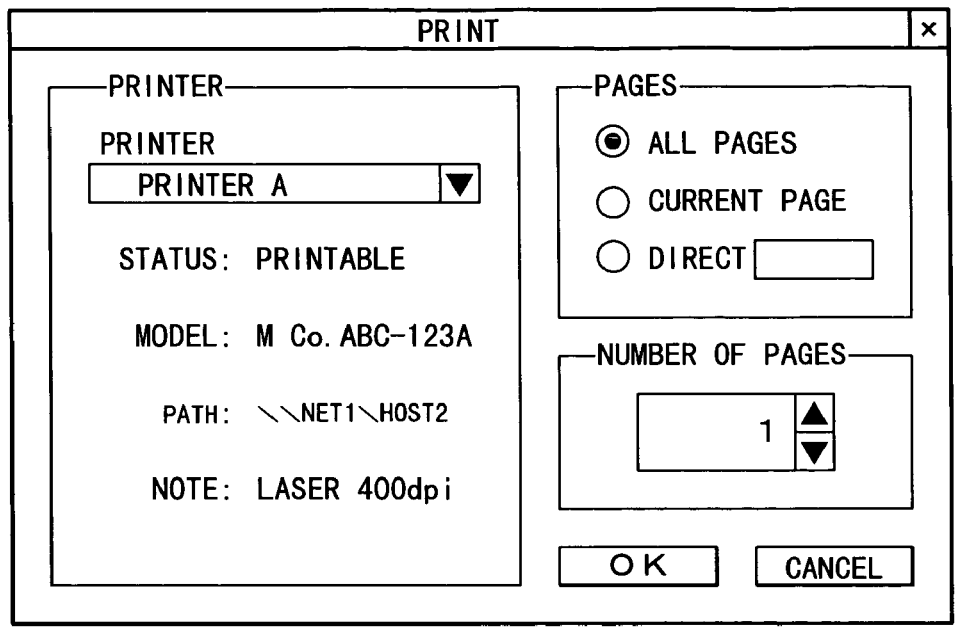
FIG. 4A is a diagram illustrating a screen displaying a typical conventional printing dialog box on a display unit.
Figure 4B:
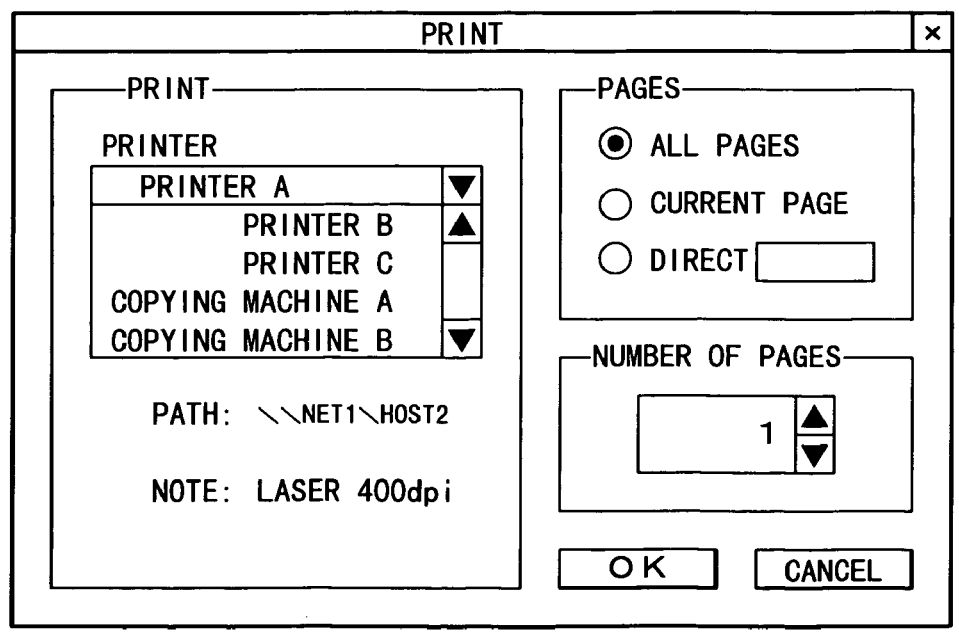
FIG. 4B is a diagram illustrating a screen displaying the conventional printer specifying method through the printing dialog box.
Figure 5:
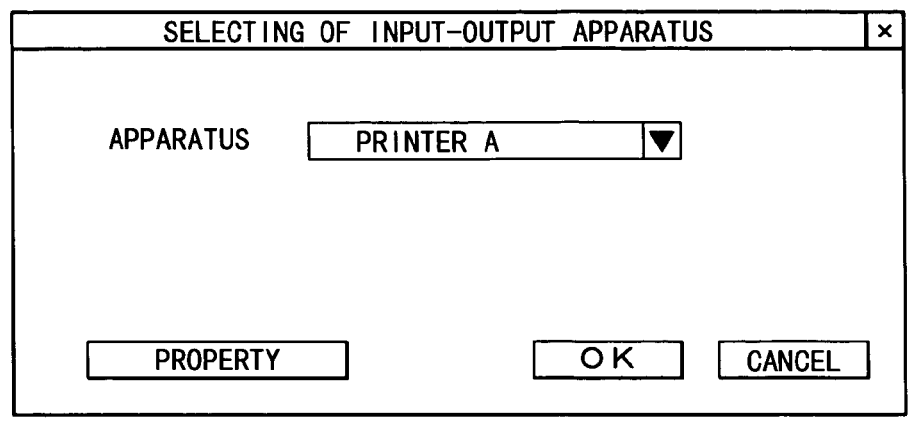
FIG. 5 is a diagram illustrating a screen displaying a typical conventional printing dialog box for selecting an input-output apparatus.
Figure 26:
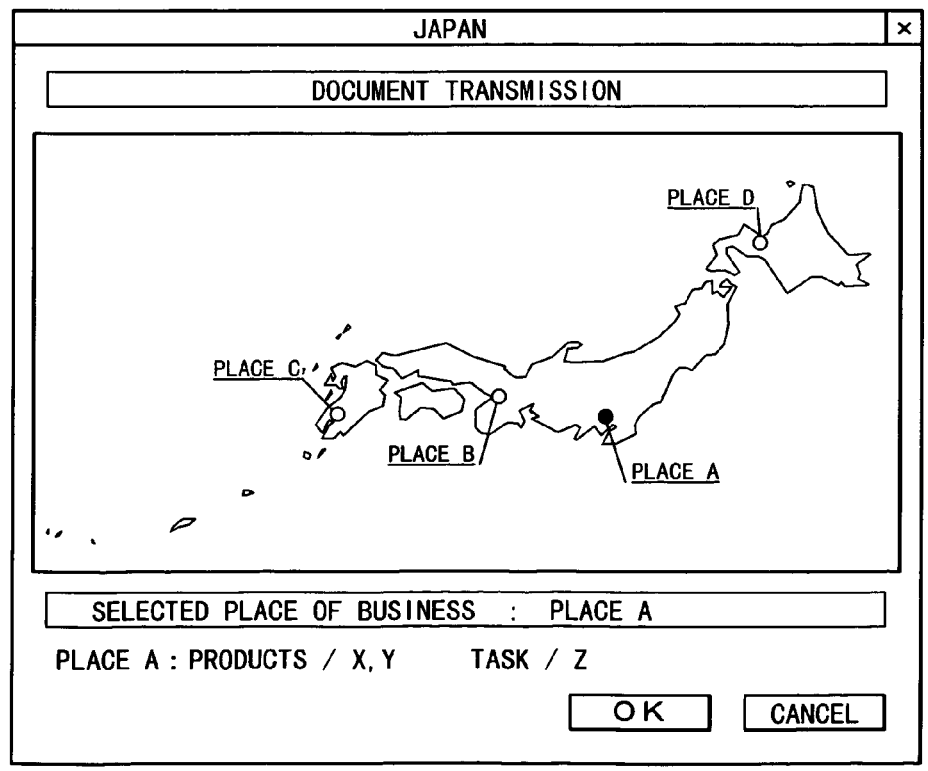
FIG. 26 is a layout diagram showing a map of places of business in the fifth embodiment.

FIG. 26 is a diagram illustrating a dialog box displaying a layout diagram showing a map of places of business at the top level of the hierarchical structure shown in FIG. 25. This dialog box is displayed when triggered by an event from an output dialog box like the printing dialog box shown in FIG. 4. To put it in detail, when the area displaying the name of a printer on the printing dialog box shown in FIG. 4 is clicked, the dialog box shown in FIG. 26 is displayed. Since the frequency, at which the dialog box of FIG. 26 showing a layout of places of business over such a wide area is selected, is relatively low, a 'Wide Area Selection' button provided in advance in the printing dialog box as an alternative can be clicked to display the dialog box shown in FIG. 26. In a configuration with a 'Wide Area Selection' button provided, the program can then be designed so that clicking the area displaying the name of a printer displays the dialog box of FIG. 6 for selecting a printer among those installed on the same floor instead of displaying the dialog box shown in FIG. 26.

In the dialog box shown in FIG. 26, there are 4 places of business. In order to select a place of business (A), the displayed character string or the display point of the place is clicked. By doing so, the selected display point is put in an inverted display state as shown in the figure to indicate that a place of business at the display point has been selected. When another place of business is selected by clicking the displayed character string or the display point of the other place of business, the newly selected display point is put in an inverted display state while the display point of the place of business selected so far is released from the inverted display state. In the lower part of the layout diagram, a field marked with a phrase 'Selected Place of Business' is provided for displaying the name of the selected place of business. Beneath the field, the names of products handled by the place of business and the kind of business are displayed. If the 'OK' button at the bottom of the dialog box is clicked, a layout diagram at a level lower than the top level in the hierarchical structure of FIG. 25 showing the configuration of floors in the selected place of business is displayed, allowing the user to further continue the selection to the lower level. If the 'Cancel' button at the bottom of the dialog box is clicked, on the other hand, this dialog box disappears, leaving the setting of an output apparatus unchanged. Then, the control is returned to a caller which invoked the program displaying this dialog box.

FIG. 27 is a dialog box showing the configuration of floors, that is, locations of departments of one of the places of business in the fifth embodiment. To be more specific, the figure is a layout diagram showing a layout or a configuration of floors of the place of business (A) selected through the dialog box shown in FIG. 26. As shown in FIG. 27, the place of business (A) is organized into 6 departments occupying 6 floors 1F to 6F respectively. In an area showing a floor, the name of a department occupying the floor is displayed. If one of the areas corresponding to the floors 1F to 6F is clicked, the floor in the clicked area is selected. The selected floor is displayed typically by a background color different from the rest to indicate that the floor has been selected. If another floor is clicked, the newly selected floor is put in a selected state and a floor selected previously is released from the selected state.

In a field marked with a phrase 'Selected Floor' at the lower part of the layout diagram, the name of a selected floor is displayed and, beneath the field, the name of a department occupying the selected floor is displayed. If the 'OK' button at the bottom of the dialog box is clicked, a layout diagram at a level further lower than the lower level in the hierarchical structure, like the one of FIG. 18, showing a layout of all input-output apparatuses on the selected floor is displayed, allowing the user to further continue the selection to the further lower level. If a 'Return' button at the bottom of the dialog box is clicked, on the other hand, the screen of the layout diagram at the upper level shown in FIG. 26 is redisplayed. If the 'Cancel' button at the bottom of the dialog box is clicked, however, this dialog box disappears, leaving the setting of an output apparatus unchanged. Then, the control is returned to a caller which invoked the program displaying this dialog box.

As described above, if the 'OK' button of the dialog box shown in FIG. 27 is clicked, a screen like the one shown in FIG. 18 is displayed. As described earlier, the screen of FIG. 18 shows input-output apparatuses of all types. Then, a desired type of input-output apparatuses is further selected among those displayed on the screen in the same way as the one described by referring to FIG. 18 to display a dialog box like the one shown in FIG. 6 for further selecting a printer, a dialog box like the one shown in FIG. 14 for further selecting a facsimile apparatus, a dialog box like the one shown in FIG. 19 for further selecting a scanner or a dialog box shown in none of the figures for further selecting a personal computer at the bottom level of the hierarchical structure shown in FIG. 25 as an actually desired input-output apparatus. A text can then be transmitted to an output apparatus selected in this way as a destination of transmission. It should be noted that while a picture is displayed to show locations at which places of business and departments of a place of business exist as shown in FIGS. 26 and 27 respectively as described above, a table simply showing the names of places of business or the names of departments can also be used instead of a picture.

According to the fifth embodiment described above, the installation location of a desired input-output apparatus is finally selected by sequentially going through a hierarchical structure representing input-output apparatuses located over a wide area one layer after another, starting from the layer at the top level of the structure and ending at a layer at the bottom level thereof. As a result, a desired input-output apparatus can be specified in a short period of time even among an extremely large number of input-output apparatuses connected to a wide area network. Thus, a text transmitted by a facsimile apparatus by way of the WAN can be received, for example, by a printer connected to the WAN and printed directly with ease. That is, the sender merely specifies the desired printer from a displayed layout diagram showing the destination to which the text is to be transmitted. In this way, an output apparatus with a printer function connected to the network can be used as a substitute for a facsimile apparatus. As a result, the communication cost can also be reduced as well.

Sixth Embodiment

Next, a sixth embodiment is explained. The basic configuration of the sixth embodiment is the same as the fifth embodiment. In the case of the sixth embodiment, at the bottom level of the hierarchical structure, output apparatuses are displayed by category from a point of view different from the type of input-output apparatus used in the fifth embodiment. For example, FIG. 28 is a diagram illustrating a screen displaying one of the dialog boxes at the bottom level of the hierarchical structure for selecting a transmission destination in the sixth embodiment. As shown in the figure, at the top of the dialog box, there are three fields each for specifying a type of transmitted document. The fields are marked with phrases 'Document Transmission (paper)', 'Document Transmission (Bit Map)' and 'Document Transmission (Paper and Bit Map)' respectively. The field marked with 'Document Transmission (Paper)' indicates that transmitted image data such as a text is to be printed on paper by an output apparatus. The field marked with 'Document Transmission (Bit Map)' indicates that transmitted image data is to be saved as a bit map in a memory or a hard disc unit in an output apparatus. The field marked with 'Document Transmission (Paper and Bit Map)' indicates that transmitted image data is to be printed on paper or saved as a bit map in a memory or a hard disc unit in an output apparatus. FIG. 28 shows a dialog box in which the field marked with 'Document Transmission (Paper)' has been selected. The field marked with 'Document Transmission (Paper)' covers output apparatuses such as printers and plotters. With the field marked with 'Document Transmission (Paper)' selected, all output apparatuses having a printer function are displayed.

In the first place, when one of the 3 fields displayed on a dialog box showing all input-output apparatuses is clicked, a layout diagram showing only output apparatuses categorized in the clicked field is displayed. Then, a desired apparatus is selected among the output apparatuses shown in the layout diagram. First of all, FIG. 28 shows a layout diagram after the field marked with 'Document Transmission (Paper)' on an upper level dialog box showing all input-output apparatuses has been clicked and then the A digital copying machine 41 has been further selected among output apparatuses on the layout diagram specified by the clicked field. In a field marked with 'Selected Transmission Destination' at the lower part of the layout diagram, the name of the selected output apparatus is displayed. Beneath the name of the selected apparatus, pieces of attribute information of the selected output apparatus including the status thereof are displayed. The method adopted to set an output apparatus by selecting an icon representing the apparatus in the sixth embodiment is the same as the methods for setting an apparatus in the dialog boxes shown in FIGS. 6, 14 and 19 for the fifth embodiment.

Figure 29:
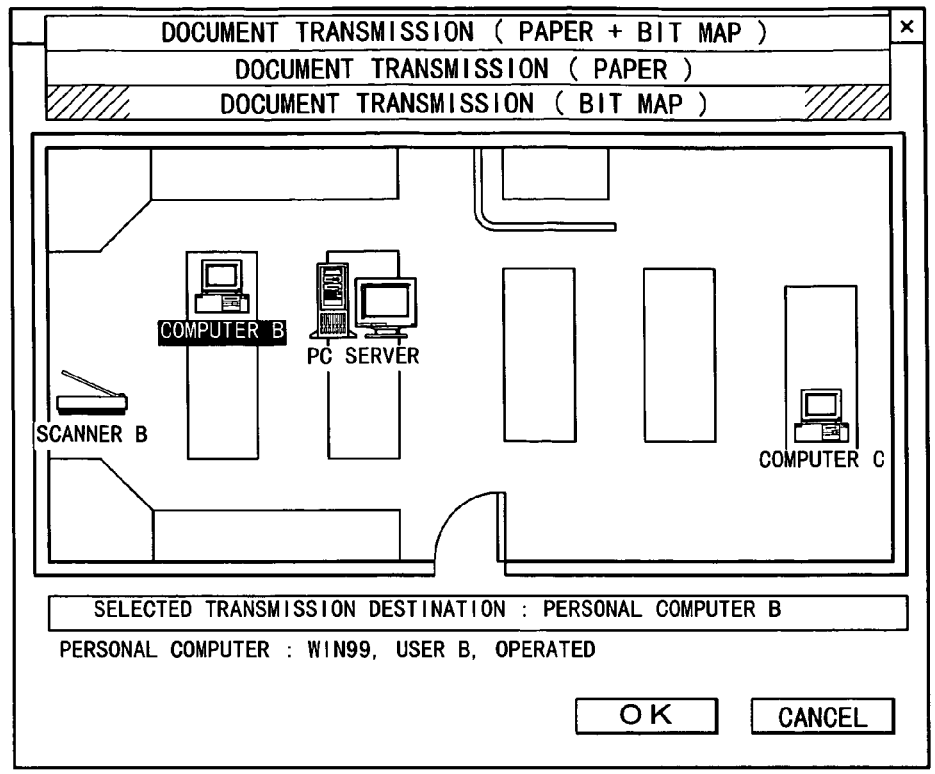
FIG. 29 is a diagram illustrating a screen displaying a dialog box for selecting a transmission destination for receiving a bit map data output according to the sixth embodiment.
Figure 30:
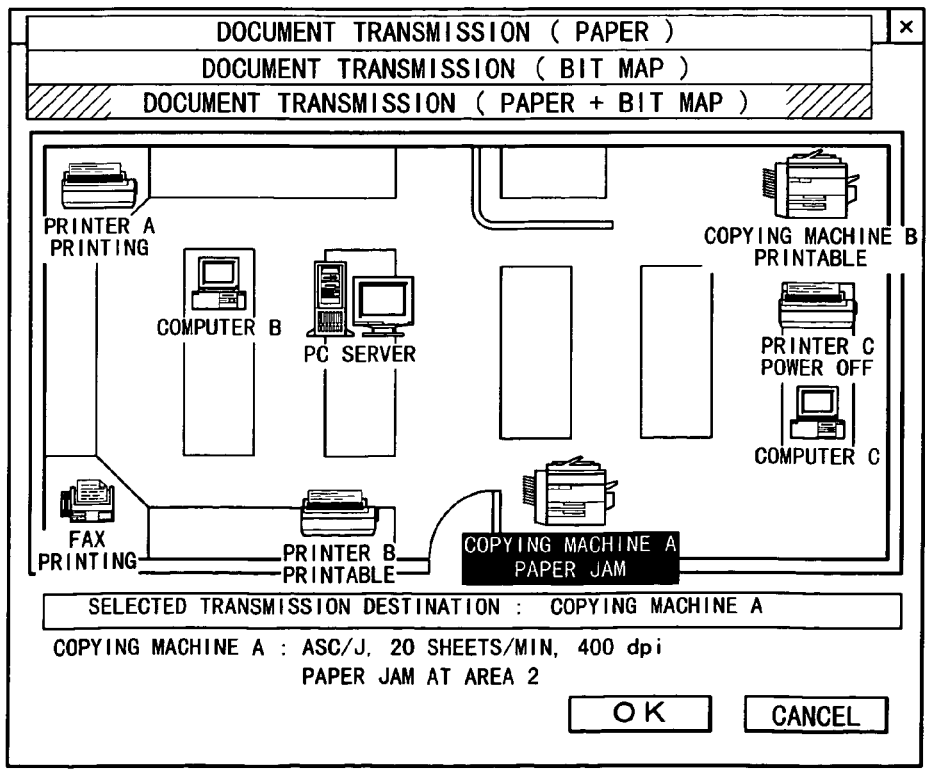
FIG. 30 is a diagram illustrating a screen displaying a dialog box for selecting a transmission destination for receiving a paper or bit map data output according to the sixth embodiment.

FIG. 29 is a diagram illustrating a screen displaying a dialog box for selecting a transmission destination for receiving a bit map data output in the sixth embodiment, that is, a dialog box corresponding to the field 'Document Transmission (Bit Map)'. In order to save received image data as a bit map in an output apparatus, an environment for executing a program for saving the data is required in the output apparatus. Apparatuses that have a function to set such an environment are the PC server 10, the B personal computer 12 and the C personal computer 13. That is why icons representing these 3 apparatuses are displayed on the dialog box shown in FIG. 29. FIG. 30 is a diagram illustrating a screen displaying a dialog box for selecting a transmission destination for receiving a paper or bit map data output in the sixth embodiment, that is, a dialog box corresponding to the field 'Document Transmission (Paper and Bit Map)'. Output apparatuses displayed on the dialog box shown in FIG. 30 is a sum of sets of output apparatuses displayed on the dialog boxes shown in FIGS. 28 and 29. A method for displaying the dialog box of FIG. 29 or 30 showing only output apparatuses of the desired type of document and a method for setting an output apparatus by selection of an icon representing the apparatus on the dialog boxes are the same as the methods adopted for the dialog box shown in FIG. 28.

Processing to display a dialog box shown in FIG. 28, 29 or 30 requires that data indicating a paper output function or a bit map saving function be cataloged in advance instead of data indicating the printer, facsimile and scanner functions stored in the apparatus information table shown in FIG. 21. By searching the apparatus information table for apparatuses having a paper output function, the dialog box shown in FIG. 28 can be displayed. By the same token, by searching the apparatus information table for apparatuses having a bit map saving function, the dialog box shown in FIG. 29 can be displayed. Finally, by computing a logical sum of apparatuses found in both the searches, the dialog box shown in FIG. 30 can be displayed. In addition to the logical addition to compute a logical sum described above, a variety of other logical processing such as logical negation and logical multiplication can also be specified.

According to the sixth embodiment described above, all output apparatuses capable of receiving data transmitted in a format desired by the user are displayed. As a result, an optimum output apparatus can be specified from a number of apparatuses in a short period of time with ease. It should be noted that classification and conditions of output apparatuses are not limited to those explained so far. That is, output apparatuses can be classified and conditions can be set properly in accordance with an output objective and an output application desired by the user.

Seventh Embodiment

Next, a seventh embodiment is explained. The basic configuration of the seventh embodiment is the same as the sixth embodiment. In the case of the seventh embodiment, the names of individuals working in a department owning the apparatuses are added to a dialog box like the one shown in FIG. 28. Placed at the same hierarchical level as the dialog box shown in FIG. 28 for the fifth embodiment, a dialog box displayed on a screen shown in FIG. 31 is used for specifying a user of an apparatus to be finally selected as a transmission destination according to the seventh embodiment. As shown in the figure, the names of individuals working in the department are displayed on the layout diagram at locations in close proximity to the seats of the individuals. The names of individuals are included in the data of the layout diagram. When the name of a particular individual displayed on the layout diagram is clicked, a screen displaying a dialog box at a level even lower than the dialog box shown in FIG. 31 showing only output apparatuses that the individual normally uses is displayed. One of the output apparatuses is then finally selected. The specified individual can be changed to another individual by clicking the name of the other individual. When an area other than the name of an individual and an icon is clicked, the selection of an individual is canceled.

FIG. 32 shows an apparatus information table of the seventh embodiment including also information on individuals required in the processing described above. The table is used for cataloging output apparatuses which each of the individuals normally uses. For example, the individual named A normally uses the A printer 21, the facsimile apparatus 31 and the A personal computer 11. The individual information table, that is, the apparatus information table including information on individuals, is stored in the server 3 so that any personal computer connected to the network is capable of making an access to the table. When the name of an individual displayed on the layout diagram shown in FIG. 31 is clicked, a program displaying the dialog box references the individual information table stored in the server 3, switching the displayed screen to a layout diagram showing only output apparatuses cataloged in the individual information table for the clicked name of the individual. One of the output apparatuses is then finally selected.

According to the seventh embodiment described above, locations of individuals are also displayed on a layout diagram, allowing the user to select an output apparatus in close proximity to an individual to whom data is to be transmitted. In addition, since clicking the name of an individual switches the displayed screen to a layout diagram showing only output apparatuses that the individual normally uses, it is possible to select an output apparatus convenient for a transmission partner with ease. It should be noted that, in the case of an apparatus cataloged for an individual with a special function such as a conversation capability and a video conversation capability like a television telephone, the special function can also be displayed on the dialog box. In this way, the user who utilizes such a function is allowed to take advantage of the function immediately, that is, to have conversations with a communication partner.

Eighth Embodiment

Next, an eighth embodiment is explained. In the first to seventh embodiments described so far, an input-output apparatus is selected from a personal computer. In the case of the eighth embodiment, on the other hand, an input-output apparatus is selected from an office machine other than a personal computer. FIG. 16 is a block diagram showing the configuration of a network system based on the eighth embodiment. The A digital copying machine 41 is taken as an example of the office machine other than a personal computer. Since the configuration of the network system itself has been explained by referring to FIG. 16, its explanation is not included in the following description.

Figure 33:
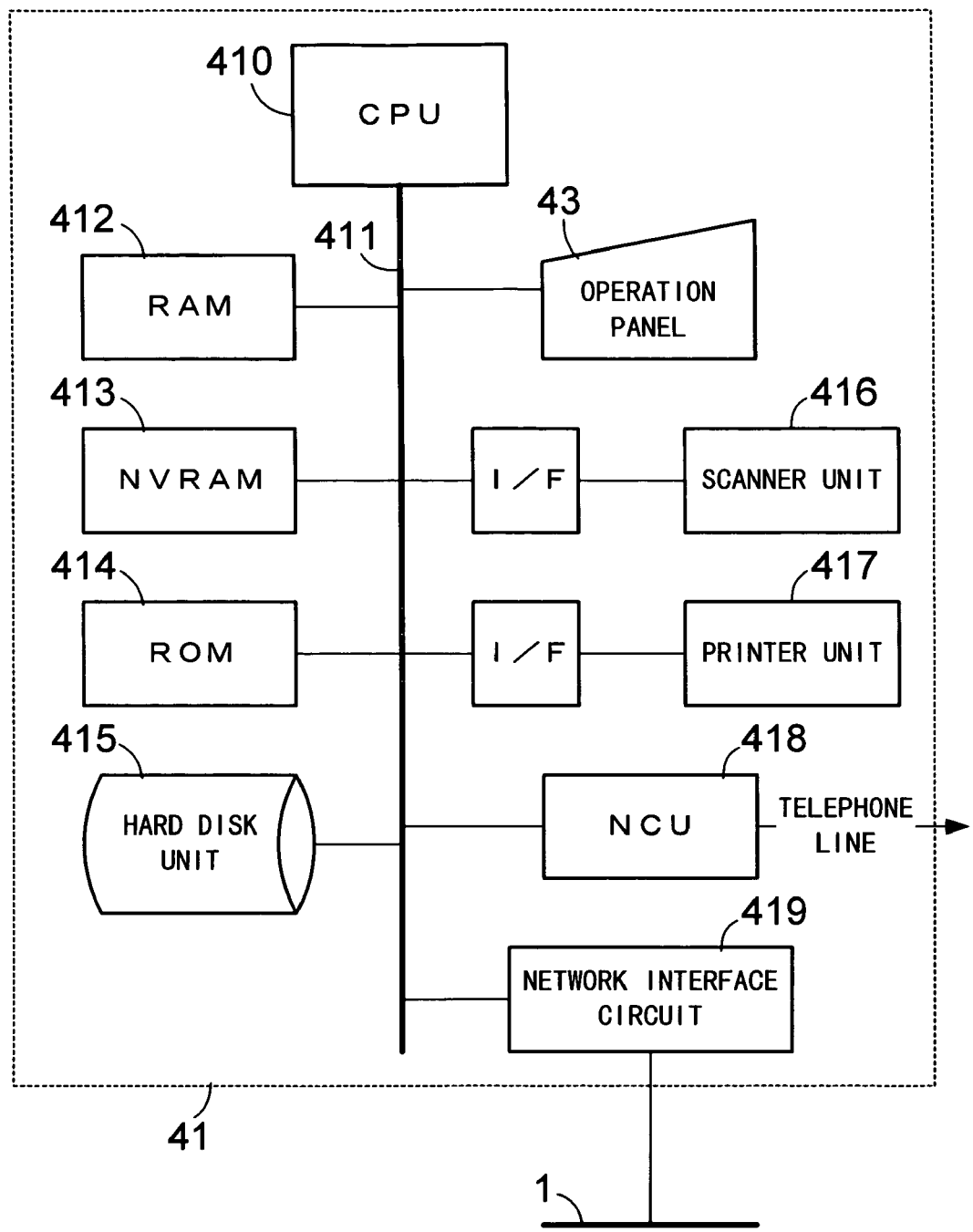
FIG. 33 is a block diagram showing the configuration of a digital copying machine in an eighth embodiment.

FIG. 33 is a block diagram showing the configuration of the A digital copying machine 41. As shown in the figure, the configuration includes a scanner unit 416 and a printer unit 417. The remaining components other than the scanner and printer units 416 and 417 constitute a controller unit. The controller unit comprises a CPU 410 and a bus 411 connected to the CPU 410. In addition, the controller unit also includes a RAM unit 412 used as a main memory, a NVRAM unit 413 serving as a non-volatile RAM used for storing user set information provided by the operator, a ROM unit 414, a hard disc unit 415, a communication control unit (NCU) 418, a network interface circuit 419 and an operation panel 43 which are all connected to the CPU 410 through the bus 411. The controller unit also has interface circuits for connecting the scanner unit 416 and the printer unit 417 respectively to the bus 411.

The CPU 410 executes a variety of programs loaded into the RAM unit 412 in order to carry out various kinds of processing and to control peripheral units. Display data stored in the RAM unit 412 is output to a liquid crystal display unit 431 employed in the operation panel 43. The hard disc unit 415 is used for storing a variety of files containing the various programs and data to be loaded into the RAM unit 412. Another disc drive such as a replaceable optical magnetic disc drive or a flexible disc drive can be used in place of or in conjunction with the hard disc unit 415. In addition to the liquid crystal display unit 431, the operation panel 43 also includes a touch panel integrated with the liquid crystal display unit 431 to form a single assembly and a plurality of keys. The user enters data and commands via the touch panel and the keys.

The communication control unit 418 is used for exchanging facsimile data with another facsimile apparatus through a telephone line. The network interface circuit 419 is used for connecting the A digital copying machine 41 to the communication line 1 of the LAN so that the copying machine 41 is capable of exchanging data with input-output apparatuses such as personal computers connected to the LAN.

Figure 34:
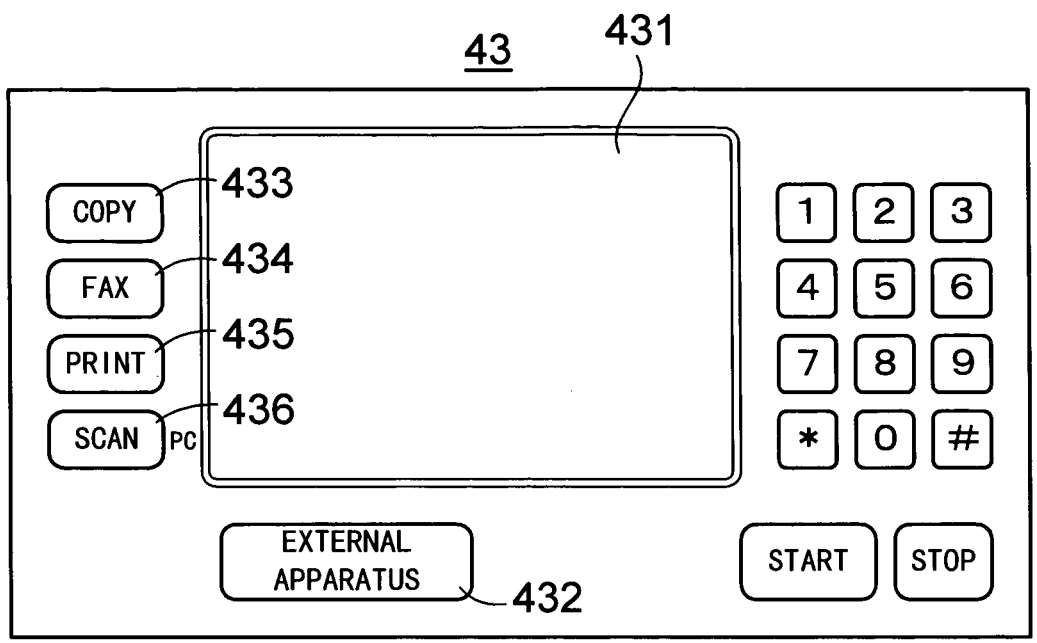
FIG. 34 is a block diagram showing the configuration of an operation panel employed in the digital copying machine of the eighth embodiment.

FIG. 34 is a block diagram showing the configuration of the operation panel 43 employed in the A digital copying machine 41 of the eighth embodiment. As described above, in addition to the liquid crystal display unit 431, the operation panel 43 also has a touch panel integrated with the liquid crystal display unit 431 to form a single assembly and a plurality of keys comprising function keys such as an External Apparatus Specification key 432, a Copy key 433, a FAX key 434, a Print key 435 and a Scan key 436 as well as a Start key, a Stop key and the ten keys. The touch panel is capable of detecting a position on the surface of the liquid crystal display pressed by a finger or the like, offering a function of a pointing device in the same way as a mouse does.

When one of the function keys is pressed, a screen for setting a variety of sub-functions or a message describing the status of the A digital copying machine 41 appears on the liquid crystal display unit 431. To be more specific, when the Copy key 433 is pressed, a screen for setting a variety of copying conditions such as the number of copies, the scale factor, the concentration and the finish as well as a message screen are displayed. When the FAX key 434 is pressed, a screen for setting a variety of facsimile conditions such as the FAX number of a destination and the read density as well as a message screen are displayed. When the Print key 435 is pressed, a screen for selecting image data for printing from what is stored in the hard disc unit 415 is displayed. When the Scan key 436 is pressed, a screen for selecting a device for storing image data input by the scanner is displayed.

Figure 35:
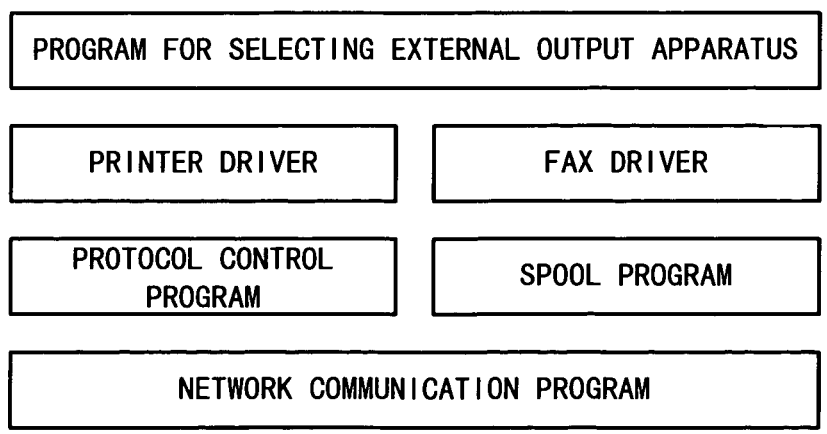
FIG. 35 is an explanatory diagram showing a hierarchical structure of pieces of software loaded into a RAM unit employed in the digital copying machine of the eighth embodiment.

FIG. 35 is an explanatory diagram showing a hierarchical structure of layers of software loaded into the RAM unit 412 employed in the A digital copying machine 41 of the eighth embodiment. In the hierarchical structure, the lower the level of a layer of software, the closer the layer of software to hardware. The layer of software at the top of the hierarchical structure is a program for selecting an external output apparatus which is invoked when the External Apparatus Specification key 432 of the operation panel 43 is pressed. This program is used for specifying a destination to which image data is to be output. That is, the A digital copying machine 41 is capable of outputting image data stored in the hard disc unit 415 or another storage unit to an output apparatus or a personal computer specified by the external output apparatus selecting program. The external output apparatus selecting program displays a layout diagram showing the layout of a room where output apparatuses installed in the room are each represented by an icon.

A layer of software at a level lower than the external output apparatus selecting program is printer drivers each for outputting data to a printer and facsimile drivers each for outputting data to a facsimile apparatus. To put it in detail, the printer drivers are each provided for a printer whereas the facsimile drivers are each provided for a facsimile apparatus. Data output by the drivers is once stored by a spooler at a layer of software at a level lower than the drivers in the hard disc unit 415 to form a queue before being transmitted to output apparatuses in accordance with scheduling. The layer of software at a level lower than the drivers also includes a protocol control program for controlling communication protocols adopted in the network. To put it in detail, the protocol control program creates a command for putting data to be transmitted in a packet conforming to a communication protocol such as the TCP/IP.

Figure 36:
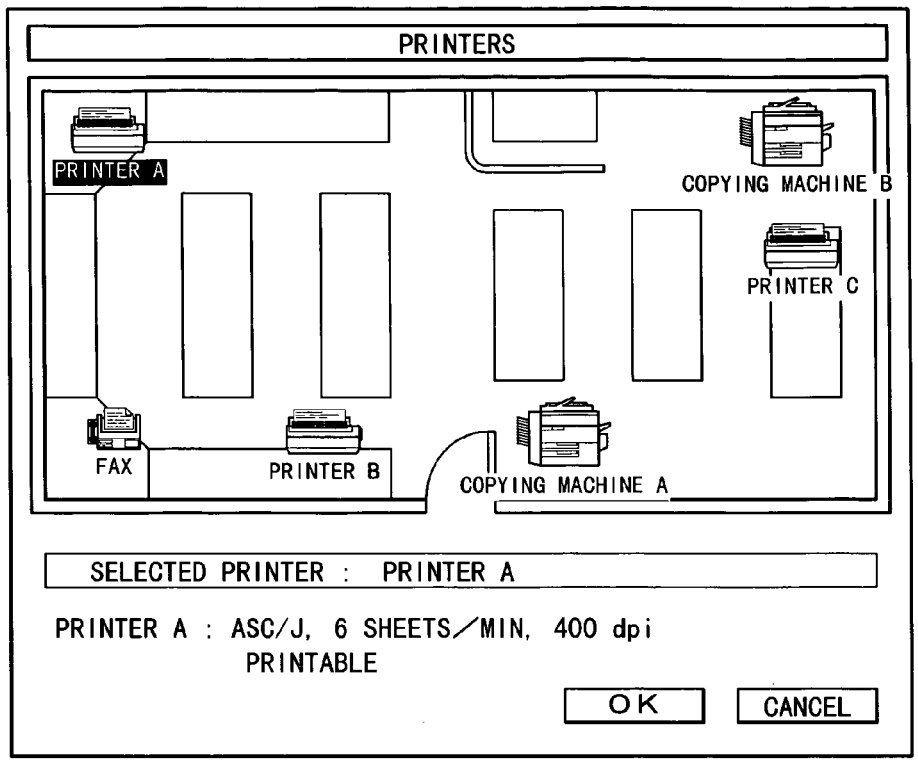
FIG. 36 is a diagram illustrating an external printer selecting dialog box displayed on a liquid crystal display screen of the digital copying machine in the eighth embodiment.

FIG. 36 is a diagram illustrating a dialog box displayed on a liquid crystal display unit 431 of the A digital copying machine 41 of the eighth embodiment for selecting a printer. The dialog box is displayed when the External Apparatus Specification key 432 and the Print key 435 of the operation panel 43 are pressed consecutively. First of all, when the External Apparatus Specification key 432 is pressed, the external apparatus specifying program is invoked, putting the operation panel 43 in a select mode in which the function keys function as keys for switching the displayed screen to a dialog box for selecting a type of input-output apparatus. To be more specific, when the FAX key 434 is pressed in this select mode, the displayed screen is switched to a dialog box showing only output apparatuses having the facsimile function. On the other hand, pressing the Print key 435 or the Scan key 436 in the select mode will switch the displayed screen to a dialog box showing only output apparatuses having the printer function or personal computers respectively.

In the dialog box shown in FIG. 36, output apparatuses are each displayed as an icon representing a printer. When an icon is pressed by a finger or the like, the icon is put in an inverted display state. The touch panel detects the location of a pressed icon. The apparatus name of an apparatus represented by a selected icon is displayed on a field marked with a phrase 'Selected Printer' at the lower part of the screen. Beneath the field displaying the name of an apparatus, information unique to the selected apparatus such as specification data including a transmission speed is displayed. Below the field for displaying the unique information, the present status of the selected apparatus is displayed.

In order to change a selected icon to another one, it is necessary to just press a desired replacement icon. In this way, the icon selected previously is released from a selected state while the icon newly pressed is put in a selected state instead. A desired printer is selected by first putting an icon representing the printer in a selected state and then pressing the 'OK' button at the bottom of the screen. When the 'OK' or 'Cancel' button is pressed, the select mode is terminated and a screen of a normal mode appears on the liquid crystal display unit 431. It should be noted that, when the 'Cancel' button is pressed, the normal mode is restored without changing the setting of an output apparatus. With the A digital copying machine 41, it is thus possible to transmit data stored in the hard disc unit 415 or another memory to an external output apparatus which is selected in the way described above.

Figure 37:
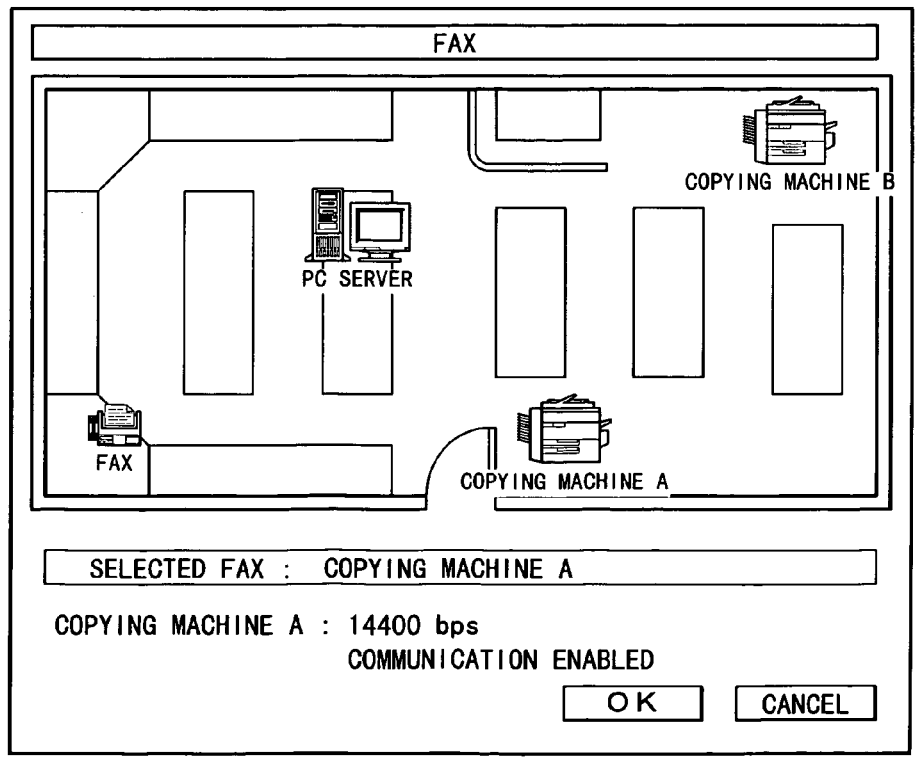
FIG. 37 is a diagram illustrating a facsimile apparatus selecting dialog box displayed on a liquid crystal display screen of the digital copying machine in the eighth embodiment.

FIG. 37 is a diagram illustrating a dialog box displayed on a liquid crystal display unit 431 of the operation panel 43 employed in the A digital copying machine 41 of the eighth embodiment for selecting a facsimile apparatus. The dialog box is displayed when the External Apparatus Specification key 432 and the FAX key 434 of the operation panel are pressed consecutively. In the dialog box, output apparatuses are each displayed as an icon representing a facsimile apparatus. When an icon is pressed by a finger or the like, the icon is put in an inverted display state. The apparatus name of an apparatus represented by a selected icon is displayed on a field marked with a phrase 'Selected FAX' at the lower part of the screen. Beneath the field displaying the name of an apparatus, information unique to the selected apparatus such as specification data including a transmission speed is displayed. Below the field for displaying the unique information, the present status of the selected apparatus is displayed.

In order to change a selected icon to another one, it is necessary to just press a desired replacement icon. In this way, the icon selected previously is released from a selected state while the icon newly pressed is put in a selected state instead. A desired facsimile apparatus is selected by first putting an icon representing the facsimile apparatus in a selected state and then pressing the 'OK' button at the bottom of the screen. When the 'OK' or 'Cancel' button is pressed, the select mode is terminated and a screen of the normal mode appears on the liquid crystal display unit 431. It should be noted that, when the 'Cancel' button is pressed, the normal mode is restored without changing the setting of an output apparatus.

Figure 38:
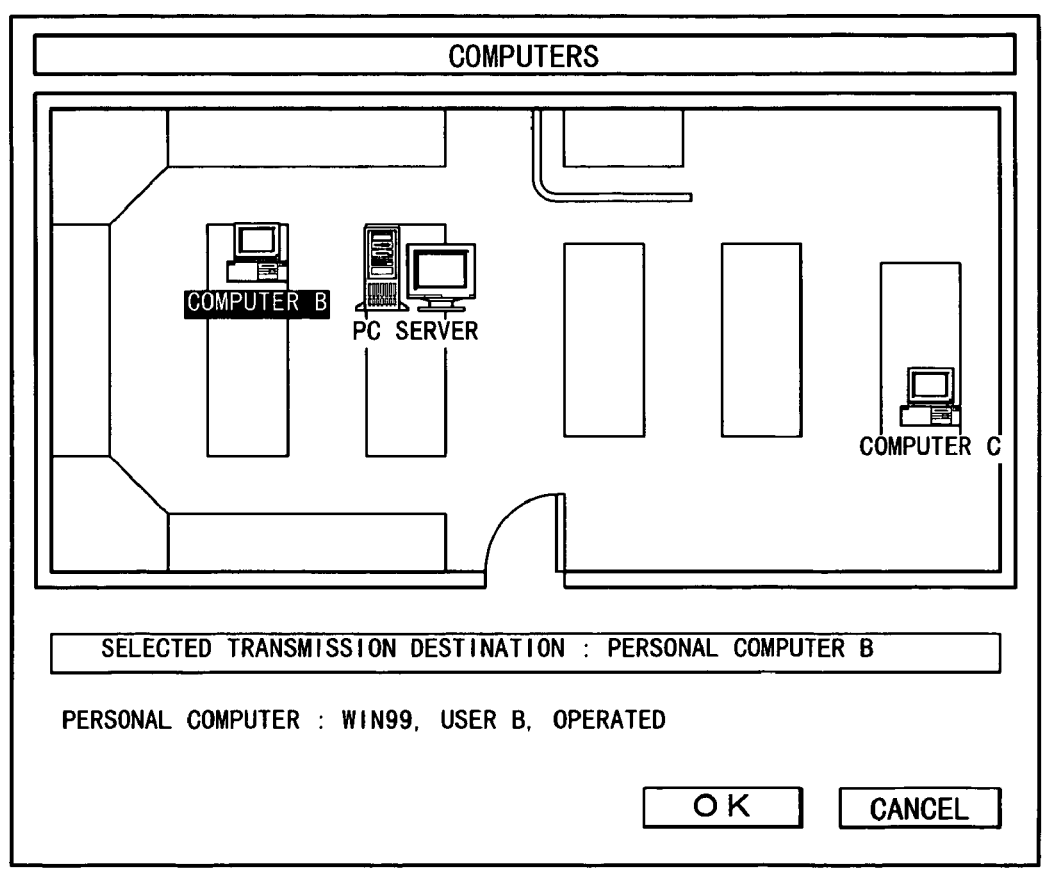
FIG. 38 is a diagram illustrating a personal computer selecting dialog box displayed on a liquid crystal display screen of the digital copying machine in the eighth embodiment.

FIG. 38 is a diagram illustrating a dialog box displayed on a liquid crystal display unit 431 of the operation panel 43 employed in the A digital copying machine 41 of the eighth embodiment for selecting a personal computer. The dialog box is displayed when the External Apparatus Specification key 432 and the Scan key 436 of the operation panel are pressed consecutively. As described before, the Scan key 436 in the select mode is used to switch the displayed screen to a dialog box showing only personal computers. A personal computer displayed on this dialog box can be specified as an output apparatus, allowing the A digital copying machine 41 to transmit any arbitrary image data stored in the hard disc unit 415 or another memory to the personal computer. In order to save received image data as a bit map in an output apparatus, an environment for executing a program for saving the data is required in the output apparatus. Apparatuses that have a function to set such an environment are the PC server 10, the B personal computer 12 and the C personal computer 13. That is why icons representing these 3 apparatuses are displayed on the dialog box. A personal computer is specified in the same way as the procedures to select a printer and a scanner described earlier by referring to FIGS. 36 and 37 respectively.

By the way, the layout diagram to be displayed on a screen of the select mode is made by a personal computer in the same way as that explained by referring to FIG. 9 for the first embodiment. The data of the layout diagram is then transmitted by the personal computer to the A digital copying machine 41 to be stored in the hard disc unit 415 employed therein. Apparatus information of each output apparatus stored in a hard disc unit of the personal computer as an apparatus information like the one shown in FIG. 11 can be referenced by the A digital copying machine 41. In order to speed up the processing, the apparatus information table can also be transmitted by the personal computer to the A digital copying machine 41 to be stored in the hard disc unit 415 employed therein in advance.

Figure 39:
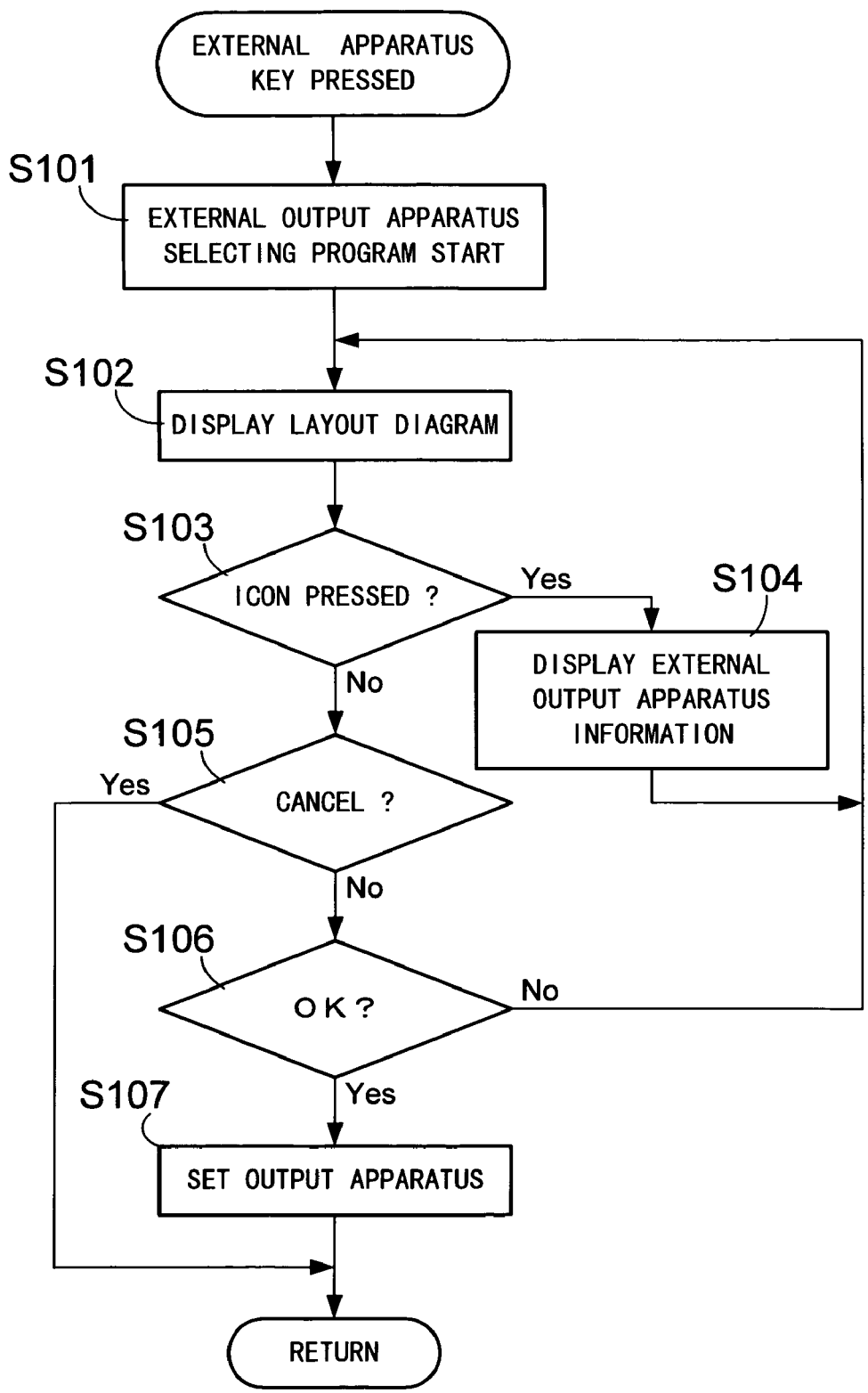
FIG. 39 shows a flowchart of a program for selecting an output apparatus according to the eighth embodiment.

FIG. 39 shows a flowchart representing processing carried out by a program in the A digital copying machine 41 for selecting an external output apparatus according to the eighth embodiment. As shown in the figure, the flowchart begins with a step S101 at which the program for selecting an external output apparatus is invoked, putting the operation panel 43 in a select mode when the External Apparatus Specification key 432 is pressed. The flow of processing then goes on to a step S102 at which the program for selecting an external output apparatus displays a layout diagram on the liquid crystal display unit 431. As described earlier, by pressing a function key, the type of output apparatus displayed on the layout diagram can be changed.

Then, the flow of processing proceeds to a step S103 to form a judgment as to whether or not an icon displayed on the dialog box has been pressed. If an icon has been pressed, the flow of processing continues to a step S104 at which the pressed icon is put in a selected state and information unique to an output apparatus represented by the icon is acquired and displayed. The information unique to the output apparatus is fetched from an apparatus information table like the one shown in FIG. 11. In addition, the present status of the selected output apparatus is also acquired and displayed as well. After the processing carried out at the step S104 is completed, the flow of processing then returns to the step S102.

If the outcome of the judgment formed at the step S103 indicates that no icon has been pressed, on the other hand, the flow of processing continues to a step S105 to form a judgment as to whether or not the 'Cancel' button has been pressed. If the 'Cancel' button has been pressed, the select mode is terminated and a normal mode is restored without doing anything. If the 'Cancel' button was not pressed, on the other hand, the flow of processing goes on to a step S106 to form a judgment as to whether or not the 'OK' button has been pressed. If the 'OK' button has been pressed, the flow of processing proceeds to a step S107 at which processing to select an external apparatus is carried out to set an output apparatus represented by the pressed icon as an output destination. Then, the normal mode is restored. If the outcome of the judgment formed at the step S106 indicates that the 'OK' button has not been pressed, on the other hand, the flow of processing returns to the step S102.

The layout diagram and the apparatus information table are created by a personal computer connected to the network in the same way as what has been explained for the embodiments described so far. The layout diagram and the apparatus information table made by the personal computer are then transmitted to each digital copying machine to be stored in the hard disc unit 415 employed therein. As an alternative, the layout diagram and the apparatus information table can also be stored in and controlled by the PC server 10 in an integrated manner. By controlling the layout diagram and the apparatus information table in the PC server 10, the modification work to delete, insert and change information from, into and of the layout diagram and the apparatus information table can be carried out with ease. Each personal computer and each digital copying machine are capable of referencing data of the layout diagram and the apparatus information table stored in the PC server 10 with a high degree of freedom.

Figure 40:
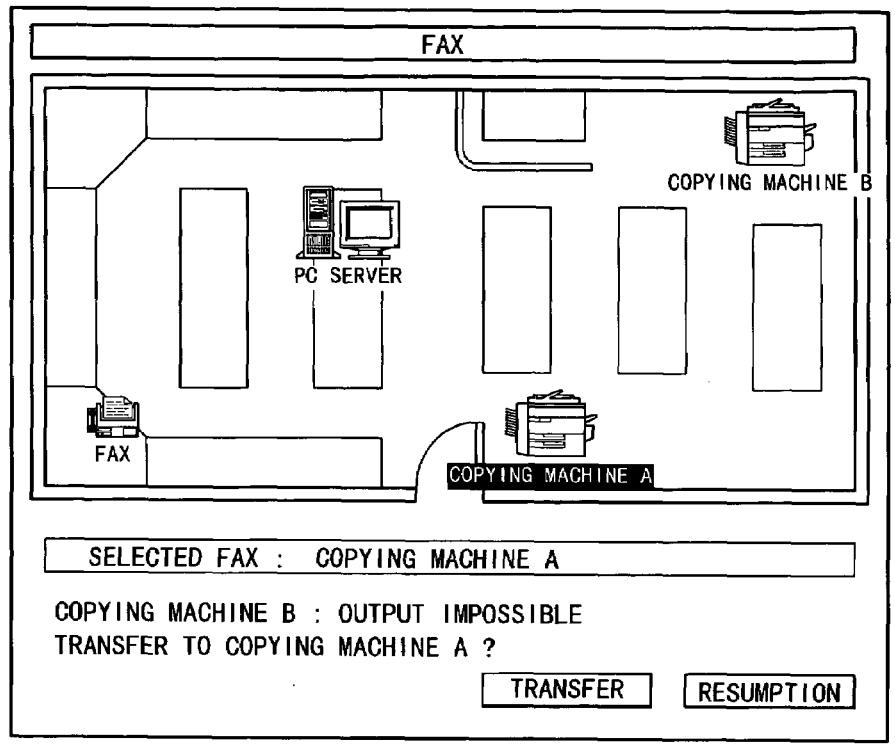
FIG. 40 is a diagram illustrating a facsimile apparatus selecting dialog box displayed on a liquid crystal display screen of the digital copying machine in the eighth embodiment in the event of a failure.

The B digital copying machine 42 has the same configuration as the A digital copying machine 41 and an operation panel identical with the operation panel 43. FIG. 40 is a diagram illustrating a facsimile apparatus selecting dialog box displayed as a screen on a liquid crystal display unit 431 of the operation panel 43 employed in the B digital copying machine 42 of the eighth embodiment in the event of a failure such as a paper jam or a runout state of paper during a process of receiving facsimile data, making it no longer possible to output the data. The liquid crystal display screen of the B digital copying machine 42 displays a message indicating that the B digital copying machine 42 is at the present time in a state of being incapable of outputting facsimile data. The screen also displays an query to the user about whether or not received facsimile data should be transferred to another output apparatus having a facsimile function.

The layout diagram displayed on the screen shows an icon representing the B digital copying machine 42 itself and all icons each representing an output apparatus that has the same function as the failing function of the copying machine 42 and can thus be used as a substitute for the apparatus in which a failure has occurred. The icon representing the B digital copying machine 42 itself is displayed in a blinking state or in a color different from the others to distinguish the copying machine 42 from the other apparatuses. The B digital copying machine 42 also automatically puts an icon representing a possible replacement output apparatus in closest proximity to the copying machine 42 itself in an inverted display state to indicate that the apparatus is selected. Thus, in the dialog box shown in FIG. 40, being closest to the B digital copying machine 42, the A digital copying machine 41 is selected. The distances from the B digital copying machine 42 to the other output apparatuses are proportional to the distances among icons displayed on the layout diagram to represent the apparatuses and can thus be compared with each other.

It is needless to say that the replacement output apparatus automatically selected by the B digital copying machine 42 can be changed by the user. That is, the substitute output destination can be changed from the A digital copying machine 41 automatically selected in the dialog box shown in FIG. 40 to another output apparatus represented by an icon that is pressed by the user. If the user selects the PC server 10, for example, in an area marked with a phrase 'Selected FAX' at the lower part of the dialog box, a phrase 'PC server' is displayed. Beneath the area, the dialog box displays a confirmation query saying: "Is the PC server indeed desired?" Of course, the user can not select the B digital copying machine 42 itself as a substitute.

After an output apparatus has been selected, a 'Transfer' button is pressed to transmit the facsimile data to the selected output apparatus in a so-called substitute operation. While the substitute operation is being carried out, the paper jam can be corrected, the paper supply can be replenished or another action can be taken to correct the problem. At any rate, while an effort is being made to eliminate a detected failure, facsimile data can be redirected to a replacement output apparatus, allowing the time it takes to output the facsimile data to be made short and the work efficiency to be increased a high level in comparison with a case in which a substitute output apparatus is not used. When it is undesirable to transmit facsimile data to a substitute output apparatus, an 'Output Resumption' button is pressed after the detected failure is eliminated by, for example, correcting the paper jam or replenishing the paper supply. By doing so, the operation to output the facsimile data to the B digital copying machine 42 is resumed without transmitting the data to a substitute output apparatus.

Figure 41:
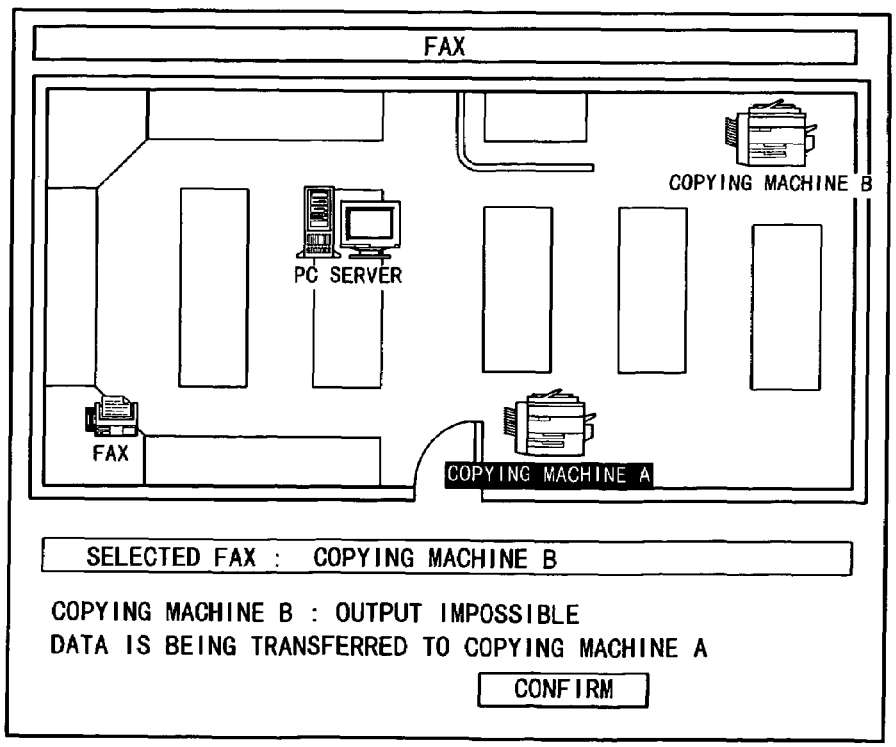
FIG. 41 is a diagram illustrating a facsimile apparatus selecting dialog box which is displayed on a liquid crystal display screen of the digital copying machine of the eighth embodiment after an action has been taken to correct the failure indicated in the dialog box shown in FIG. 40.

FIG. 41 is a diagram showing a screen displayed on the liquid crystal display unit 431 while data is being transferred to a substitute output apparatus after the 'Transfer' button on the dialog box shown in FIG. 40 has been pressed. As shown in FIG. 41, the screen also displays a message stating: "Data is being transferred to the A copying machine" at the lower part of the screen. As the operation to transmit the data is completed or when a 'Confirm' button is pressed, the screen disappears from the liquid crystal display unit 431, being replaced by a screen for the normal mode.

Figure 42:
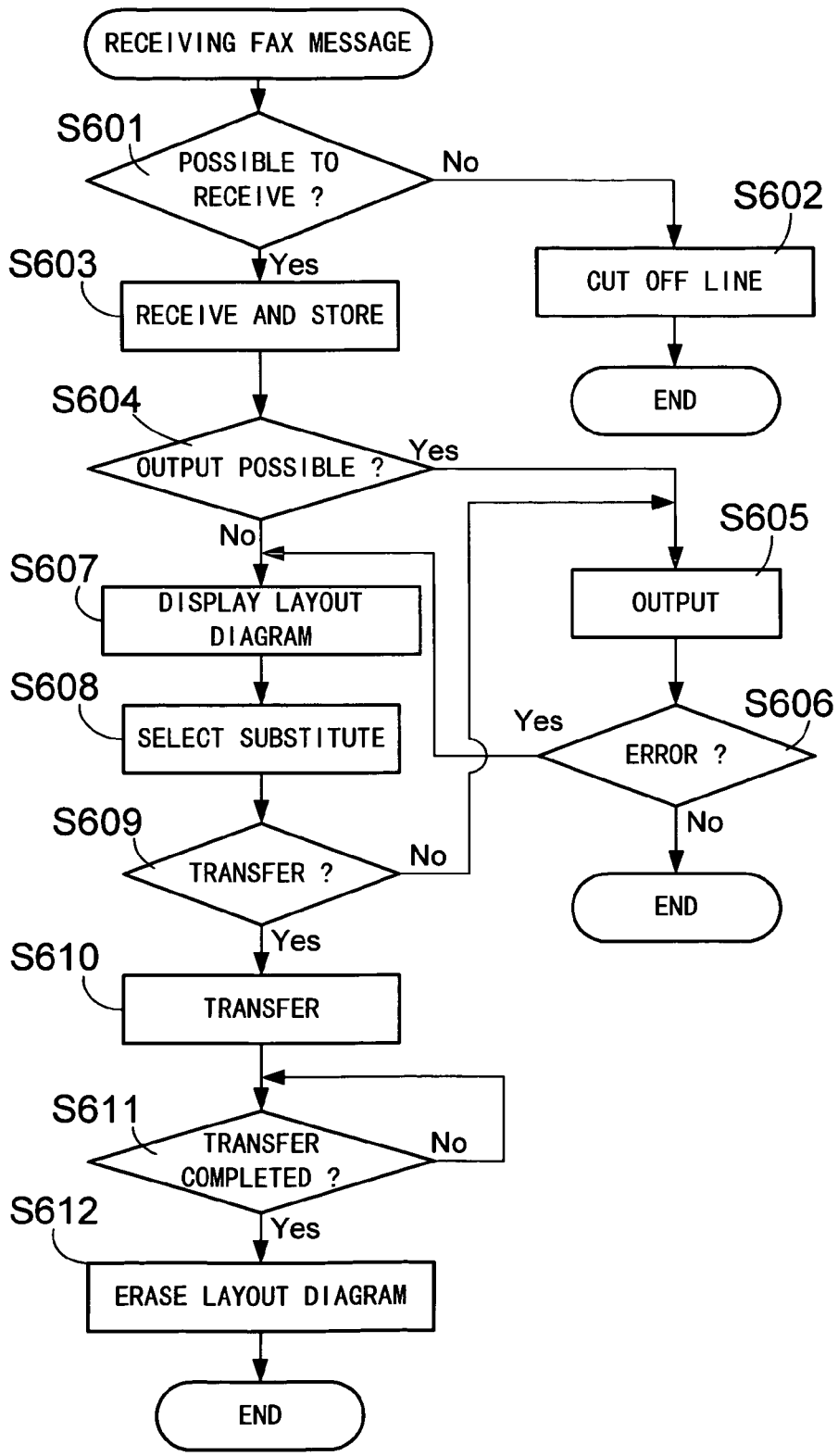
FIG. 42 shows a flowchart representing operations to select a substitute output apparatus for receiving an incoming facsimile message in the event of a failure according to the eighth embodiment.

FIG. 42 shows a flowchart representing operations to select a substitute output apparatus for receiving an incoming facsimile message in the event of a failure in the B digital copying machine 42 according to the eighth embodiment. As shown in the figure, the flowchart begins with a step S601 to form a judgment as to whether the B digital copying machine 42 is capable of receiving facsimile data when the data arrives at the machine 42. If the B digital copying machine 42 is not capable of receiving the data due to, for example, a failure, the flow of processing goes on to a step S602 at which the line is cut off and the processing to receive facsimile data is ended. If the outcome of the judgment formed at the step S601 indicates that the B digital copying machine 42 is capable of receiving the data, on the other hand, the flow of processing proceeds to a step S603 at which the facsimile data is received and stored in the RAM unit 412 or the hard disc unit 415. In the mean time, pieces of processing are carried out at a step S604 and subsequent steps concurrently with the processing of the step S603.

At the step S604, the printer unit 417 of the B digital copying machine 42 is examined to in order to form a judgment as to whether or not the printer unit 417 is in a state of being capable of outputting data. If the printer unit 417 is found capable of outputting data, the flow of processing goes on to a step S605 at which pieces of facsimile data are output to the printer unit 417 sequentially. The flow of processing then proceeds to a step S606 to form a judgment as to whether or not an error has been detected during the output operation. An error can be attributed to causes such as a paper jam and a run-out state of paper. If no error was detected till the end of the operation to output the facsimile data, the processing to receive the incoming facsimile data is ended.

If the outcome of the judgment formed at the step S604 indicates that the printer unit 417 is not capable of outputting data or the outcome of the judgment formed at the step S606 indicates that an error has been detected in the printer unit 417, on the other hand, the flow of processing continues to a step S607 at which a layout diagram like the one shown in FIG. 40 is displayed as a screen on the liquid crystal display unit 431 of the operation panel 43. In addition, the apparatus information table is searched for output apparatuses capable of serving as a substitute for the B digital copying machine 42 itself. Icons representing all output apparatuses found in the search operation are then displayed on the layout diagram. The flow of processing then goes on to a step S608 at which all the output apparatuses found in the search operation are searched for one located in closest proximity to the B digital copying machine 42 itself and an icon representing the closest output apparatus is put in an inverted display state to indicate that the apparatus is selected. At this point, the screen displays a dialog box shown in FIG. 40.

Then, the flow of processing proceeds to a step S609 to form a judgment as to whether or not the 'Transfer' or 'Output Resumption' button displayed on the screen shown in FIG. 40 has been pressed. If the 'Output Resumption' button has been pressed because the error detected at the step S606 has been fixed, the flow of processing returns to the step S605 at which the output operation by the B digital copying machine 42 is resumed. If the outcome of the judgment formed at the step S609 indicates that the 'Transfer' button has been pressed, on the other hand, the flow of processing continues to a step S610 at which the transfer of facsimile data to the substitute output apparatus selected at the step S608 is carried out. As described above, the substitute output apparatus data used as the transfer destination is put in a selected state on the screen shown in FIG. 40. As the transfer of facsimile data is started, the screen is changed to that shown in FIG. 41. Subsequently, the flow of processing goes on to a step S611 to form a judgment as to whether or not the transfer of the facsimile data has been completed and whether or not the 'Confirm' button displayed on the screen shown in FIG. 41 has been pressed. If the transfer of the facsimile data is under way and the 'Confirm' button has not been pressed, the flow of processing returns to the step S611 to repeat the step S611 as a loop of execution till the transfer is completed or the 'Confirm' button is pressed. As the transfer of the facsimile data is completed or the 'Confirm' button is pressed, the flow of processing proceeds to a step S612 at which the displayed layout diagram is erased from the screen and the normal mode is restored, ending the processing to receive the facsimile data.

Figure 43:
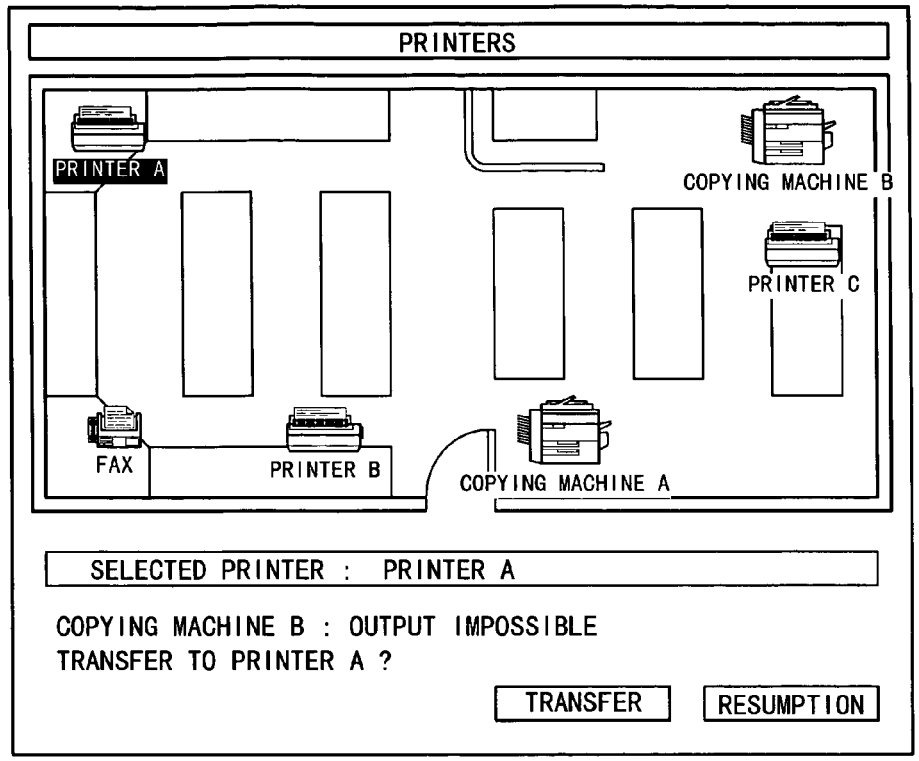
FIG. 43 is a diagram illustrating a printer selecting dialog box displayed on a liquid crystal display screen of the digital copying machine in the eighth embodiment in the event of a failure.

FIG. 43 is a diagram illustrating a printer selecting dialog box displayed as a screen on the liquid crystal display unit 431 of the operation panel 43 employed in the B digital copying machine 42 of the eighth embodiment in the event of a failure occurring in the course of a copy operation such as a paper jam or a run-out state of paper, making it no longer possible to output data. The liquid crystal display screen of the B digital copying machine 42 also displays a message stating that, at the present time, the B digital copying machine 42 is in a state of being incapable of outputting data. At the same time, the screen displays a query to the user about whether or not image data not output yet is to be transferred to another output apparatus having a printer function.

The layout diagram displayed on the screen shows an icon representing the B digital copying machine 42 itself and all icons each representing an output apparatus that has the same function as the failing function of the copying machine 42. The icon representing the B digital copying machine 42 itself is displayed in a blinking state or in a color different from the others to distinguish the copying machine 42 from the other apparatuses. The B digital copying machine 42 also automatically puts an icon representing a possible replacement output apparatus in closest proximity to the copying machine 42 itself in an inverted display state to indicate that the apparatus is selected. Thus, in the dialog box shown in FIG. 43, the C printer 23 was once automatically selected but the user later changed the substitute output apparatus to the A printer 21.

Pressing the 'Transfer' button in this state will transfer image data not output yet to the selected output apparatus, carrying out the so-called substitute operation. While the substitute operation is being carried out, the paper jam can be corrected, the paper supply can be replenished or another action can be taken to correct the problem. At any rate, while an effort is being made to eliminate a detected failure, data to be printed can be redirected to a replacement output apparatus, allowing the time it takes to output the data to be made short and the work efficiency to be increased to a high level in comparison with a case in which a substitute output apparatus is not used. When it is undesirable to transmit the data to be printed to a substitute output apparatus, an 'Output Resumption' button is pressed after the detected failure is eliminated by, for example, correcting the paper jam or replenishing the paper supply. By doing so, the operation to output the data to be printed to the B digital copying machine 42 is resumed without transmitting the data to a substitute output apparatus.

Figure 44:
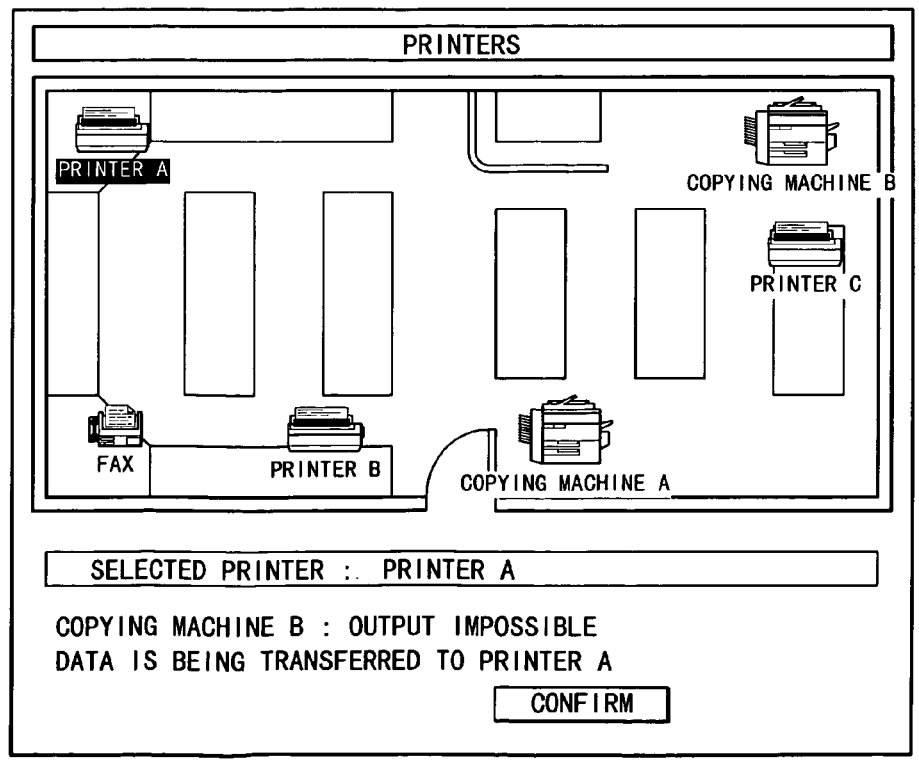
FIG. 44 is a diagram illustrating a printer selecting dialog box which is displayed on a liquid crystal display screen of the digital copying machine in the eighth embodiment after an action has been taken to correct the failure indicated in the dialog box shown in FIG. 43.

FIG. 44 is a diagram showing a screen displayed on the liquid crystal display unit while data is being transferred to a substitute output apparatus after the 'Transfer' button on the dialog box shown in FIG. 43 has been pressed. As shown in FIG. 44, the screen also displays a message stating: "Data is being transferred to the A printer" at the lower part of the screen. As the operation to transmit the data is completed or when a 'Confirm' button is pressed, the screen disappears from the liquid crystal display unit 431, being replaced by a screen for the normal mode.

Figure 45:
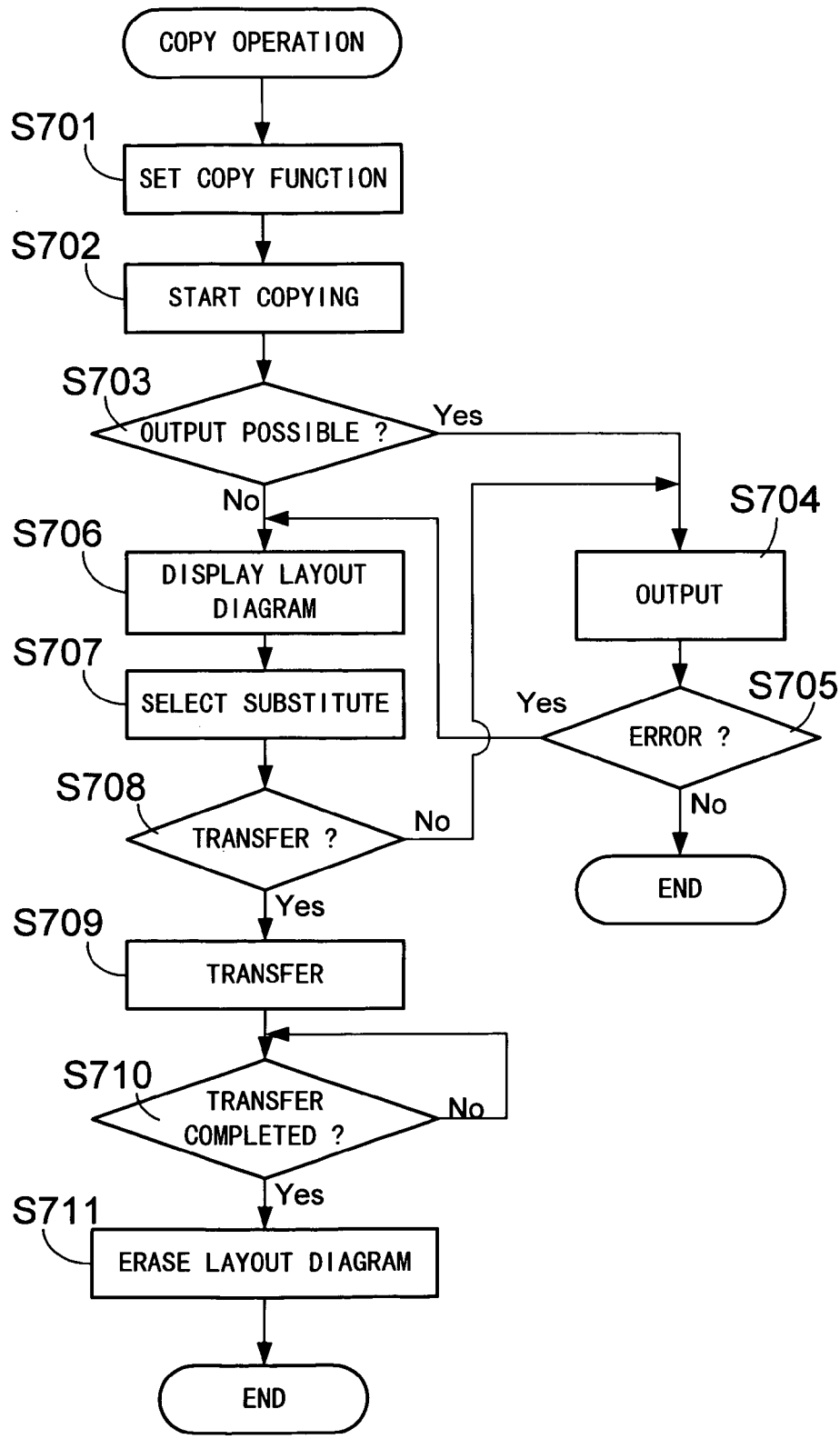
FIG. 45 shows a flowchart representing operations to select a substitute output apparatus for receiving an output of a copy operation according to the eighth embodiment.

FIG. 45 shows a flowchart representing operations to select a substitute output apparatus for receiving an output of a copy operation in the event of a failure in the eighth embodiment. As shown in the figure, the flowchart begins with a step S701 at which processing to set a copy function is carried out when a copy operation is started in the B digital copying machine 42. The flow of processing then goes on to a step S702 at which the start command given by the operator is implemented.

Then, the flow of processing proceeds to a step S703 to form a judgment as to whether or not the printer unit 417 employed in the B digital copying machine 42 is in a state of being capable of outputting data. If the printer unit 417 is found capable of outputting data, the flow of processing goes on to a step S704 at which data read in by the scanner unit 416 is output to the printer unit 417. The flow of processing then proceeds to a step S705 to form a judgment as to whether or not an error has been detected during the output operation. An error can be attributed to causes such as a paper jam and a run-out state of paper. If no error was detected till the end of the operation to output all image data, the processing to copy the scanner data is ended.

If the outcome of the judgment formed at the step S703 indicates that the printer unit 417 is not capable of outputting data or the outcome of the judgment formed at the step S705 indicates that an error has been detected in the printer unit 417, on the other hand, the flow of processing continues to a step S706 at which a layout diagram like the one shown in FIG. 43 is displayed on the liquid crystal display unit 431 of the operation panel 43. In addition, the apparatus information table is searched for output apparatuses capable of serving as a substitute for the B digital copying machine 42 itself. Icons representing all output apparatuses found in the search operation are then displayed on the layout diagram. The flow of processing then goes on to a step S707 at which all the output apparatuses found in the search operation are searched for one located in closest proximity to the B digital copying machine 42 itself and an icon representing the closest output apparatus is put in an inverted display state to indicate that the apparatus is selected. At this point, the screen displays a dialog box shown in FIG. 43.

Then, the flow of processing proceeds to a step S708 to form a judgment as to whether or not the 'Transfer' or 'Output Resumption' button displayed on the screen shown in FIG. 43 has been pressed. If the 'Output Resumption' button has been pressed because the error detected at the step S705 has been fixed, the flow of processing returns to the step S704 at which the output operation by the B digital copying machine 42 is resumed. If the outcome of the judgment formed at the step S708 indicates that the 'Transfer' button has been pressed, on the other hand, the flow of processing continues to a step S709 at which the transfer of image data to the substitute output apparatus selected at the step S707 is carried out. As described above, the substitute output apparatus data used as the transfer destination is put in a selected state on the screen shown in FIG. 43. As the transfer of image data is started, the screen is changed to that shown in FIG. 44. Subsequently, the flow of processing goes on to a step S710 to form a judgment as to whether or not the transfer of the image data has been completed and whether or not the 'Confirm' button displayed on the screen shown in FIG. 44 has been pressed. If the transfer of the image data is under way and the 'Confirm' button has not been pressed, the flow of processing returns to the step S710 to repeat the step S710 as a loop of execution till the transfer is completed or the 'Confirm' button is pressed. As the transfer of the image data is completed or the 'Confirm' button is pressed, the flow of processing proceeds to a step S711 at which the displayed layout diagram is erased from the screen and the normal mode is restored, ending the copy processing.

According to the eighth embodiment described above, in the event of a failure occurring in a digital copying machine, data to be printed can be transferred to a replacement output apparatus which is capable of serving as a substitute for the function of the digital copying machine. As a result, while an effort is being made to eliminate a failure detected in the digital copying machine, data to be printed data can be redirected to another replacement output apparatus, allowing the time it takes to output the data to be made short and the work efficiency to be increased to a high level in comparison with a case in which a substitute output operation is not used. In addition, since the location of the substitute output apparatus serving as a destination to which data to be printed is transferred is shown in the layout diagram, the output text will not be lost. Moreover, since it is easy for the user to know where the transfer destination is located, a text output at the transfer destination can be acquired in a short period of time.

Since the digital copying machine automatically selects a substitute output apparatus in closest proximity to the machine itself, a substitute output apparatus can be selected by a simple operation of simply pressing the 'Transfer' button. In addition, since the user can change the substitute output apparatus, a most convenient output apparatus can be selected. Moreover, the user is also allowed to select whether or not data is to be transferred to a substitute output apparatus.

As a result, the user is allowed to select an operation that is optimum for the current situation.

Ninth Embodiment

Next, a ninth embodiment is explained. The basic configuration of the ninth embodiment is the same as the eighth embodiment. In the case of the eighth embodiment, a substitute output apparatus is selected in the event of an error occurring in a digital copying machine. In the case of the ninth embodiment, on the other hand, when the user sets a condition of the copy function exceeding the copy performance of a digital copying machine, a supplementary output apparatus is selected as an apparatus to be used in conjunction with the digital copying machine and data to be printed is transferred to the supplementary output apparatus in order to meet the condition set by the user. Assume that the A and B digital copying machines 41 and 42 be each a machine having a 10-bin sort tray. Let us consider a case in which the user makes a request for a sort copying job of 20 copies to the A digital copying machine 41. Since the sort copying job can not be carried out by the A digital copying machine 41 alone, a sort copying job of only 10 copies is done by the copying machine 41 itself. The rest of the image data must be transferred to the B digital copying machine 42 which is requested to carry out a sort copying job of the remaining 10 copies. As a result, the A digital copying machine 41 in conjunction with the B digital copying machine 42 which is selected as a supplementary output apparatus are capable of accomplishing the sort copying job of 20 copies.

Figure 46:
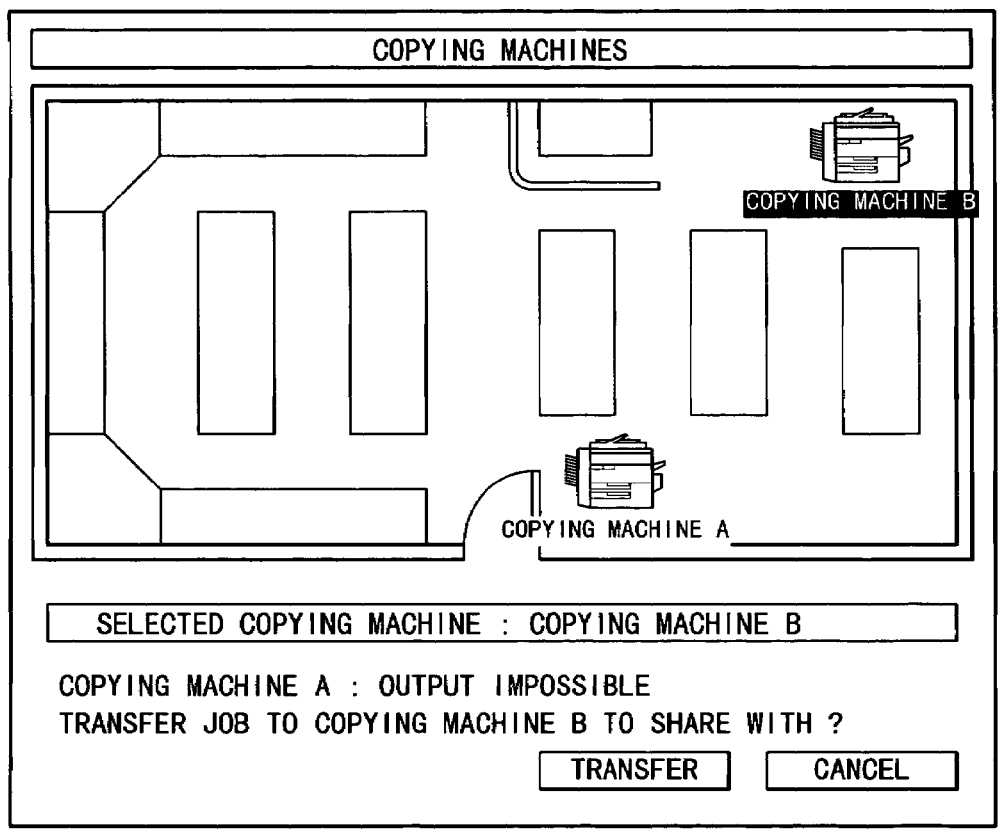
FIG. 46 is a diagram showing a liquid crystal display screen of the digital copying machine in a ninth embodiment.

FIG. 46 is a diagram showing a screen which is displayed on the liquid crystal display unit 431 of the operation panel 43 employed in the A digital copying machine 41 of the ninth embodiment when the user sets a condition of a job unexecutable by the copying machine 41 alone. The screen displays a message stating that the A digital copying machine 41 alone is not capable of carrying out the job and a query about whether or not image data is to be transferred to another output apparatus having a sort function to the user. The layout diagram displayed on the screen includes an icon of the A digital copying machine 41 and icons of all other output apparatuses which are capable of carrying out the job in conjunction with the copying machine 41. The icon representing the A digital copying machine 41 itself is displayed in a blinking state or in a state different from the others to distinguish the copying machine 41 from the other apparatuses. The A digital copying machine 41 also automatically puts an icon representing the B digital copying machine 42 in an inverted display state to indicate that the copying machine 42 is selected as a supplementary output apparatus. If there are a plurality of potential supplementary output apparatuses, the user can re-select one in closest proximity to the A digital copying machine 41 itself.

Figure 47:
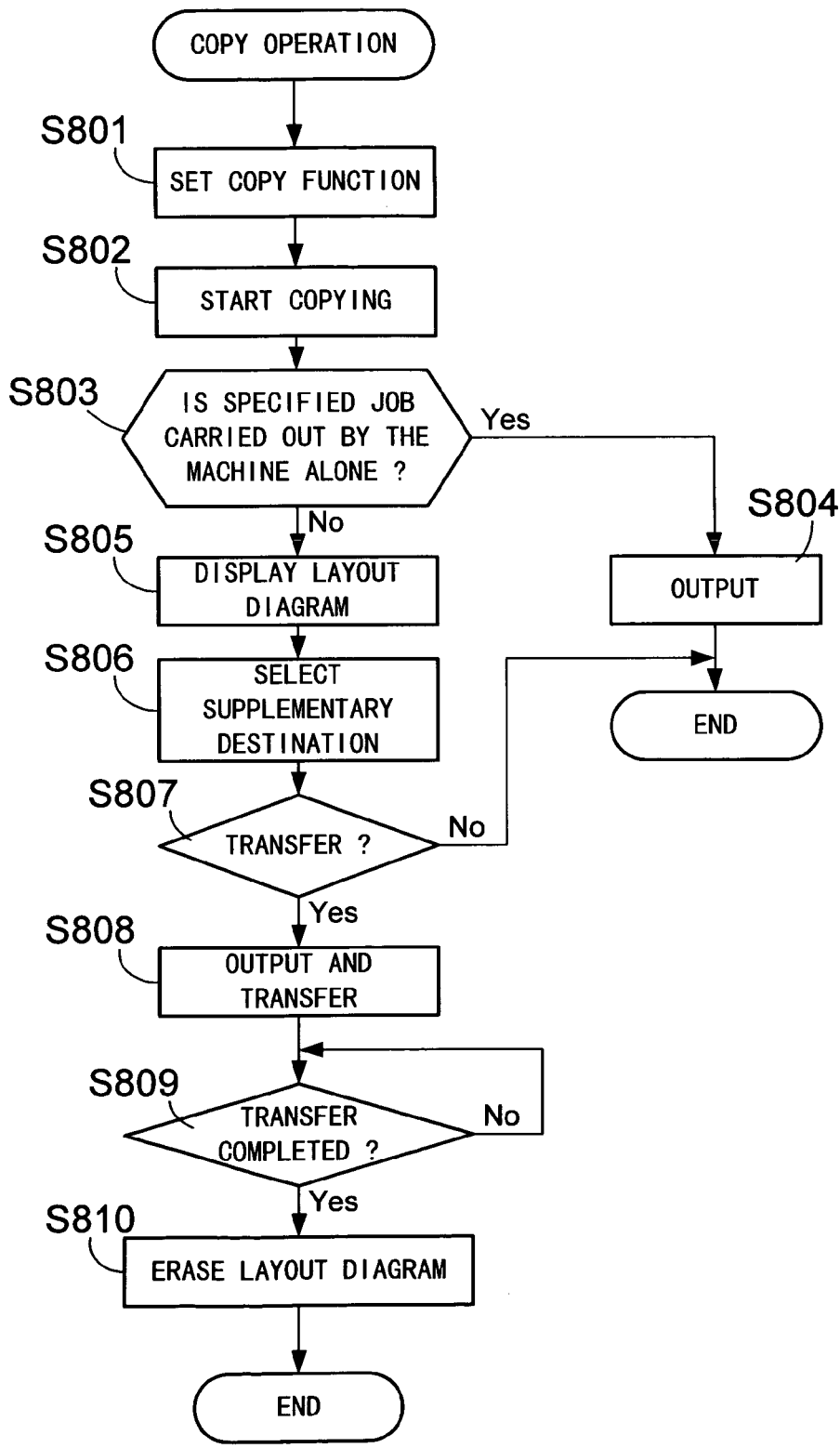
FIG. 47 shows a flowchart representing operations to select a supplementary output apparatus for receiving an output of a copy operation according to the ninth embodiment.

FIG. 47 shows a flowchart representing operations to select a supplementary output apparatus for receiving an output of a copy operation in the ninth embodiment. As shown in the figure, the flowchart begins with a step S801 at which processing to set a copy function is carried out when a copy operation is started in the A digital copying machine 41. The flow of processing then goes on to a step S802 at which the start command given by the operator is implemented. Then, the flow of processing proceeds to a step S803 to form a judgment as to whether a specified job is capable of being carried out by the machine 41 alone or not. If the job is found to be capable of being carried out by the machine 41 alone, the flow of processing goes on to a step S804 at which data read in by the scanner unit 416 is output to the printer unit 417. As the processing carried out at the step S804 is completed, the processing to copy the scanner data is ended.

If the outcome of the judgment formed at the step S803 indicates that the job is capable of being carried out by the machine 41 alone, on the other hand, the flow of processing continues to a step S805 at which a layout diagram like the one shown in FIG. 46 is displayed on the liquid crystal display unit 431 of the operation panel 43. In addition, the apparatus information table is searched for output apparatuses capable of serving as a supplement to the A digital copying machine 41 itself. Icons representing all output apparatuses found in the search operation are then displayed on the layout diagram. The apparatus information table of the ninth embodiment also includes additional information indicating whether or not each of the output apparatuses is capable of carrying out a sorting job and additional information indicating a maximum number of copies producible in a sorting job if the apparatus is capable of doing the job. The flow of processing then goes on to a step S806 at which all the output apparatuses found in the search operation are searched for one located in closest proximity to the A digital copying machine 41 itself and an icon representing the closest output apparatus is put in an inverted display state to indicate that the apparatus is selected.

Then, the flow of processing proceeds to a step S807 to form a judgment as to whether or not the 'Transfer' or 'Cancel' button displayed on the screen shown in FIG. 46 has been pressed. If the 'Cancel' button has been pressed, the copy processing is ended and the job is set again from the beginning. If the outcome of the judgment formed at the step S808 indicates that the 'Transfer' button has been pressed, on the other hand, the flow of processing continues to a step S808 at which the transfer of image data to the supplementary output apparatus selected at the step S806 is carried out and the supplementary output apparatus is requested to carry out the sorting job. At the same time, the outputting and sorting work is also carried out concurrently in the A digital copying machine 41 itself.

As the transfer of image data is started, the screen shown in FIG. 46 also displays a message stating: "Data is output by the A copying machine and the B copying machine" on the message line as well as a 'Confirm' button. Subsequently, the flow of processing goes on to a step S809 to form a judgment as to whether or not the transfer of the image data has been completed and whether or not the 'Confirm' button displayed on the screen shown in FIG. 46 has been pressed. If the transfer of the image data is under way and the 'Confirm' button has not been pressed, the flow of processing returns to the step S809 to repeat the step S809 as a loop of execution till the transfer is completed or the 'Confirm' button is pressed. As the transfer of the image data is completed or the 'Confirm' button is pressed, the flow of processing proceeds to a step S810 at which the displayed layout diagram is erased from the screen and the normal mode is restored, ending the joint copy processing.

In the ninth embodiment described above, a work load is distributed to 2 digital copying machines. It should be noted that work load can also be distributed to 3 or more digital copying machines. In addition, while work is simply distributed equally to the digital copying machines in the case of the ninth embodiment, parameters such as the printing speed and the sorting speed can be taken into consideration in distributing a work load. That is, it is desirable to distribute a work load to digital copying machines for carrying out portions of the load in proportion to such parameters which may vary from apparatus to apparatus. As a result, the distributed work load can be completed at the same time at the output apparatuses, allowing the time it takes to complete the whole work to be made short in comparison with a case in which a work load is just distributed equally among selected output apparatuses.

According to the ninth embodiment described above, part of work, which can not be done by a digital copying machine alone at one time and must thus be split into portions to be done at a plurality of times or requires that a condition of work implementation be set anew, is transferred to a selected supplementary output apparatus by way of a network, allowing the digital copying machine to carry out the work in conjunction with the supplementary output apparatus. As a result, the time it takes to complete the work can be made short and the work efficiency can be increased to a high level in comparison with a case in which a supplementary output apparatus is not used. In addition, since a condition of a job exceeding a functional limit of the digital copying machine alone can be coped with as described above, the user is allowed to set the condition without the need to be aware of the functional limit of each digital copying machine.

Tenth Embodiment

Next, a tenth embodiment is explained. The basic configuration of the tenth embodiment is the same as the eighth and ninth embodiments. In the case of the tenth embodiment, when the time it takes to finish work such as a copying job by a digital copying machine alone is too long due to a strict condition set by the user for the copying job, a supplementary output apparatus is selected as an apparatus to be used in conjunction with the digital copying machine and data to be printed is transferred to the supplementary output apparatus in order to meet the condition. Assume that the A digital copying machine 41 be a machine having a 10-bin sort tray. Let us consider a case in which the user makes a request for a sort copying job of 10 copies of 80 pages per copy to the A digital copying machine 41. Let the printing speed of the A digital copying machine 41 be 20 pages per minute. In this case, a sort copying job of 10 copies of 80 pages per copy (or 800 pages) will be finished by the copying machine 41 alone in 40 minutes (=800 pages/20 pages/minute). In order to shorten the time it takes to finish the work, the later 40 pages are transferred to the B digital copying machine 42 which is also assumed to be a machine having a 10-bin sort tray and a printing speed of 20 pages per minute. As a result, the A digital copying machine 41 in conjunction with the B digital copying machine 42 which is selected as a supplementary apparatus are capable of accomplishing the sort copying job in about half the original time it takes to finish work by the A digital copying machine 41 alone.

Figure 48:
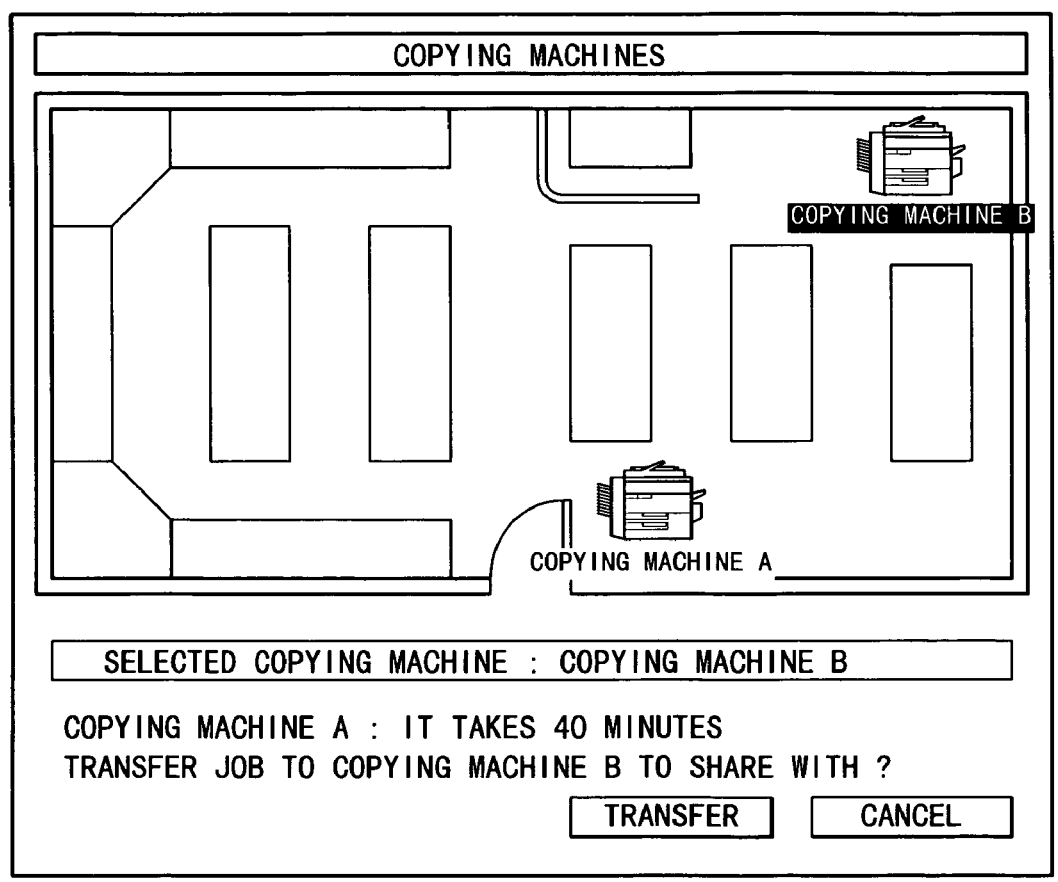
FIG. 48 is a diagram showing a liquid crystal display screen of the digital copying machine in a tenth embodiment.

FIG. 48 is a diagram showing a screen which is displayed on the liquid crystal display unit 431 of the operation panel employed in the A digital copying machine 41 of the tenth embodiment when the user makes a request for a job that takes the copying machine 41 alone an excessively long time to finish. The screen displays the time it takes to finish the job by using only the A digital copying machine 41 and a query about whether or not image data is to be transferred to another output apparatus to the user. The layout diagram displayed on the screen includes an icon of the A digital copying machine 41 and icons of all other output apparatuses which are capable of carrying out the job in conjunction with the copying machine 41. The icon representing the A digital copying machine 41 itself is displayed in a blinking state or in a state different from the others to distinguish the copying machine 41 from the other apparatuses. The A digital copying machine 41 also automatically puts an icon representing the B digital copying machine 42 in an inverted display state to indicate that the copying machine 42 is selected. If there are a plurality of potential supplementary output apparatuses, the user can re-select one in closest proximity to the A digital copying machine 41 itself.

Figure 49:
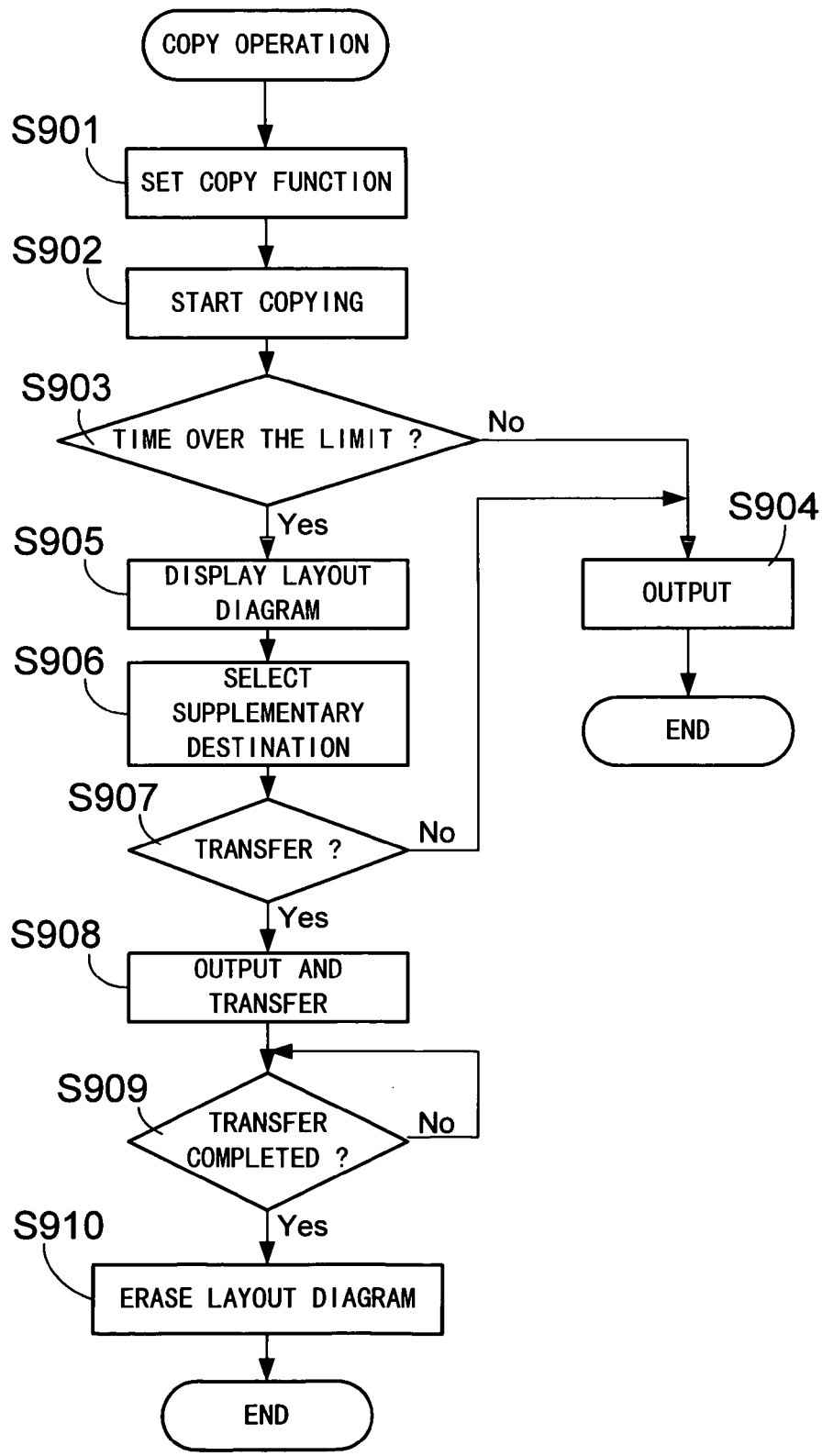
FIG. 49 shows a flowchart representing operations to select a substitute output apparatus for receiving an output of a copy operation according to the tenth embodiment.

FIG. 49 shows a flowchart representing operations to select a supplementary output apparatus for receiving an output of a copy operation in the tenth embodiment. As shown in the figure, the flowchart begins with a step S901 at which processing to set a copy function is carried out when a copy operation is started in the A digital copying machine 41. The flow of processing then goes on to a step S902 at which the start command given by the operator is implemented. Then, the flow of processing proceeds to a step S903 to form a judgment as to whether or not the time it takes to finish the specified job by using the A digital copying machine 41 alone is longer than an upper limit. Assume that the upper limit is set in advance typically at 20 minutes. If the time it takes to finish the specified job is shorter than the upper limit, the flow of processing goes on to a step S904 at which data read in by the scanner unit 416 is output to the printer unit 417. As the processing carried out at the step S904 is completed, the processing to copy the scanner data is ended.

If the outcome of the judgment formed at the step S903 indicates that the time it takes to finish the specified job by using the A digital copying machine 41 alone is longer than an upper limit, on the other hand, the flow of processing continues to a step S905 at which a layout diagram like the one shown in FIG. 48 is displayed on the liquid crystal display unit 431 of the operation panel 43. In addition, the apparatus information table is searched for output apparatuses capable of serving as a supplement to the A digital copying machine 41 itself. Icons representing all output apparatuses found in the search operation are then displayed on the layout diagram. The apparatus information table of the tenth embodiment also includes additional information indicating whether or not each of the output apparatuses is capable of carrying out a sorting job and additional information indicating a maximum number of copies producible in a sorting job if the apparatus is capable of doing the job. The flow of processing then goes on to a step S906 at which all the output apparatuses found in the search operation are searched for one located in closest proximity to the A digital copying machine 41 itself and an icon representing the closest output apparatus is put in an inverted display state to indicate that the apparatus is selected.

Then, the flow of processing proceeds to a step S907 to form a judgment as to whether or not the 'Transfer' or 'Continue' button displayed on the screen shown in FIG. 48 has been pressed. If the 'Continue' button has been pressed, the flow of processing goes on to a step S904 at which data read in by the scanner unit 416 is output to the printer unit 417. As the processing carried out at the step S904 is completed, the processing to copy the scanner data is ended. If the outcome of the judgment formed at the step S908 indicates that the 'Transfer' button has been pressed, on the other hand, the flow of processing continues to a step S908 at which the transfer of image data to the supplementary output apparatus selected at the step S906 is carried out and the supplementary output apparatus is requested to carry out the sorting job. At the same time, the outputting and sorting work is also carried out concurrently in the A digital copying machine 41 itself.

As the transfer of image data is started, the screen shown in FIG. 48 also displays a message stating: "Data is output by the A copying machine and the B copying machine" on the message line as well as a 'Confirm' button. Subsequently, the flow of processing goes on to a step S909 to form a judgment as to whether or not the transfer of the image data has been completed and whether or not the 'Confirm' button displayed on the screen shown in FIG. 48 has been pressed. If the transfer of the image data is under way and the 'Confirm' button has not been pressed, the flow of processing returns to the step S909 to repeat the step S909 as a loop of execution till the transfer is completed or the 'Confirm' button is pressed. As the transfer of the image data is completed or the 'Confirm' button is pressed, the flow of processing proceeds to a step S910 at which the displayed layout diagram is erased from the screen and the normal mode is restored, ending the copy processing.

In the tenth embodiment described above, a work load is distributed to 2 digital copying machines. It should be noted that work load can also be distributed to 3 or more digital copying machines. In addition, while work is simply distributed equally to the digital copying machines in the case of the tenth embodiment, parameters such as the printing speed and the sorting speed can be taken into consideration in distributing a work load. That is, it is desirable to distribute a work load to digital copying machines for carrying out portions of the load in proportion to such parameters which may vary from apparatus to apparatus. As a result, the distributed work load can be completed at the same time at the output apparatuses, allowing the time it takes to complete the whole work to be made short in comparison with a case in which a work load is simply distributed equally to selected output apparatuses.

According to the tenth embodiment described above, part of work which takes a single digital copying machine an excessively long time to finish is transferred to a selected supplementary output apparatus, allowing the digital copying machine to carry out the work in conjunction with the supplementary output apparatus. As a result, the time it takes to complete the work can be shortened substantially.

In the eighth, ninth and tenth embodiments described above, substitute and supplementary output apparatuses and their locations are each displayed as an icon on a layout diagram. It should be noted, however, that the description is not intended to be construed in a limiting sense. That is, the way substitute and supplementary output apparatuses are displayed is not limited to the use of such graphics. For example, substitute and supplementary output apparatuses can be displayed as a list instead of the graphical means. In order to make the display easy for the user to understand, however, it is desirable to display substitute and supplementary output apparatuses and their locations as icons on a layout diagram. In addition, while a substitute or supplementary output apparatus having a short distance from the apparatus in question is given a high priority in the selection of a substitute or supplementary output apparatus, a high priority can also be given to a substitute or supplementary apparatus having a high processing speed, that is, high printing and/or sorting speeds. As an alternative, the user is allowed to determine which parameter is to be used as a base in giving a high priority to a substitute or supplementary output apparatus.

Eleventh Embodiment

In the embodiments described so far, an input-output apparatus is selected among those displayed as icons on a layout diagram. In the case of an eleventh embodiment and a twelfth embodiment to be described later, on the other hand, input-output apparatuses are displayed as a list in order to simplify the displayed screen. FIG. 50 is a diagram illustrating a dialog box for selecting an input-output apparatus from those on a list in the eleventh embodiment. When an area displaying the name of an input-output apparatus or a triangular mark adjacent thereto on a dialog box like the one shown in FIG. 4 for the first embodiment is clicked, for example, beneath the area displaying name of an input-output apparatus, a list of selectable functions is displayed as shown in the dialog box as shown in FIG. 50. The selectable functions in this example are printer, FAX and scanner functions.

As shown in the dialog box of FIG. 50, when the printer function is selected, a list of input-output apparatuses having the printer function is displayed as a pull-down menu. Each line of the pull-down menu includes the name of an input-output apparatus and a location at which the apparatus is installed. In this example, an input-output apparatus named Printer A is located at the north—west corner on a P floor whereas an apparatus named Printer B is located by the south wall close to the south—west corner on the P floor. Input/output apparatuses named Printer C and Copying Machine A are located by the east and south walls on the P floor respectively. Finally, an input-output apparatus named Copying Machine B is located at the north—east corner on the P floor.

FIG. 51 is a table of apparatus information in the eleventh embodiment. The locations of the input-output apparatuses displayed on the pull-down menu shown in FIG. 50 are obtained from this table. Assume that the input-output apparatus named Printer B is selected from the pull-down menu by clicking the line of the apparatus name Printer B. In this case, the apparatus name Printer B is put in an inverted display state. Then, the list showing the apparatus functions and the pull-down menu showing the input-output apparatuses disappear from the dialog box. An input-output apparatus having the facsimile or scanner function can be selected in the same way as an apparatus with the printer function is.

In the eleventh embodiment described above, in a dialog box for selecting an input-output apparatus, input-output apparatuses are displayed by classifying them by function. As a result, even in the case of a multifunctional apparatus having a plurality of functions, a desired function can be easily selected with a high degree of reliability, making even a beginner capable of correctly selecting an input-output apparatus. For example, an apparatus having a printer function is clearly distinguished from that with a facsimile function. Thus, a beginner will no longer output data intended for a facsimile apparatus to a printer or vice versa. In addition, since the displayed screen is made simple, there is also reaped an effect of a reduced number of used computer resources.

Next, a twelfth embodiment is described. In the first to eleventh embodiments described so far, an input-output apparatus is selected among those displayed as icons on a layout diagram. Much like the eleventh embodiment, in the twelfth embodiment, on the other hand, input-output apparatuses are displayed as a list in order to simplify the displayed screen. However, the twelfth embodiment is different from the eleventh embodiment in that, in the case of the former, the names of users of input-output apparatuses are displayed in place of the locations of the apparatuses.

Figure 52:
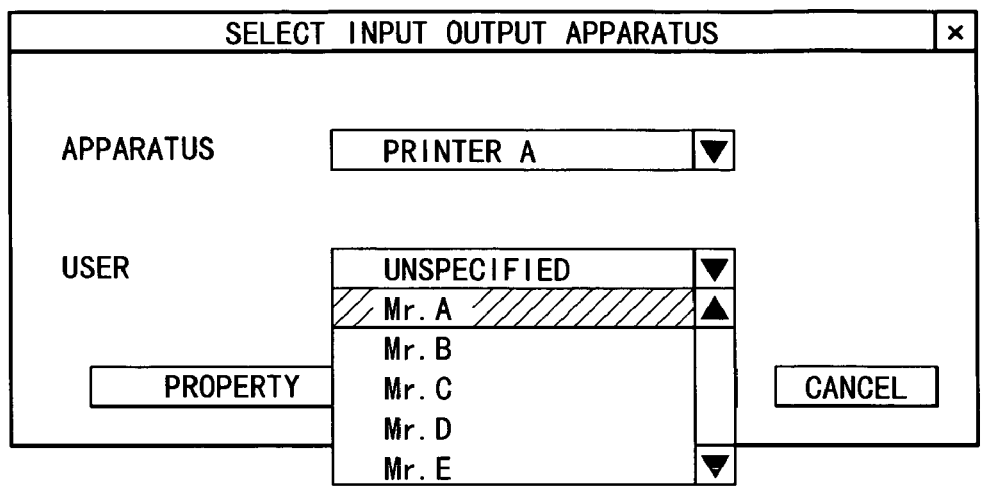
FIG. 52 is a diagram illustrating a dialog box for selecting an input-output apparatus according to a twelfth embodiment wherein a list of user names is displayed as a pull-down menu.

When an area displaying a phrase 'User Name' or a triangular mark adjacent thereto on a dialog box is clicked, beneath the area displaying 'User Name', a list of selectable cataloged user names is displayed as shown in the dialog box of FIG. 52. In the case of a long list, user names on the lower part of the list can not be displayed. In this case, user names on the lower part of the list can be displayed by operating a vertical scroll bar on the right side of the display area. A user can then be selected as a partner of input-output operations from the list by clicking the name of the user. FIG. 52 shows a dialog box in which User A is selected. As a user is selected, the list of user names disappears from the screen and the name of the selected user is displayed on the area displaying 'User Name'.

Figure 53:
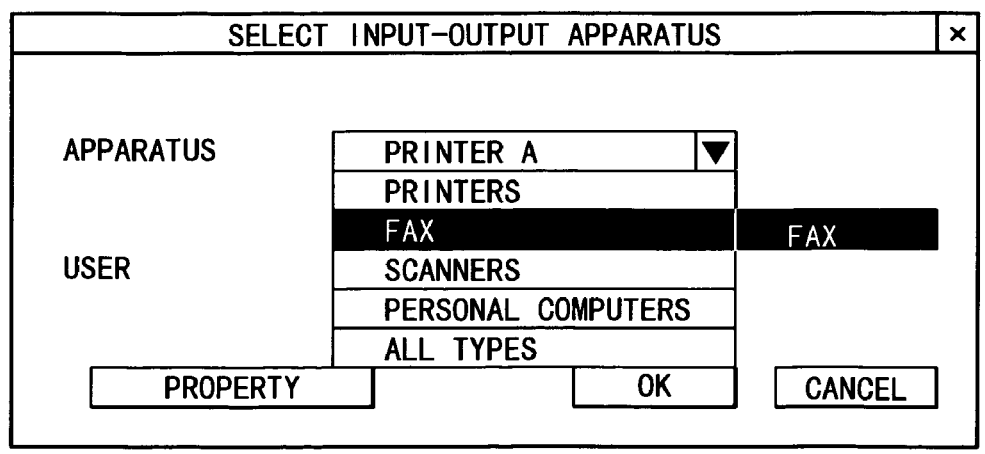
FIG. 53 is a diagram illustrating a dialog box for selecting an input-output apparatus according to a twelfth embodiment wherein a list of apparatus types is displayed as a pull-down menu.

With a user specified and selected, an input-output apparatus can be selected only from those which the selected user normally uses. With User A specified and selected, for example, clicking an area displaying the name of an input-output apparatus or a triangular mark adjacent thereto on the dialog box will display a list of selectable functions beneath the area displaying name of an input-output apparatus in the dialog box as shown in FIG. 53. The selectable functions in this example are printer, FAX, scanner and personal computer functions. In addition, an item of selection representing all input-output apparatuses is put at the bottom of the list.

Assume that the FAX function on the list is clicked. In this case, a list of input-output apparatuses having the facsimile functions is displayed at a location adjacent to the list of functions as shown in FIG. 53. Since only apparatuses which the selected user named User A normally uses are put on the list of input-output apparatuses, only an apparatus named FAX is displayed. When the apparatus FAX is selected, the name 'FAX' is displayed on the area for displaying the name of a selected input-output apparatus, indicating that the apparatus named 'FAX' has been selected as an input-output apparatus. Then, the list showing the apparatus functions and the list showing the input-output apparatuses disappear from the dialog box. An input-output apparatus having the printer, scanner or personal computer function can be selected in the same way as an apparatus with the FAX function is.

In the twelfth embodiment described above, input-output apparatuses displayed for selection are limited to those normally used by a user specified earlier. Thus, an input-output apparatus convenient for a partner of input-output operations can be selected with ease. In addition, in a dialog box for selecting an input-output apparatus, input-output apparatuses are displayed by classifying them by function. As a result, even in the case of a multifunctional apparatus having a plurality of functions, a desired function can be easily selected with a high degree of reliability, making even a beginner capable of correctly selecting an input-output apparatus. For example, an apparatus having a printer function is clearly distinguished from that with a facsimile function. Thus, a beginner will no longer output data intended for a facsimile apparatus to a printer or vice versa. In addition, since the displayed screen is made simple, there is also reaped an effect of a reduced number of used computer resources.

While as many widely different embodiments of the present invention as required can be made apparently without departing from the true spirit and scope thereof, it is to be understood that the invention is not limited to the specific embodiments, but is only limited to what are defined in the following appended claims.

What is claimed is:

1. A computer readable medium storing a computer program for a computer in a network to which the computer and a plurality of input-output apparatuses are connected, at least one of the input-output apparatuses having a plurality of functions, the computer program causing the computer to execute the steps of:

displaying a layout image of the plurality of input-output apparatuses;

selectably displaying one function out of the plurality of functions;

displaying, when any function has not yet been selected, on the layout image icons of the plurality of input-output apparatuses representing the functions of the plurality of the input-output apparatuses, while, when the one function has been selected, displaying on the layout image icons of the selected functions to represent only the input-output apparatuses that have the selected functions; and assigning a selected one of the input-output apparatuses that are represented on the layout image by the icons as an input or output apparatus for a job.

2. The computer readable medium of claim 1, wherein the computer program further causes the computer to execute the steps of:

creating and storing images or lists of the layout of the plurality of input-output apparatuses with hierarchical classification;

displaying the image or the list of a higher hierarchy; and displaying the image or the list of a lower hierarchy when a selection is made in the image or the list of the higher hierarchy.

3. A computer network system comprising a computer and a plurality of input-output apparatuses connected to a network, at least one of the input-output apparatuses having a plurality of functions, the computer network comprising:

a storage for storing a table of functional capabilities of the plurality of input-output apparatuses regarding a plurality of functions;

a display for displaying a layout image of the plurality of input-output apparatuses, and for displaying a selection screen for selecting one of the functions;

a controller for controlling the display to display, when any function has not yet been selected, on the layout image icons of the plurality of input-output apparatuses representing the functions of the plurality of the input-output apparatuses, while, when the one function has been selected, displaying on the layout image icons of the selected functions to represent only the input-output apparatuses that have the selected functions, and for assigning a selected one of the input-output apparatuses that are represented on the layout image by the icons as an input or output apparatus for a job.

4. A method for assigning one of a plurality of input-output apparatuses in a network to which a computer and the plurality of input-output apparatuses are connected, at least one of the input-output apparatuses having a plurality of functions, the method comprising the steps of:

displaying a layout image of the plurality of input-output apparatuses;

selectably displaying one function out of the plurality of functions;

displaying, when any function has not yet been selected, on the layout image icons of the plurality of input-output apparatuses representing the functions of the plurality of the input-output apparatuses, while, when the one function has been selected, displaying on the layout image icons of the selected functions to represent only the input-output apparatuses that have the selected functions; and assigning a selected one of the input-output apparatuses that are represented on the layout image by the icons as an input or output apparatus for a job.

5. The method of claim 4, further comprising the steps of:

creating and storing images or lists of the layout of the plurality of input-output apparatuses with hierarchical classification;

displaying the image or the list of a higher hierarchy; and displaying the image or the list of a lower hierarchy when a selection is made in the image or the list of the higher hierarchy.

6. In a network to which a computer and a plurality of input-output apparatuses are connected, at least one of the input-output apparatuses having a plurality of functions, the computer comprising:

a display unit to display a layout image of the plurality of input-output apparatuses;

a user interface through which a user is allowed to select one function out of the plurality of functions;

a display controller to display on the layout image, when any function has not yet been selected through the user interface, icons of the plurality of input-output apparatuses representing the functions of the plurality of the input-output apparatuses, while to display on the layout image, when the one function has been selected through the user interface, icons of the selected functions to represent only the input-output apparatuses that have the selected functions; and a controller to assign a selected one of the input-output apparatuses that are represented on the layout image by the icons as an input or output apparatus for a job.

7. The computer of claim 6, further comprising:

a storage to store images or lists of the layout of the plurality of input-output apparatuses with hierarchical classification, wherein the display unit displays the image or the list of a higher hierarchy, and displays the image or the list of a lower hierarchy when a selection is made in the image or the list of the higher hierarchy through the user interface.

* * * * *